(12) United States Patent
Suetsugu et al.

(10) Patent No.: US 7,095,714 B2
(45) Date of Patent: Aug. 22, 2006

(54) RING INTERCONNECTION NETWORK SYSTEM, NODE EQUIPMENT, NETWORK MANAGEMENT EQUIPMENT, AND PATH SETTING METHOD

(75) Inventors: Hiromune Suetsugu, Ome (JP); Kenji Baba, Kodaira (JP); Masatoshi Suzuki, Yamato (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 975 days.

(21) Appl. No.: 09/993,574

(22) Filed: Nov. 27, 2001

(65) Prior Publication Data

US 2002/0064166 A1 May 30, 2002

(30) Foreign Application Priority Data

Nov. 28, 2000 (JP) .............................. 2000-361831
Dec. 20, 2000 (JP) .............................. 2000-387402

(51) Int. Cl.
*H04L 12/26* (2006.01)

(52) U.S. Cl. ....................................................... 370/222
(58) Field of Classification Search ................ 370/216, 370/222, 223, 224, 403
See application file for complete search history.

(56) References Cited

U.S. PATENT DOCUMENTS

| | | | |
|---|---|---|---|
| 5,218,604 A * | 6/1993 | Sosnosky | 370/223 |
| 5,394,389 A * | 2/1995 | Kremer | 370/223 |
| 5,442,623 A | 8/1995 | Wu | |
| 5,550,805 A | 8/1996 | Takatori et al. | |
| 5,781,535 A * | 7/1998 | Russ et al. | 370/248 |
| 5,867,494 A * | 2/1999 | Krishnaswamy et al. | 370/352 |
| 5,920,542 A | 7/1999 | Henderson | |
| 5,999,288 A | 12/1999 | Ellinas et al. | |
| 6,038,678 A * | 3/2000 | Fukushima et al. | 714/4 |
| 6,499,117 B1 | 12/2002 | Tanaka | |
| 2001/0055309 A1* | 12/2001 | Altstaetler | 370/403 |

FOREIGN PATENT DOCUMENTS

EP 1 031 198 B1 4/2003
JP 2000-209203 7/2000

OTHER PUBLICATIONS

European Search Report issued by European Patent Office, dated Apr. 1, 2005, for European Patent Application No. 01309939.5.

* cited by examiner

*Primary Examiner*—Derrick Ferris
(74) *Attorney, Agent, or Firm*—Finnegan, Henderson, Farabow, Garrett & Dunner, L.L.P.

(57) ABSTRACT

A Protection Primary state is newly defined. When the traffic route is switched by a ring interworking function, while APS is in operation, a protection primary node is caused to restore the service path.

11 Claims, 60 Drawing Sheets

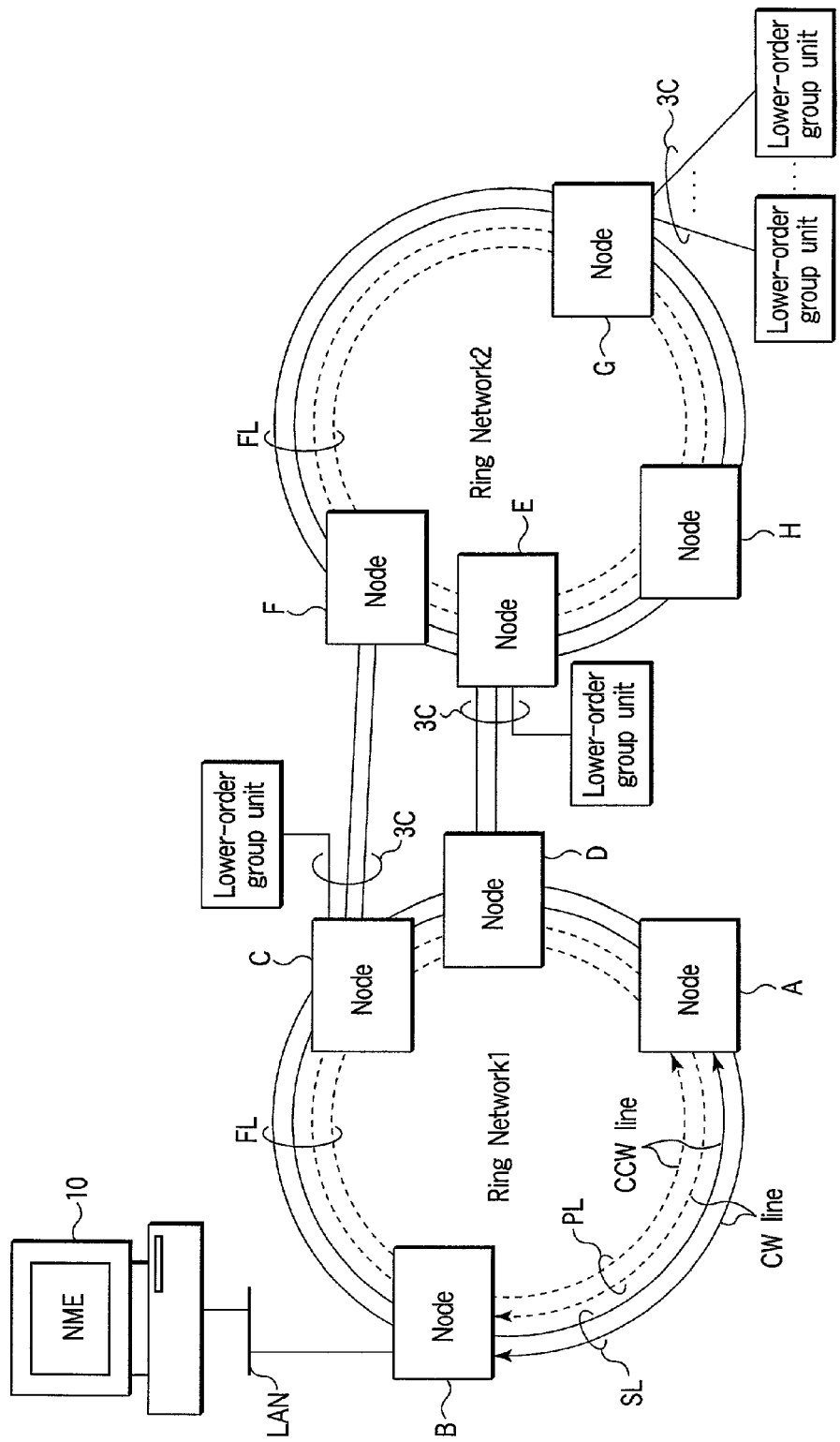
F I G. 1

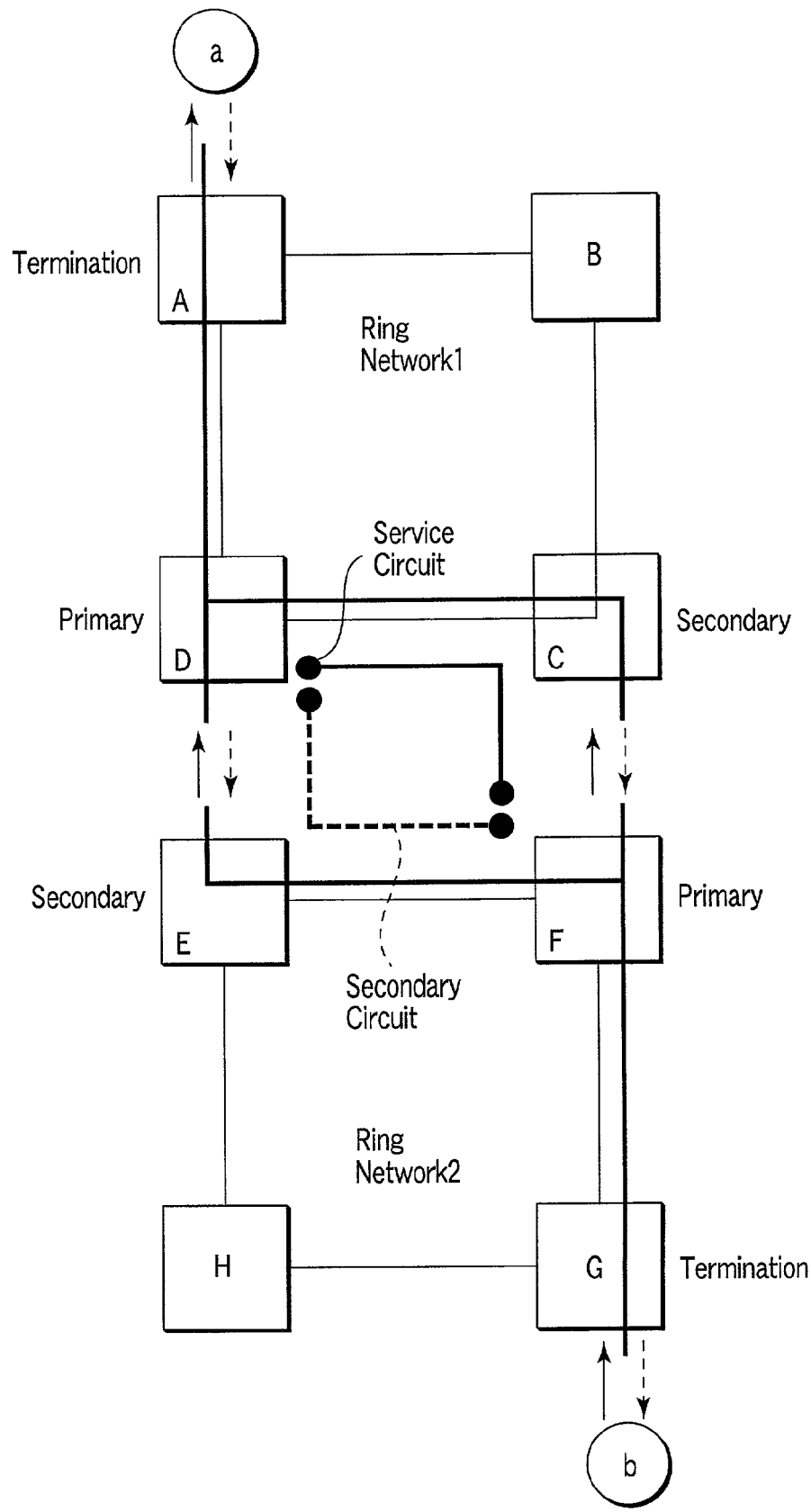
F I G. 13

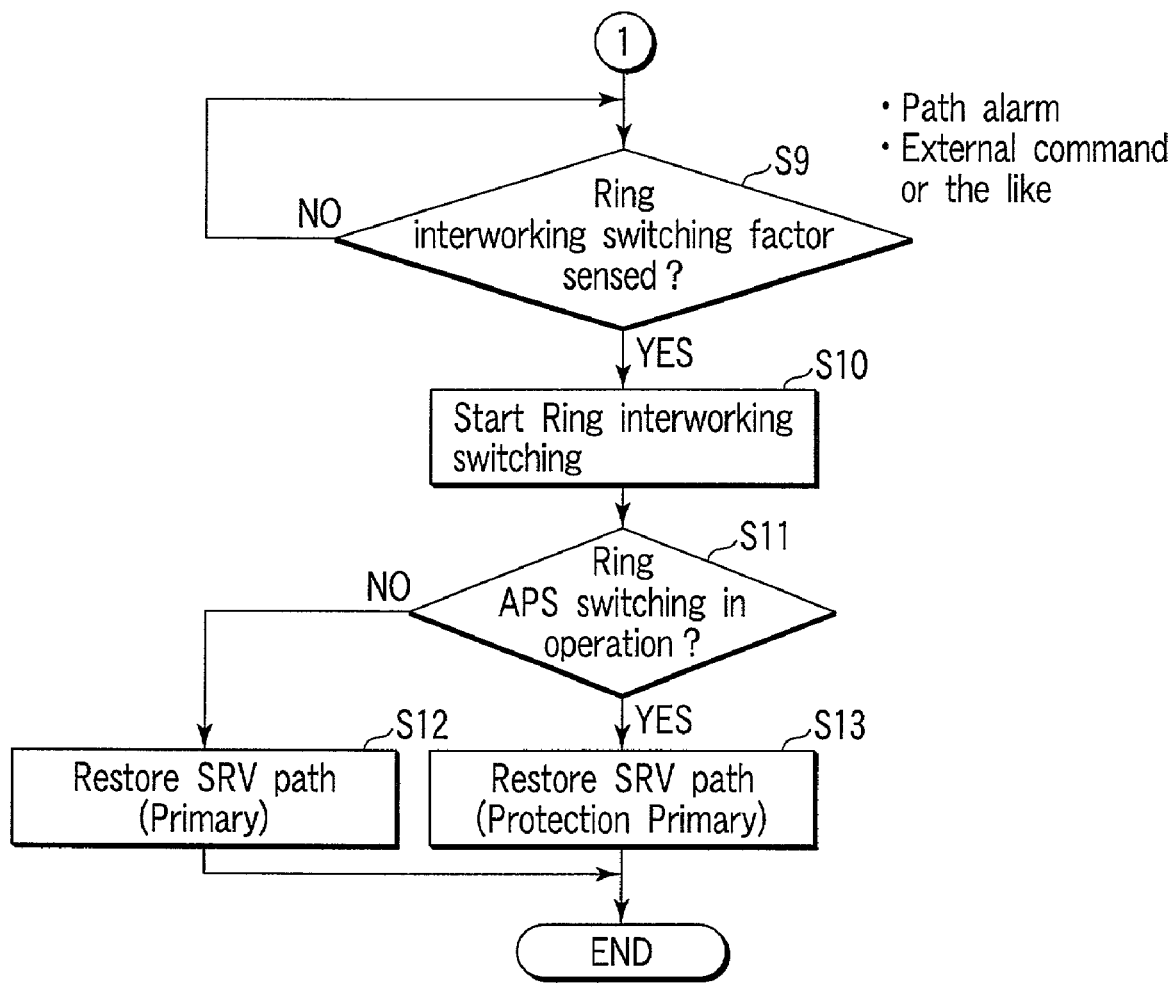
F I G. 40

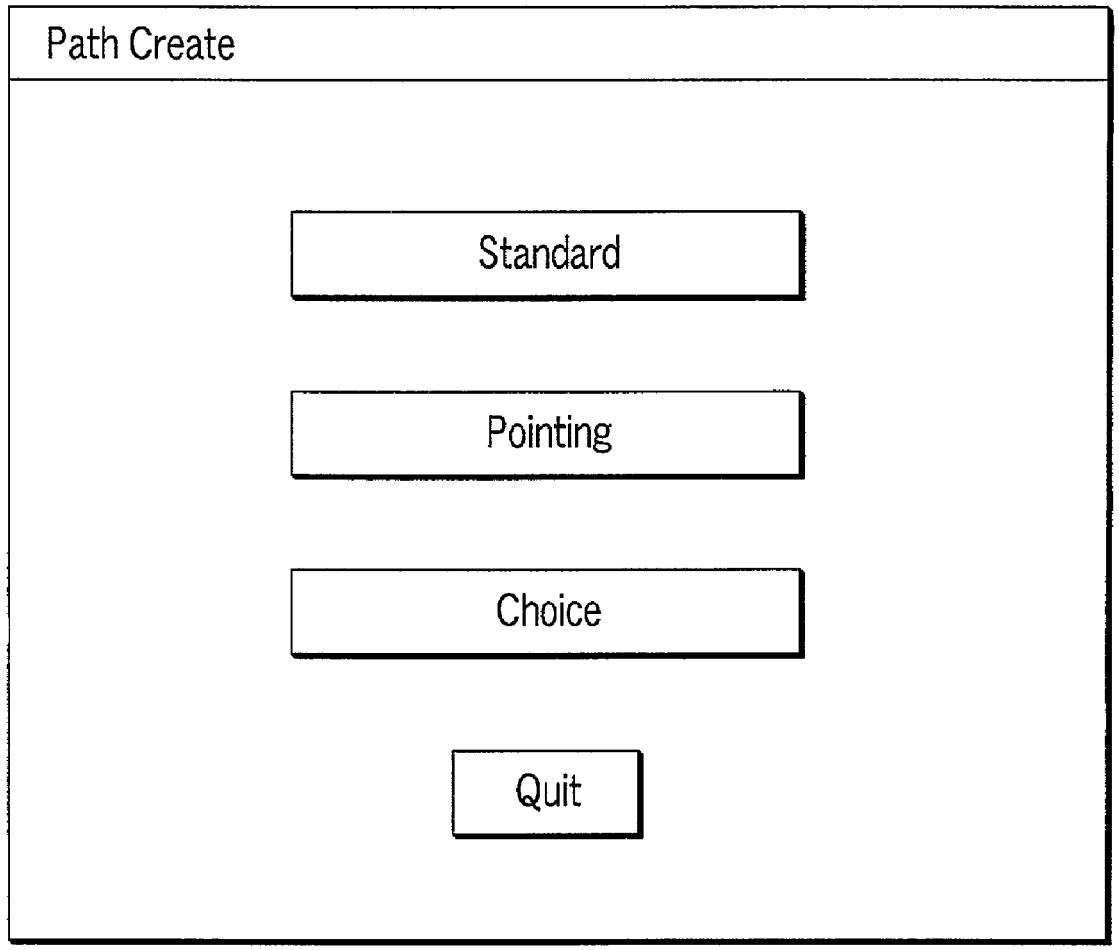
F I G. 47

Node Information

Ring Network 1: Node B

LS channel: LS1 ▽

Concatenation Type: ● AU-4  ○ AU-4-4C  ○ AU-4-16C  ○ AU-4-64C

Path Type: Add/Drop ▽

Route Type: Uniformily ▽

Exec     Cancel

F I G. 49

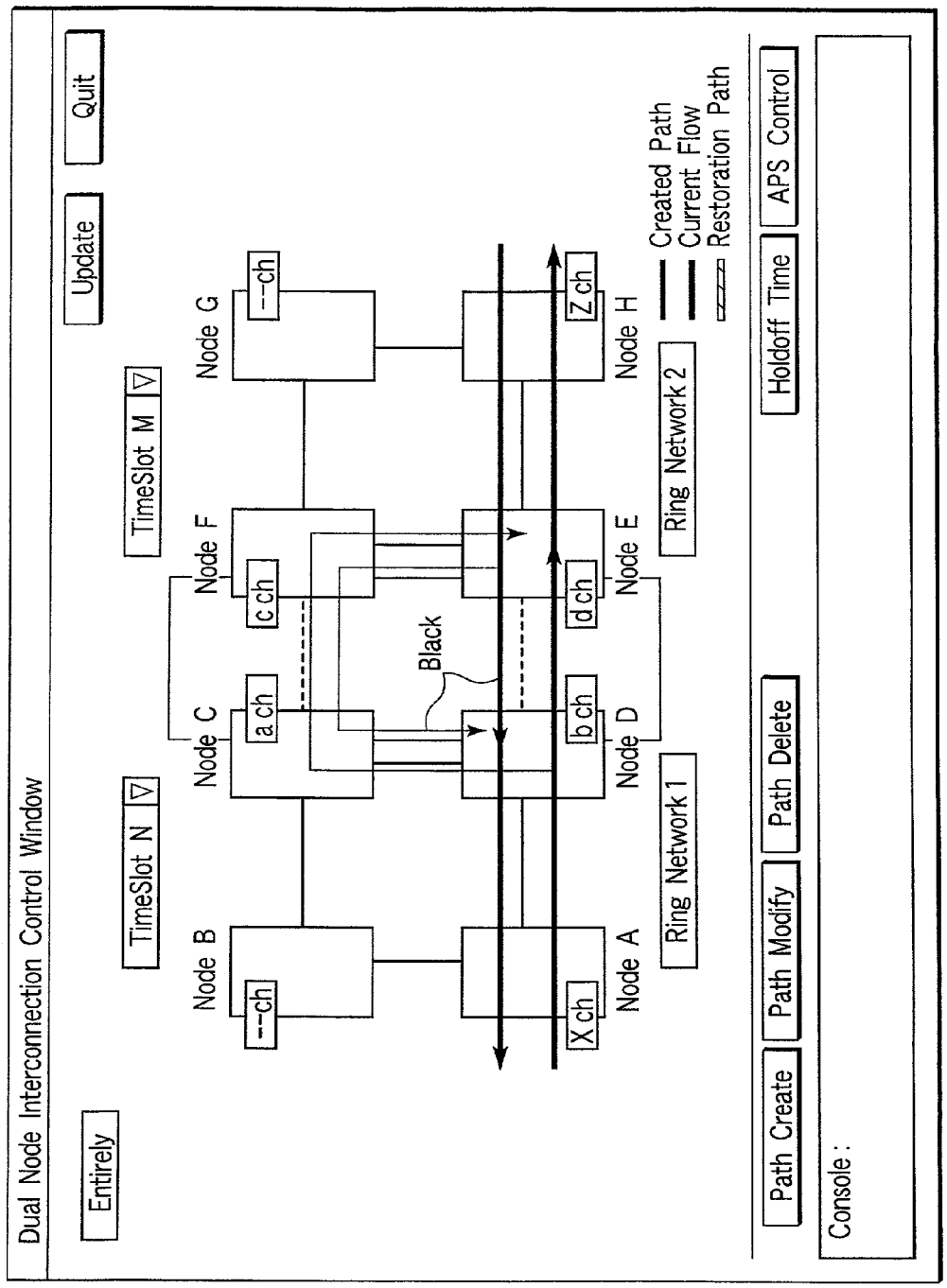
F I G. 50

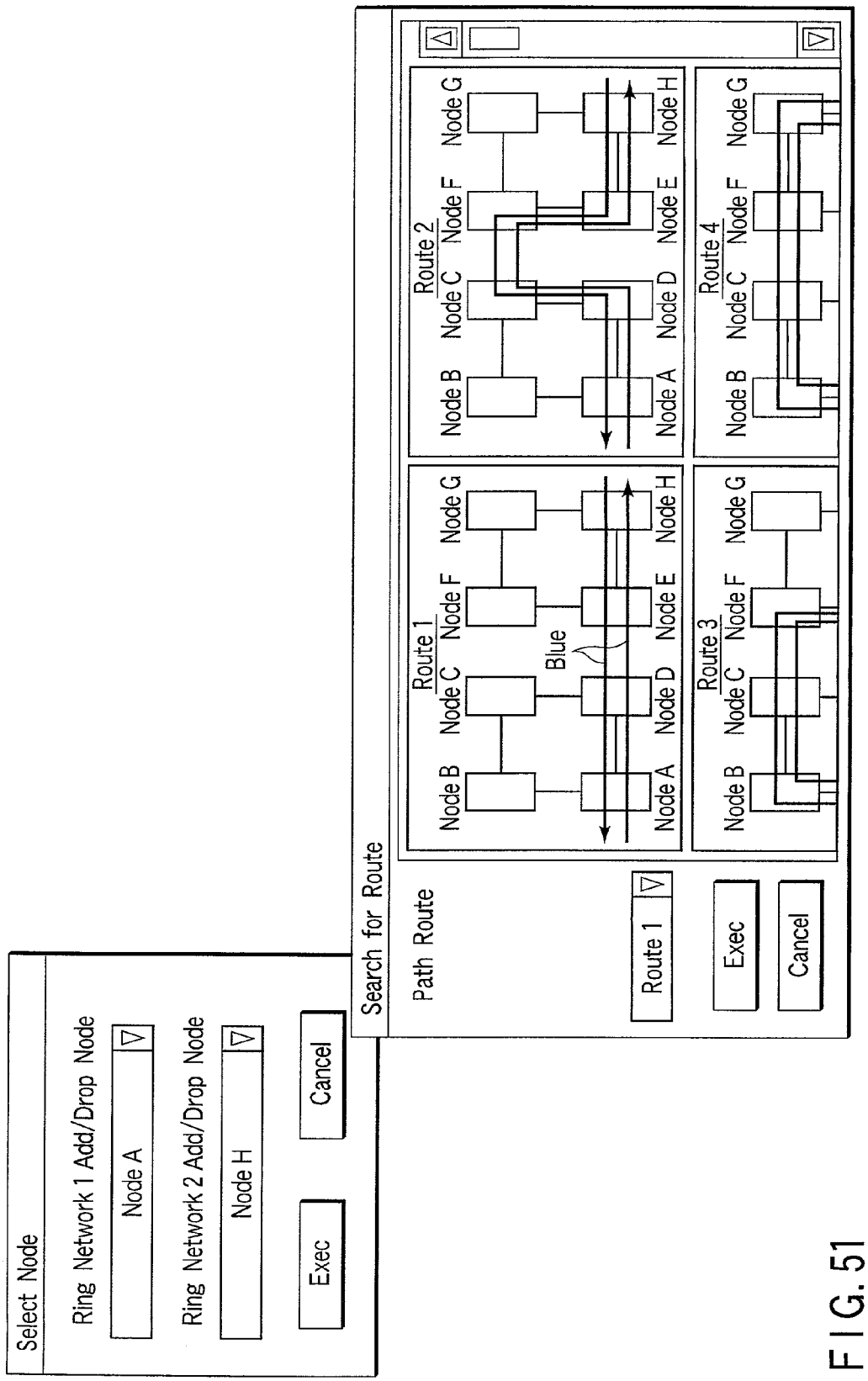
F I G. 51

Holdoff Timer Setting

Target: Network 1 ▽

Timer Value:
(Range: 0-10sec)   0 ◁▷ [sec] +   100 ◁▷ [ms] : 100ms step

Requedted Value: 0.1 sec

Exec    Cancel

F I G. 56

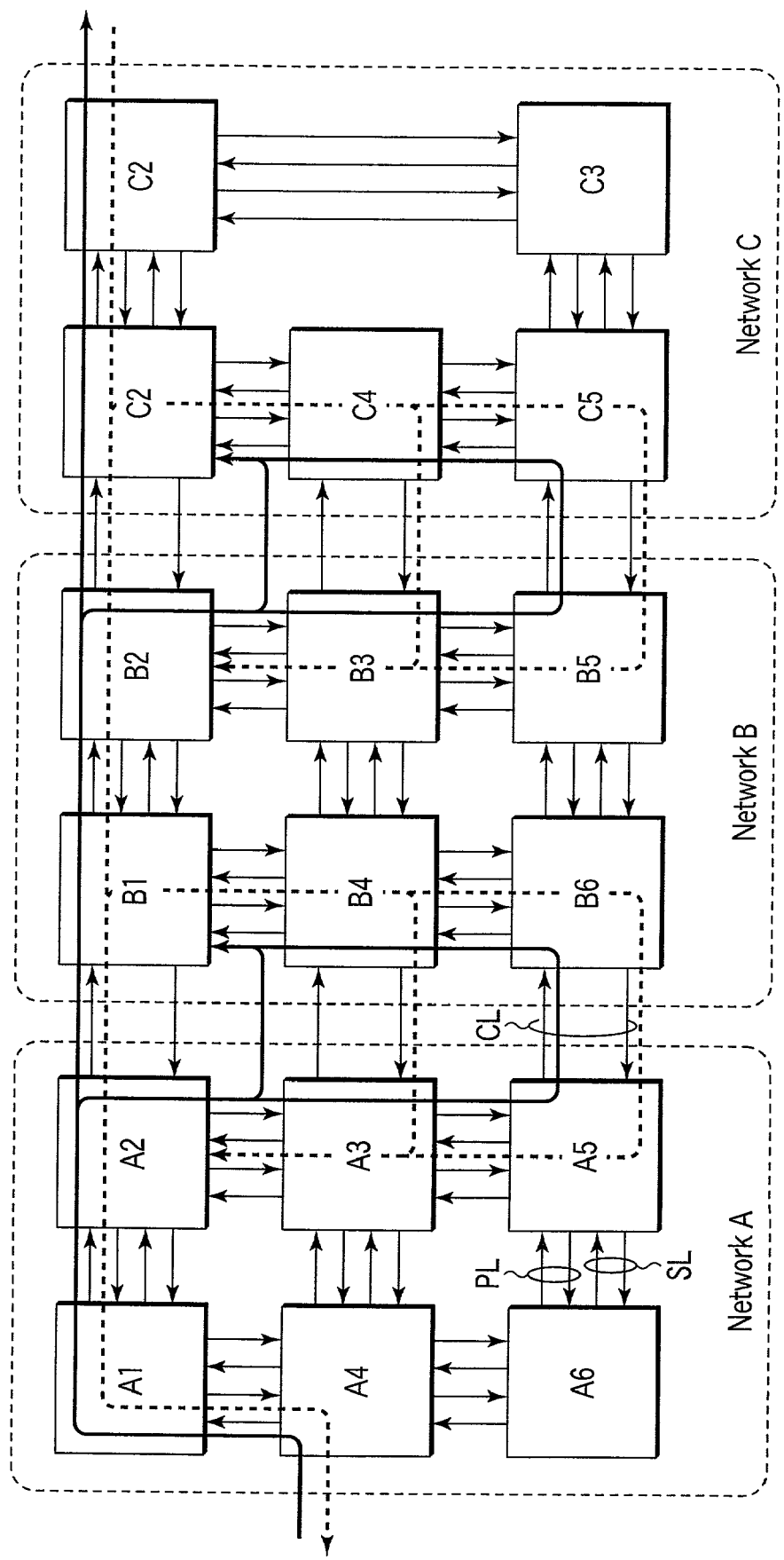
F I G. 57

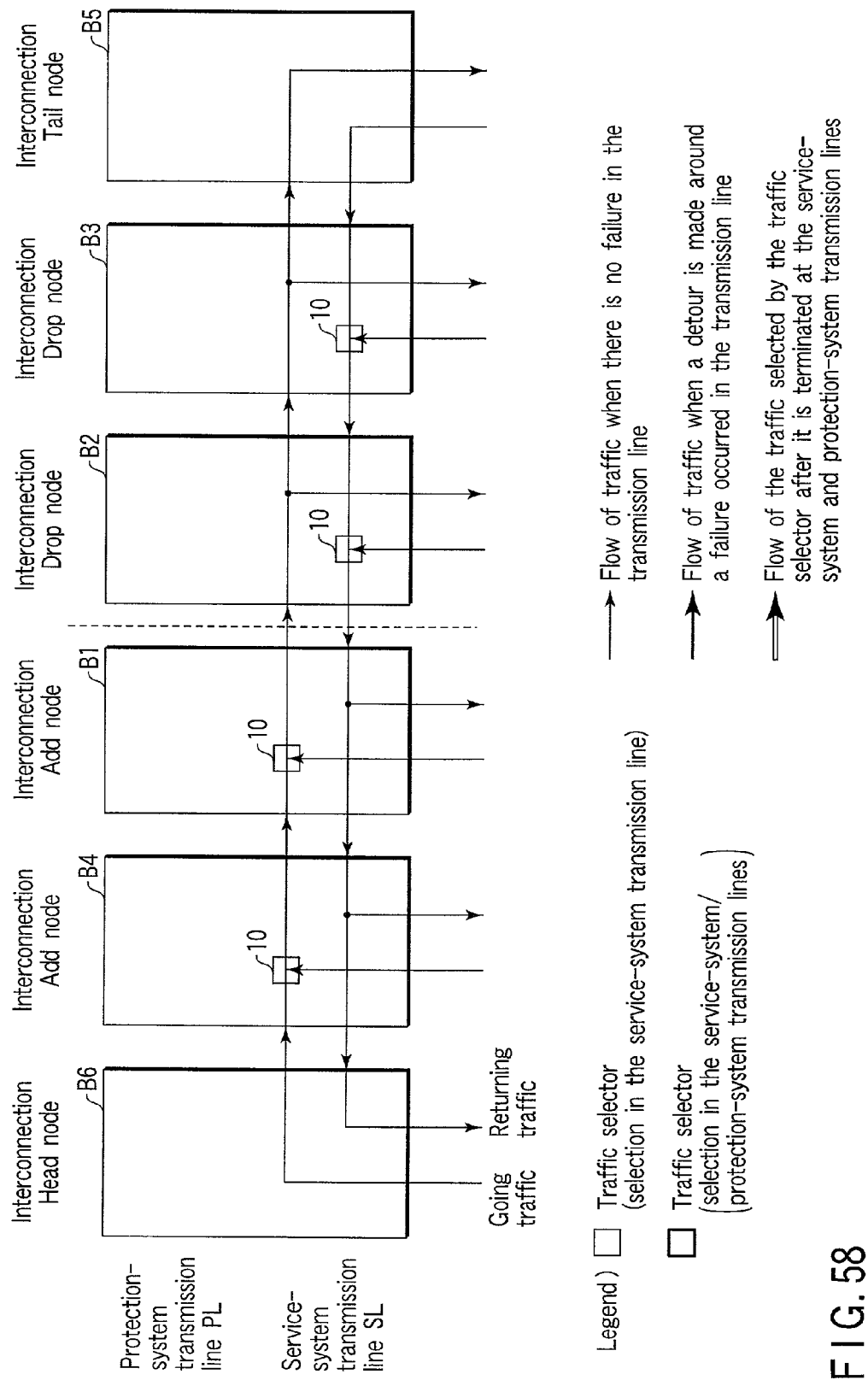
F I G. 58

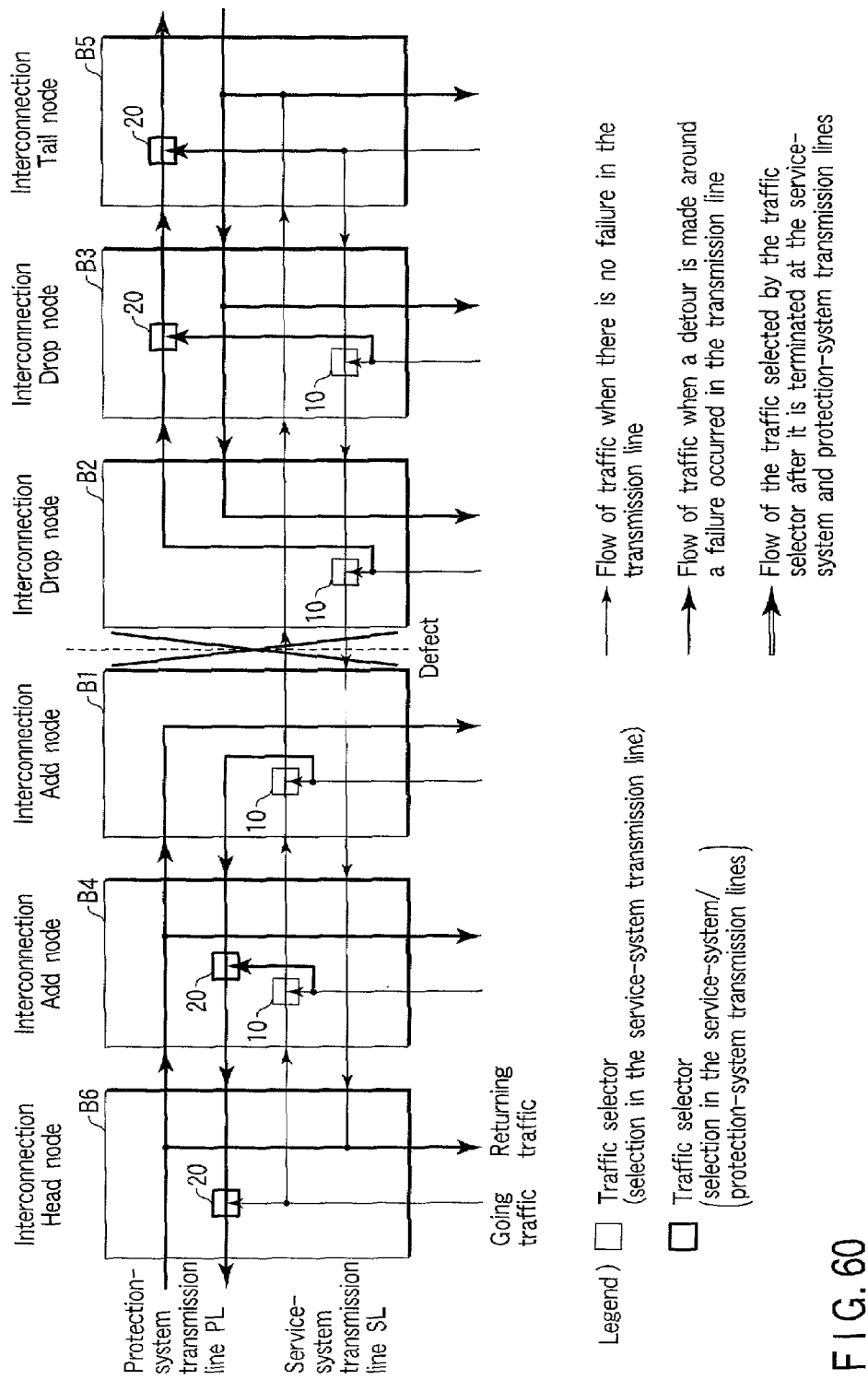
F I G. 60

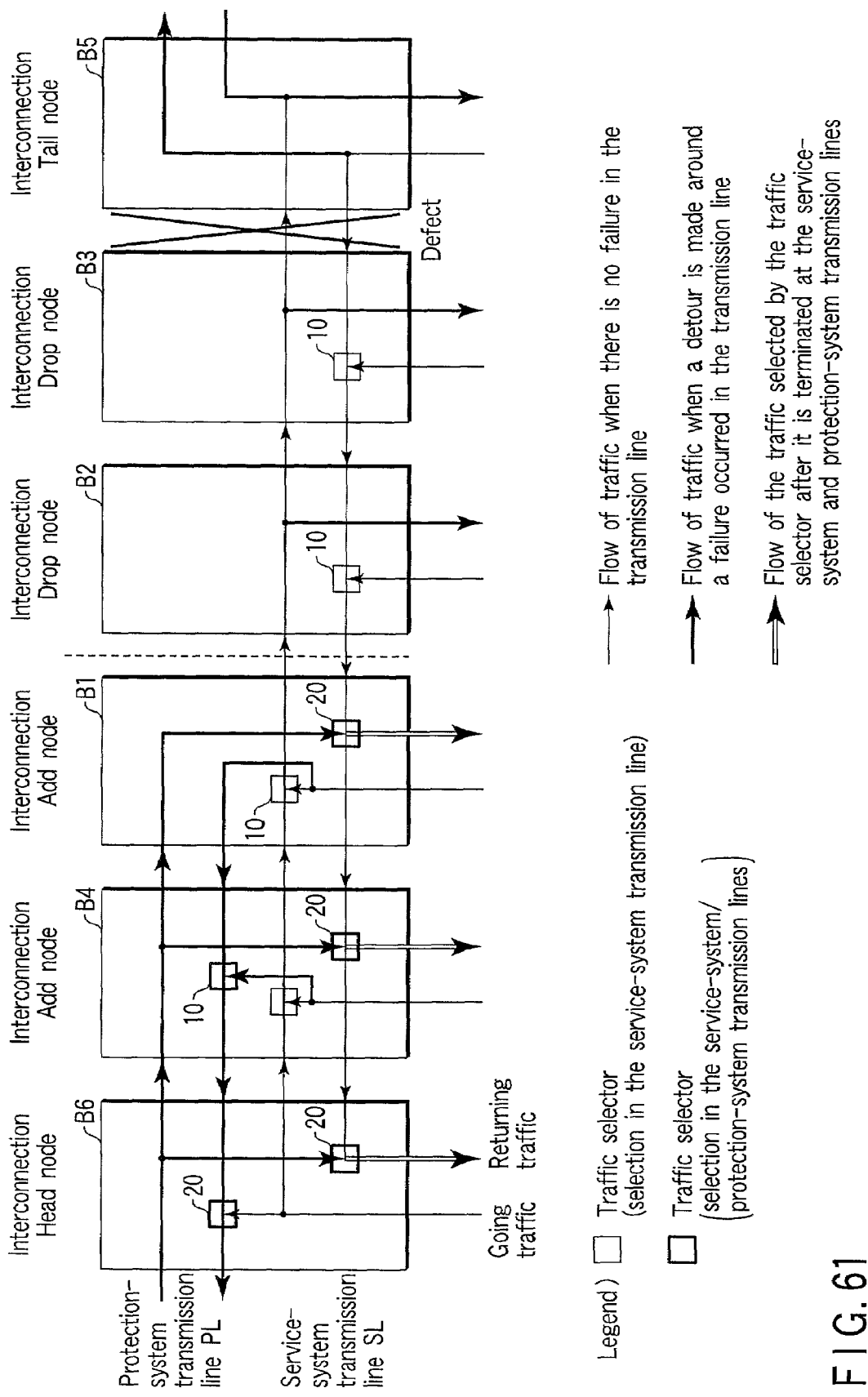
F I G. 61

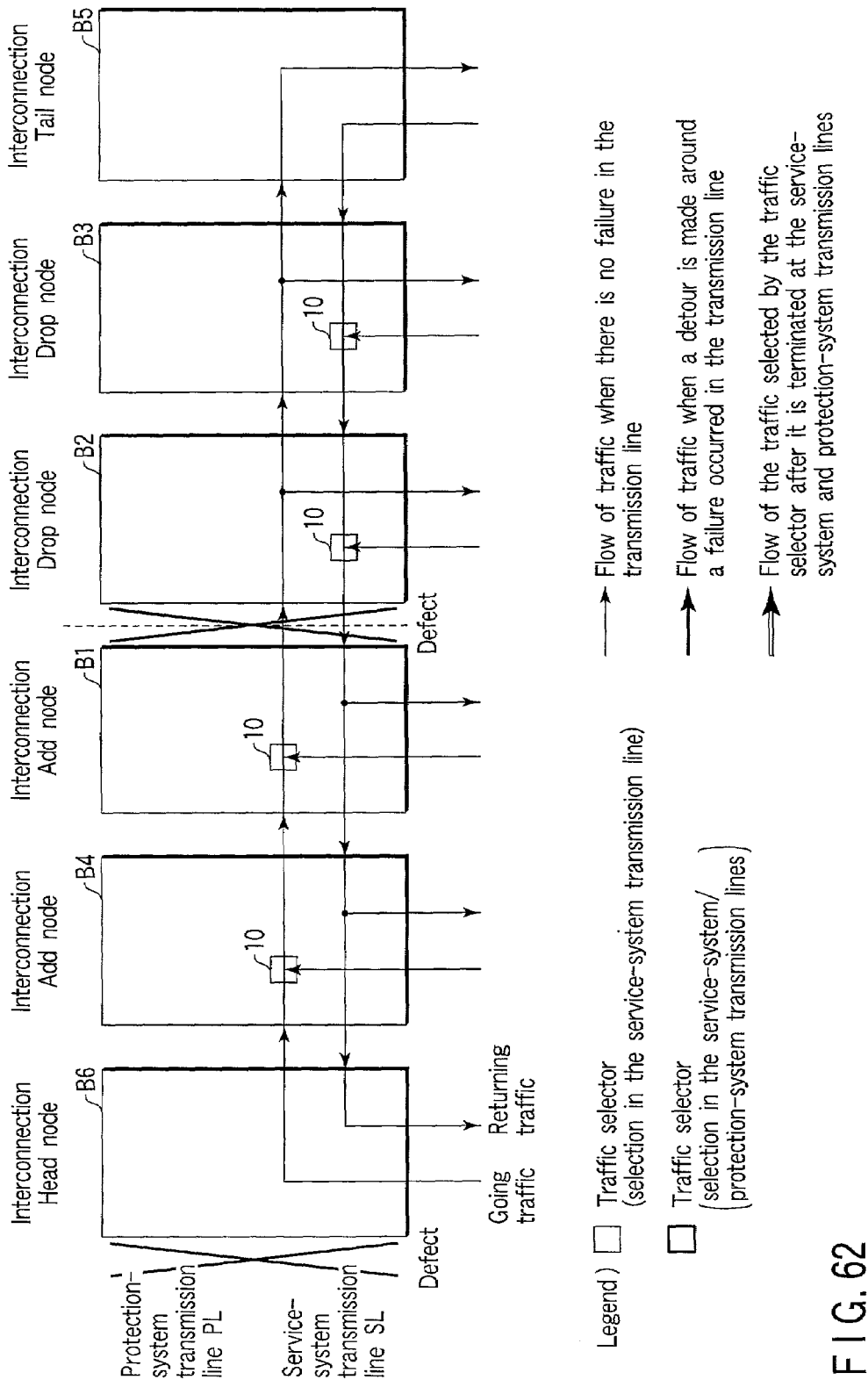
F I G. 62

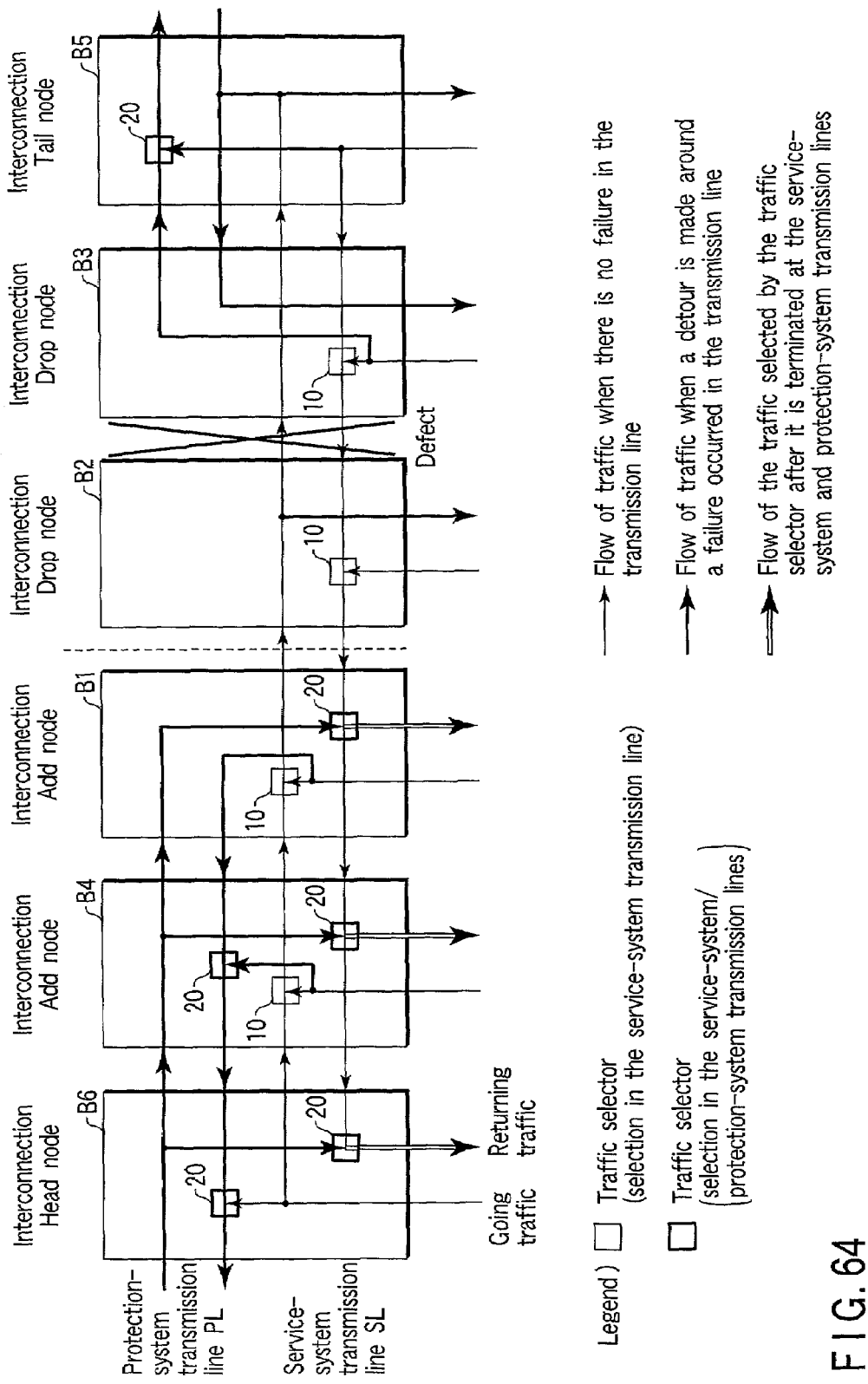
F I G. 64

RING INTERCONNECTION NETWORK SYSTEM, NODE EQUIPMENT, NETWORK MANAGEMENT EQUIPMENT, AND PATH SETTING METHOD

CROSS-REFERENCE TO RELATED APPLICATIONS

This application is based upon and claims the benefit of priority from the prior Japanese Patent Applications No. 2000-361831, filed Nov. 28, 2000; and No. 2000-387402, filed Dec. 20, 2000, the entire contents of both of which are incorporated herein by reference.

BACKGROUND OF THE INVENTION

1. Field of the Invention

This invention relates to a ring interconnection network system formed by connecting a plurality of ring networks with a self-healing function to each other, node equipment and network management equipment and a path setting method used in the system. This type of network architecture is known as Ring Interconnection or Ring Interworking, which has been described in, for example, ITU-T (Telecommunication Standardization Sector of ITU) Recommendation G. 842 distributed by the ITU (International Telecommunication Union).

2. Description of the Related Art

A traffic self-healing method that is completed in a ring network has been described in ITU-T Recommendation G. 841. In this recommendation, this type of self-healing method is referred to as APS (Automatic Protection Switching).

In Annex A to the recommendation, measures to avoid failures known as Transoceanic Applications have been described. By the Transoceanic Applications, the communication path can be detoured to the shortest route that avoids the fault segment. This makes it possible to shorten the transmission distance of the path, which enables switching with less impact to be realized in a system with a long distance between nodes (or a large delay in transmission).

On the other hand, in ITU-T Recommendation G. 842, a method of interconnecting a plurality of ring networks has been described. In this recommendation, a method of restoring the traffic in a ring interconnection network system has been explained.

Recommendation G. 842, however, has explained only a failure avoiding method using a so-called non-Transoceanic method that avoids a failure. Therefore, Recommendation G. 842 has not disclosed a failure avoiding method using the above-described Transoceanic method.

This prevents operators who offer node equipment from becoming multi-vendors, which means that it is difficult to meet the needs of today's carrier operators. Furthermore, when the APS function according to Recommendation G. 841 Annex A and the interworking function according to Recommendation G. 842 operate independently, the communication can be disconnected or the traffic can be misconnected. Therefore, any measure to deal with this problem must be taken as soon as possible.

Furthermore, when the interworking function according to Recommendation G. 842 is realized, the following problem is encountered. In a network system, there is provided network management equipment to provide monitoring control of the system. In a conventional system taking no account of interconnection, the network management equipment can be regarded as each of the ring networks being an independent one. In this case, the network management equipment has only to manage the paths existing only in each ring network.

However, a system with an interconnection function has such paths as are set over a plurality of ring networks. Therefore, the network management equipment must manage such paths as well.

In such a situation, to grasp the path configuration, the operator has no choice but to combine manually the results of path management performed on a ring network basis in the conventional system. This takes a lot of time and labor for the operator to do it.

Furthermore, the path restoration process in such a ring interconnection network system is complex. This makes it more difficult for the operator to grasp the state of each path. For this reason, there is a need to improve the human-machine interface of the network management equipment and increase the convenience of the system operation.

As described above, a failure avoiding method using the Transoceanic method has not been provided in the ring interconnection network system. As a result, if switching by the Transoceanic method is effected in this type of system, there is a possibility that the line will be disconnected or the traffic will be misconnected.

Furthermore, since managing the paths requires a lot of time and labor in the conventional network management equipment, there is a need to decrease the required time and labor and improve the convenience of the system operation.

BRIEF SUMMARY OF THE INVENTION

A first object of the present invention is to provide a ring interconnection network system free from a misconnection even when a failure is avoided using a Transoceanic method, and node equipment used in the network system.

A second object of the present invention is to provide network management equipment which improves a human-machine interface and increases the convenience of the system operation, and a path setting method.

According to a first aspect of the present invention, there is provided a ring interconnection network system comprising a plurality of ring networks which have a plurality of nodes and a transmission line connecting these nodes in a ring and a plurality of connection parts which connect the plurality of ring networks to each other, the ring interconnection network system comprising: a first self-healing function, such as an APS function, which, when a failure has occurred in the ring networks, forms a shortest communication route to avoid the failure; a second self-healing function, such as an interworking function, which, when a failure has occurred in the connection parts, forms a communication route to avoid the failure; and switching control means for causing the first self-healing function and the second self-healing function to function in cooperation with each other without contradiction.

With this configuration, it is possible to operate the so-called Transoceanic-type APS and the switching function based on the interworking function in cooperation with each other.

According to a second aspect of the present invention, there is provided network management equipment which is provided in the above ring interconnection network system which provides monitoring control of the ring interconnection network system on the basis of notice information acquired from each of the plurality of pieces of node equipment, the network management equipment characterized by comprising: a display unit which functions as a human-machine interface with the operator and which displays a first window to display a pictorial view of the connection form of each piece of node equipment in the ring interconnection network system on the screen of the display unit and shows the symbols indicating the multiplex lines in the pictorial view in such a manner that the symbols are distinguished from each other according to the presence or absence of a failure.

Furthermore, the network management equipment of the present invention is provided with various function buttons used to open a window which displays all the paths on the screen or a window related to path setting.

Use of such means enables a plurality of ring networks to be managed on a single screen systematically. As a result, the operator can monitor or control all the paths on a monitoring screen. Furthermore, the operator can create or delete a path extending over ring networks by clicking on the screen. Moreover, the operator can grasp the restored state of paths together with the restored state by Ring APS. In addition, the operator can manage external commands, such as Lockout/Forced SW/Manual SW performed on ring interworking, in a unified manner by operating on the screen. Consequently, it is possible to improve the human-machine interface.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 shows the configuration of a ring interconnection network system according to an embodiment of the present invention;

FIG. 13 shows a state of the Opposite Side routing in the initial setting;

FIG. 40 is a flowchart following the flowchart of FIG. 39;

FIG. 47 illustrates a subwindow appearing when the "Path Create" button is clicked;

FIG. 49 shows a Path Create window in case 2;

FIG. 50 shows an example of a window that enables paths to be created by pointing with a mouse;

FIG. 51 illustrates a subwindow and a Route Choice Window appearing when the "Choice" button is clicked;

FIG. 56 illustrates a window for Holdoff Timer setting;

FIG. 57 shows the configuration of a ring interconnection network according to a third embodiment of the present invention;

FIG. 58 illustrates a model of a path setting state of network B in FIG. 57;

FIG. 60 shows an example of path setting in case 2 in the third embodiment;

FIG. 61 shows an example of path setting in case 3 in the third embodiment;

FIG. 62 shows an example of path setting in case 4 in the third embodiment;

FIG. 64 shows an example of path setting in case 6 in the third embodiment.

DETAILED DESCRIPTION OF THE INVENTION

Figure 2:
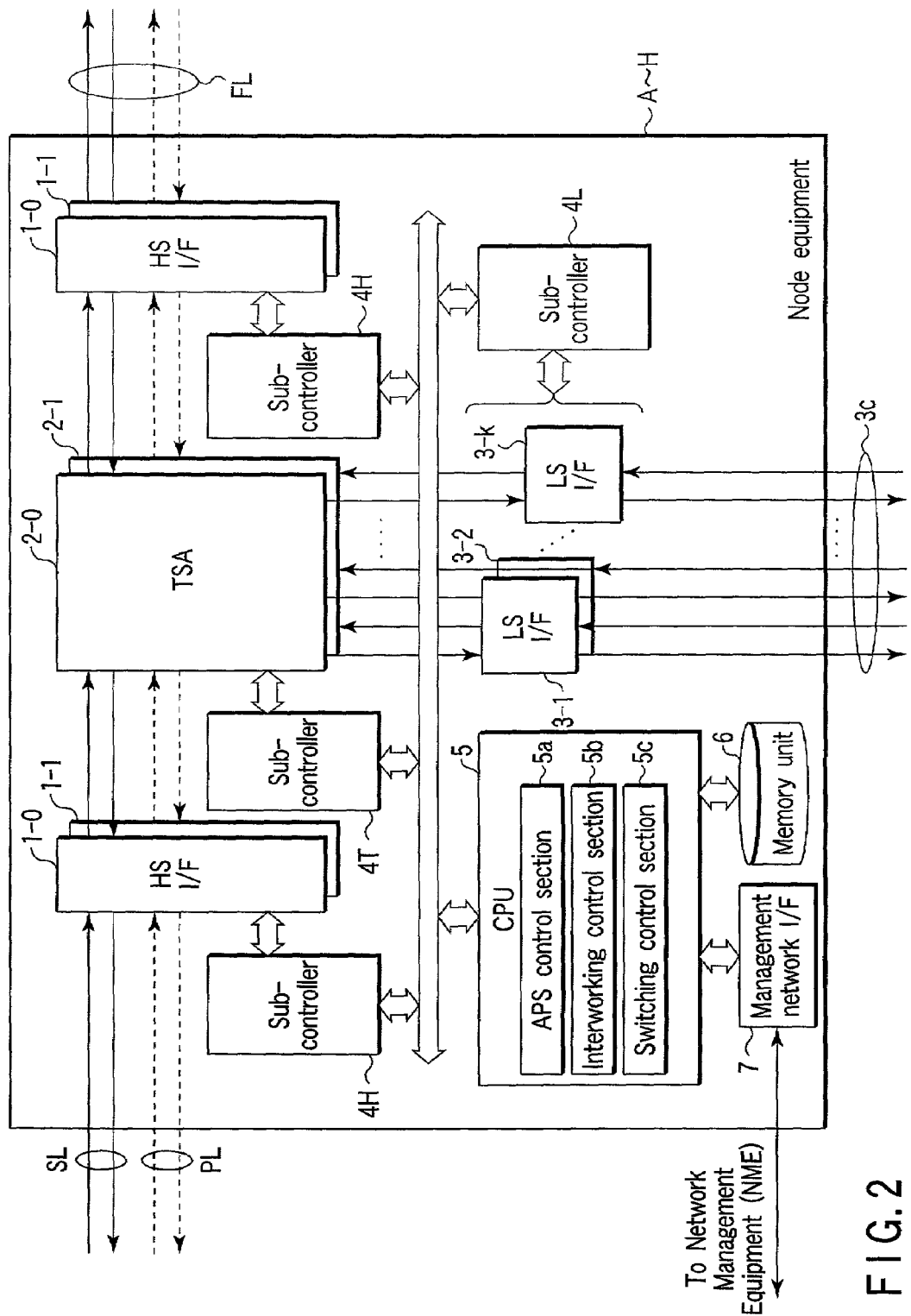
FIG. 2 is a functional block diagram showing the configuration of each of the pieces of node equipment A to H in FIG. 1.

Hereinafter, referring to the accompanying drawings, embodiments of the present invention will be explained in detail. A system complying with the SDH (Synchronous Digital Hierarchy) will be used in the explanation.

<Basic Explanation about System Configuration>

FIG. 1 shows the configuration of a ring interconnection network system according to an embodiment of the present invention. In this system, two ring networks (Ring Network 1 and Ring Network 2) which have a plurality of communication line are interconnected according to ITU-T Recommendation G. 842. Each of the ring networks has a ring APS function written in Annex A to ITU-T Recommendation G. 841.

Ring Network 1 includes pieces of node equipment (hereinafter, referred to as nodes) A to D. Nodes A to D are connected in a ring via optical fiber lines FL. Ring Network 2 includes nodes E to H. Nodes E to H are connected in a ring via optical fiber lines FL. The optical fiber lines FL include service lines SL and protection lines PL. Each of the service lines SL and protection lines PL includes a clockwise (CW) line and a counterclockwise (CCW) line. The number of nodes in Ring Network 1 and Ring Network 2 is not limited to 4 and may take any value.

This type of ring network system is called a 4 fiber ring system. There is also a 2-fiber ring system where a service bandwidth SL and a protection bandwidth PL are logically multiplexed in a single fiber.

The service lines SL and protection lines PL transmit optical signals of a plurality of wavelengths to be wavelength-multiplexed. A high-speed interface, such as STM-64 (Synchronous Transport Module Level 64), is applied to each wavelength.

The signals transmitted via the service lines SL when there is no failure in the system are called service traffic. When the service traffic is caused to flow through the service lines SL, the protection lines PL are empty. To improve the system operation efficiency, traffic with a relatively low priority, such as information not requiring a real time response, may be caused to flow in an empty channel of the protection lines PL. This type of traffic is called extra traffic or part-time traffic.

In FIG. 1, each of node A to node H is connected to a lower-order group unit (with no reference symbol), such as a switching system, a dedicated line node, or an ATM cross-connect unit, via a lower-order line 3c. For the sake of clarity, FIG. 1 shows the way that only some of the nodes are connected to lower-order group units via lower-order lines.

In the system, node C and node F are connected to each other using part of the lower-order lines 3c and node D and node E are connected to each other using part of the lower-order lines 3c. The connection interfaces constitute Ring Interworking written in Recommendation G. 842. In FIG. 1, the number of nodes joining Interworking is more than two node in each ring network. Therefore, the form shown in FIG. 1 is known as Dual Node Interconnection.

Hereinafter, the communication line connects node C and node F is called a first interconnection line. The communication line connects node D and node E is called a second interconnection line. The nodes related to the connection of ring networks are called interconnection nodes.

The ring interconnection network system of FIG. 1 includes Network Management Equipment (hereinafter, referred to as NME) for performing the monitoring and control of the entire system. NME 10, which is realized by installing a dedicated application program in a general-purpose workstation, performs control, including pass setting and alarm monitoring in the network.

NME 10 is connected to, for example, a single node (node B in FIG. 1) via a LAN (Local Area Network) or the like. Of course, NME 10 may be connected to all the nodes independently. The number of units of NME 10 and its installation layout are arbitrary.

In such a system, a manager/agent model with NME 10 as a manager and nodes A to H as agents is formed. The managed objects (MO) of NME 10 are not limited to nodes A to H. For instance, various things, such as optical fiber lines FL, may be used as the managed objects.

NME 10 is connected to the managed objects via a management network (not shown). In managing the network, NME 10 mainly uses notifications given from nodes A to H via the management network. The management network is a logical entity formed by using, for example, DCC (Data Communication Channel) in the SDH frame. As a connection protocol for NME 10 and the respective nodes A to H in the management network, for example, CMIP (Common Management Information Protocol) is used.

Nodes N1 to Nn drop specific slots from the time slots time-division multiplexed onto the STM-64 signal transmitted via the line cable OF.

In FIG. 1, nodes A to H drop specific slots from the time slots time-division-multiplexed onto STM-64 signal transmitted via the optical fiber lines FL. The slot is sent as a lower-order signal to the lower-order line 3c. Furthermore, nodes A to H add lower-order signals, including STM-1, STM-4, and STM-16, to a specific slot of an STM-64 frame. The higher-order signal thus created is sent to another node. In this way, a path with a specific transmission capacity is set between the individual nodes.

Information can be communicated in a given section only when a path is set in the section. In setting a path, the channel on the lower-order side of one node in the section where communication is desired, the channel on the lower-order side of the other node, and the nodes through which the path passes are specified.

It should be noted in FIG. 1 that interconnecting Ring Network 1 and Ring Network 2 with a plurality of interconnection line make it possible to set not only a path being closed in only each ring network but also a path extending over two ring networks.

FIG. 2 shows the configuration of each of nodes A to H. Each of nodes A to H comprises a service high-speed (HS) interface unit (referred to as HS I/F) 1-0 which terminates the service lines SL and a protection high-speed interface unit (protection HS interface unit) 1-1 which terminates the protection lines PL. An STM-64 signal introduced into the inside of the equipment via the service-system HS interface unit 1-0 or protection-system HS interface unit 1-1 is inputted to a Time Slot Assignment (TSA) unit 2-0.

The time slot assignment unit 2-0 drops a specific one of the time slots time-division-multiplexed with the STM-64 signal. The dropped slot is supplied as a lower-order signal to low-speed (LS) interface units (referred to as LS I/F) 3-1 to 3-k. Conversely, the lower-order signals coming from the LS interface units 3-1 to 3-k are supplied to the time slot assignment unit 2-0, which adds the signals to a specific time slot in the STM-64 frame and sends the resulting signal to the optical fiber line FL.

The time slot assignment unit 2-0 and a time slot assignment unit 2-1 makes a pair to form a redundant structure. In the normal state, the time slot assignment unit 2-0 operates in the service system. If a failure occurs in the time slot assignment unit 2-0, switching is done in the equipment to operate the time slot assignment unit 2-1 in the protection system. The operation of the time slot assignment unit 2-1 is the same as that of the time slot assignment unit 2-0.

Between the service system and the protection system, there is provided a switching circuit (not shown) that enables the signal route to be changed from the service system to the protection system or from the protection system to the service system.

The HS interface units 1-0, 1-1, time slot assignment units 2-0, 2-1, and LS interface units 3-1 to 3-k are connected to a CPU (Central Processing Unit) 5 via subcontrollers 4H, 4T, and 4L, respectively. The subcontrollers 4H, 4T, 4L supplement the control of the CPU 5. Various types of control, including protection switching, are performed hierarchically in the cooperation of the CPU 5 with the subcontrollers 4H, 4T, 4L.

The CPU 5 is connected to a memory unit 6 that stores various control programs and a management network interface (I/F) 7. The memory unit 6 stores Ring Map data which is information about the path setting state in each ring network, Fabric data which is information about the setting state of the connection between higher-order channels and lower-order channels, and others. Both the Ring Map and the Fabric are needed to perform APS. The Ring Map has been described in detail in, for example, FIG. 7-6/G. 841 of ITU-T Recommendation G. 841.

The CPU 5 includes an APS control section 5a and an interworking control section 5b. The APS control section 5a has a function for implementing MS shared protection rings (transoceanic application) described in Annex A to ITU-T Recommendation G. 841. The interworking control section 5b has a function for realizing the Ring Interworking function described in ITU-T Recommendation G. 842. In the embodiment, for the sake of convenience, the function of MS shared protection rings (transoceanic application) is referred to as Ring APS or as HS APS to mean switching related to a high-speed interface (HS interface).

When a failure has occurred in the ring network, the APS control section 5a forms a communication route to avoid the failure and salvages traffic from the failure. The APS control section 5a forms the shortest communication route capable of causing traffic to avoid the failure.

Specifically, when a failure has occurred only in the service line in a certain segment of the ring network, the route of the communication path is switched in such a manner that traffic is detoured to the protection line in that segment. Such a process is called "Span Switching." When a failure has occurred in both of the service line and protection line in a certain segment of the ring network, the route of the communication path is switched in such a manner that traffic is detoured to the protection line in the route avoiding the segment. Such a process is called "Ring Switching."

If having sensed a failure, or if having received notification that a failure has occurred at another node, the APS control section 5a judges whether to effect Span Switching or Ring Switching.

When a failure has occurred in a first interconnection line or a second interconnection line, the interworking control section 5b forms a communication route to avoid the failure and salvages traffic from the failure. The interworking function forms a communication path in each of the first and second interconnection lines in advance and selects the communication path of either the first interconnection line or the second interconnection line suitably.

If having sensed the occurrence of a failure, the interworking control section 5b judges how to switch the communication route to avoid the failure. Then, the interworking control section 5b switches the communication path between the first interconnection line and second interconnection line as needed.

In this specification, for the sake of distinction, the traffic salvaging function realized by the APS control section 5a is called a first self-healing function and the traffic salvaging function realized by the interworking control section 5b is called a second self-healing function.

The CPU 5 further includes a switching control section 5c as a new control function related to the present invention. The switching control section 5c performs control to cause the Ring APS function and Ring Interworking function to operate in cooperation with each other. According to the state of the failure, the switching control section 5c judges the following thing: whether the failure can be avoided using either the Ring APS function or the Ring Interworking function or whether the cooperation between the Ring APS function and Ring Interworking function is needed. The new control function is realized by, for example, the approach of putting patches on the existing control program. In the embodiment, the procedure carried out by the switching control section 5*c* will be explained in detail.

Figure 3:
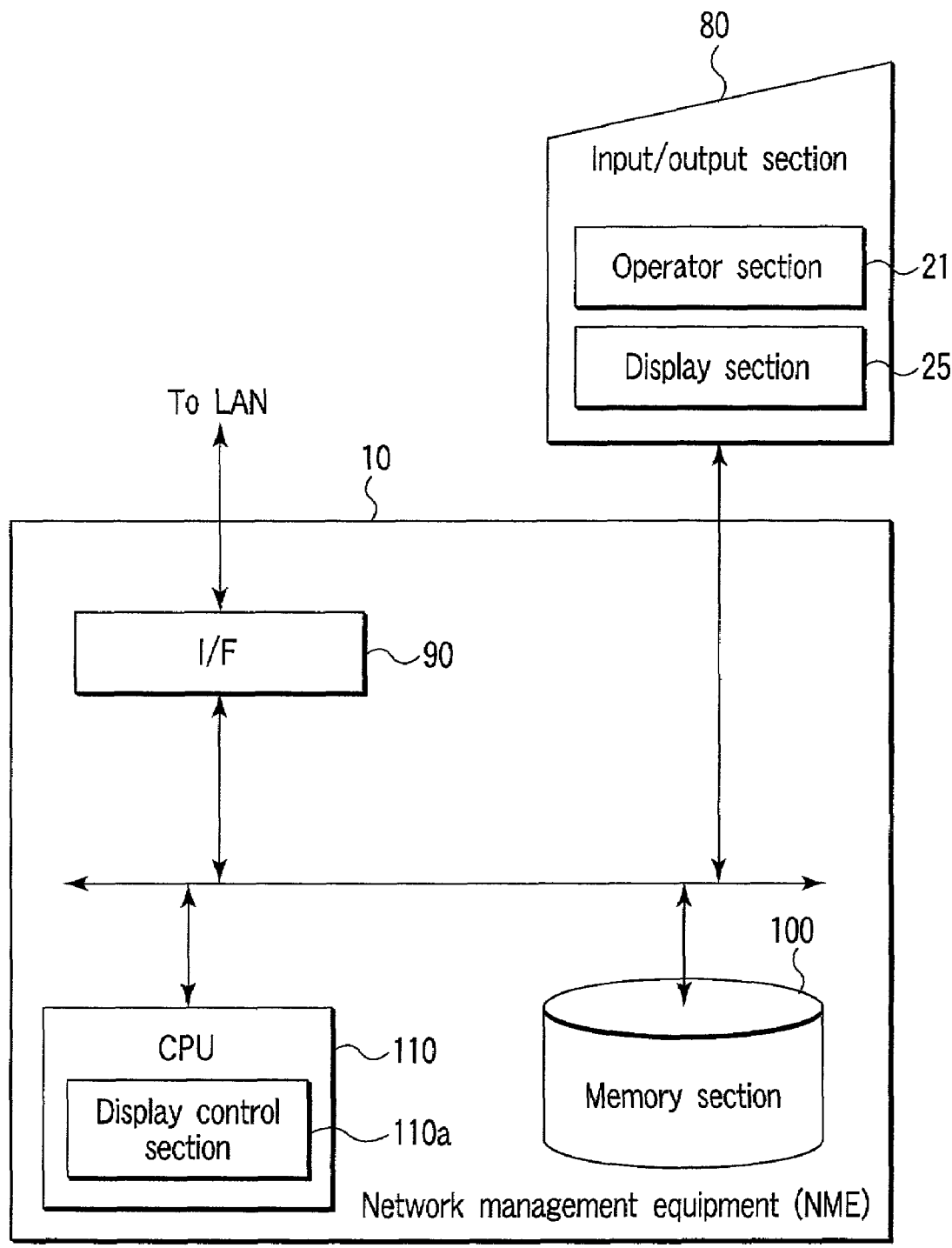
FIG. 3 is a functional block diagram showing the configuration of NME 10 in FIG. 1.

FIG. 3 shows the configuration of NME 10. NME 10 is, for example, a general-purpose workstation in which a dedicated application program has been installed. The main part of its function is realized using software. NME 10 comprises an input/output section 80, an interface (I/F) section 90, a memory section 100, and a CPU 110. The input/output section 80, which includes an operator section 21 and a display section 25, functions as a human-machine interface. The interface (I/F) section 90 acts as a connection interface with each of the nodes A to H via a LAN. The memory section 100 stores various monitoring control programs. The operator section 21 is realized using, for example, a mouse or a keyboard. The display section 25 is realized using a liquid-crystal display.

The CPU 110 includes a display control section 110*a*. The display control section 110*a* performs the entire display control of the display section 25, does calculations according to the operation (for example, clicking with the mouse) for the contents of the on the display section 25, and updates the contents of the on the display that reflects the notices from nodes A to H. In the embodiment, of the functions of the display control section 110*a*, the specification for display control including a path extending over ring networks will be particularly explained in detail.

The basic path setting procedure and switching procedure at nodes A to H will be explained. Suppose the operator has set a communication path using, for example, NME 10. Then, information about the operation is taken in by the CPU 5 via the HS I/F 1-0. On the basis of the information, the CPU 5 updates the Ring Map and Fabric in the memory unit 6.

Then, the CPU 5 sets TSA 2-0 in the switching state on the basis of the connection state information. By this setting, of the channels included in the signal received via the service-system HS I/F 1-0 from the service line SL, the ones that need not be dropped are caused to pass through to HS I/F 1-0 on the other side. Furthermore, TSA 2-0 connects the channels required to be dropped or added to the corresponding LS I/F 3-1 to 3-k.

On the other hand, it is assumed that nodes A to H have received alarm information from the monitoring section provided in each unit in themselves or a protection switching request for a transmission line due to the occurrence of a failure from another node. Then, the switching control section 5*a* judges the route of a communication path for causing the service traffic to avoid the failure. Then, the Ring Map and Fabric in the memory unit 6 are updated, thereby changing the setting state of TSA 2-0. This relieves the service traffic from the failure.

FIRST EMBODIMENT

A first embodiment of the present invention will be explained. In this embodiment, it is assumed that pieces of node equipment (hereinafter, referred to as nodes for the sake of simplicity) A to H each take the configuration of FIG. 2. Before explanation of the parts related to the characteristics of the present invention, general items determined in ITU-T Recommendation G. 842 will be explained.

<Explanation about General Items>

Ring interconnection is realized by connecting a plurality of ring networks by means of low-speed optical interfaces (STM-1E/1o/4o/16o/64o, where the subscript E means an electric interface and the subscript o means an optical interface). Explanation here will be given about a case where the specification described in ITU-T Recommendation G. 842, that is, "Dual Node Ring Interworking," is applied to the protection architecture of the connection part between ring networks.

Figure 4:
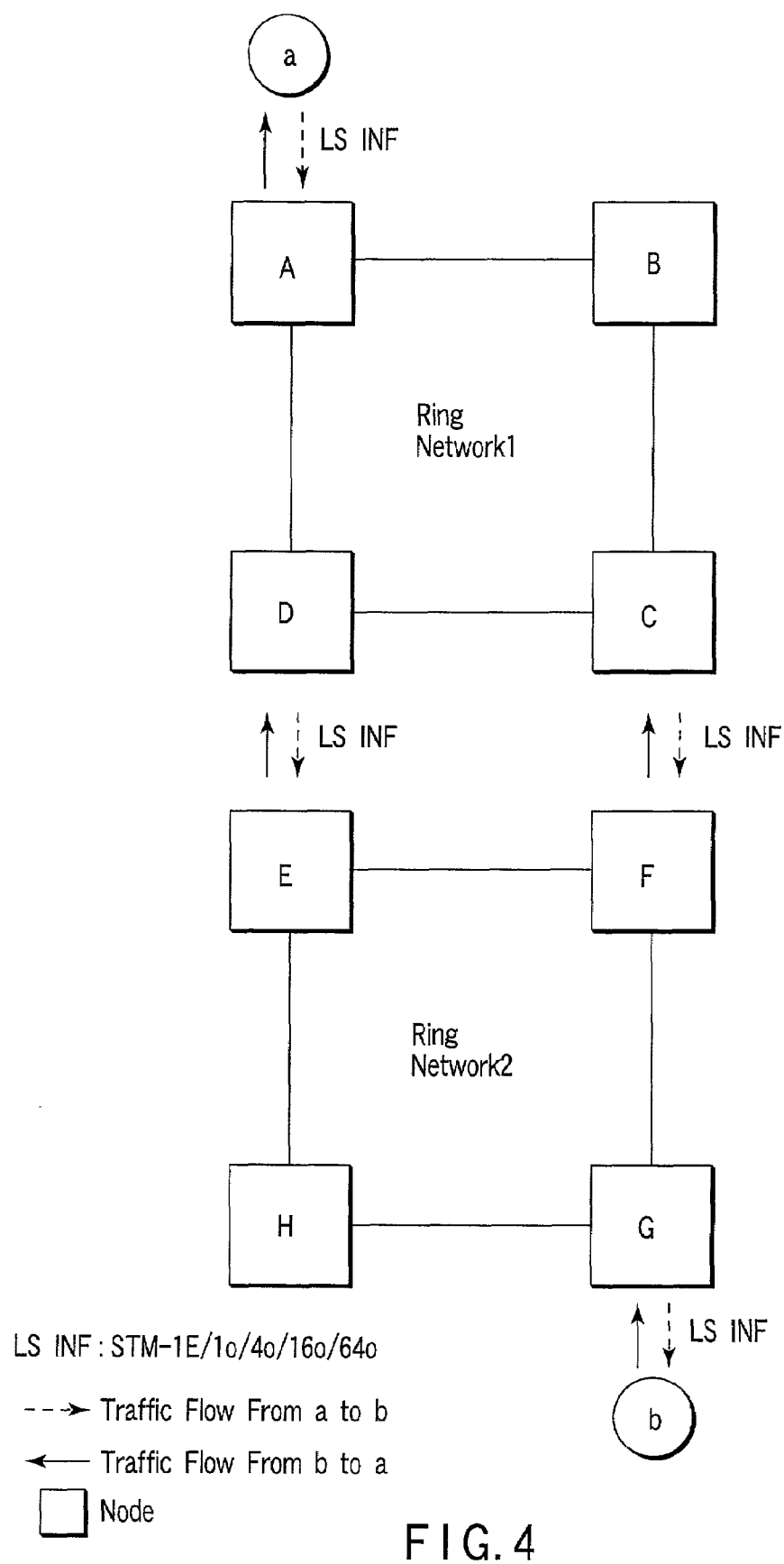
FIG. 4 shows Dual Node Interconnection.

FIG. 4 is a pictorial view of the system of FIG. 1. Although the system configuration of FIG. 1 is shown vertically in FIG. 4 for the sake of convenience, the reference characters and network topology are the same as those in FIG. 1. In FIG. 4, the reference letter (a) indicates an object corresponding to a lower-order group unit connected to node A and the reference letter (b) indicates an object corresponding to a lower-order group unit connected to node G. A solid-line arrow indicates the flow of traffic from (b) to (a) and a dotted-line arrow indicates the flow of traffic from (a) to (b).

The form of a network where a plurality of ring networks are connected via the low-speed interfaces (LS INF) of two nodes as shown in FIG. 4 is known as dual node interconnection. The interconnection nodes in FIG. 4 are nodes C, D, E, and F. A path protection operation using a dual node interconnection mechanism realizes dual node interworking.

Figure 5:
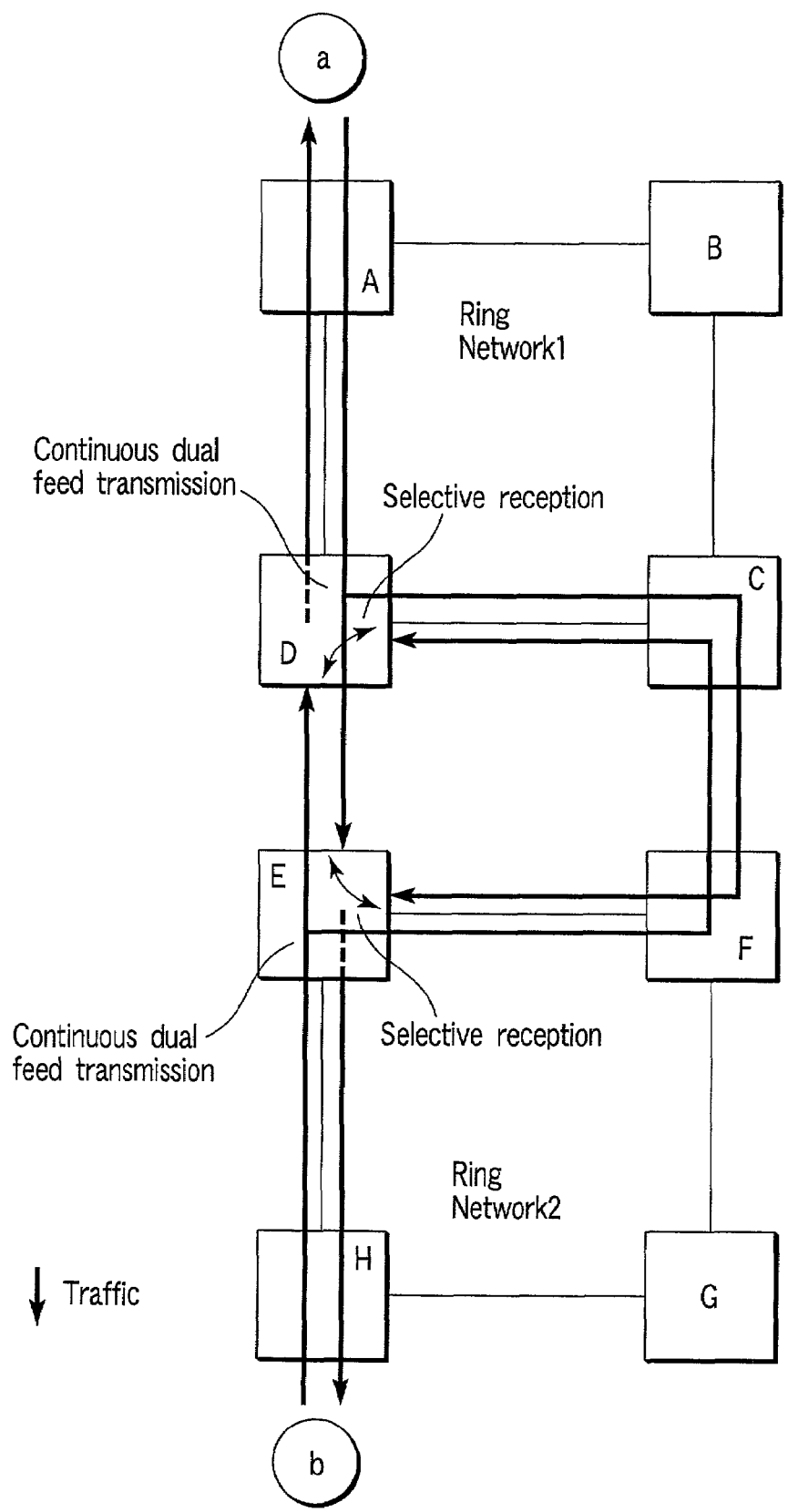
FIG. 5 shows Protection mechanism (Ring Interworking)

As shown in FIG. 5, in a straightforward expression, ring interworking is a protection mechanism for transmitting the same signal in parallel (that is, dual-feeding the same signal) from the interconnection nodes in one ring network and selectively receiving the dual-fed signal at the interconnection nodes in the other ring network, thereby relieving the traffic on a path basis. Therefore, the switching is realized only by the operation of selecting the reception. The form of path relief is unidirectional.

Figure 6:
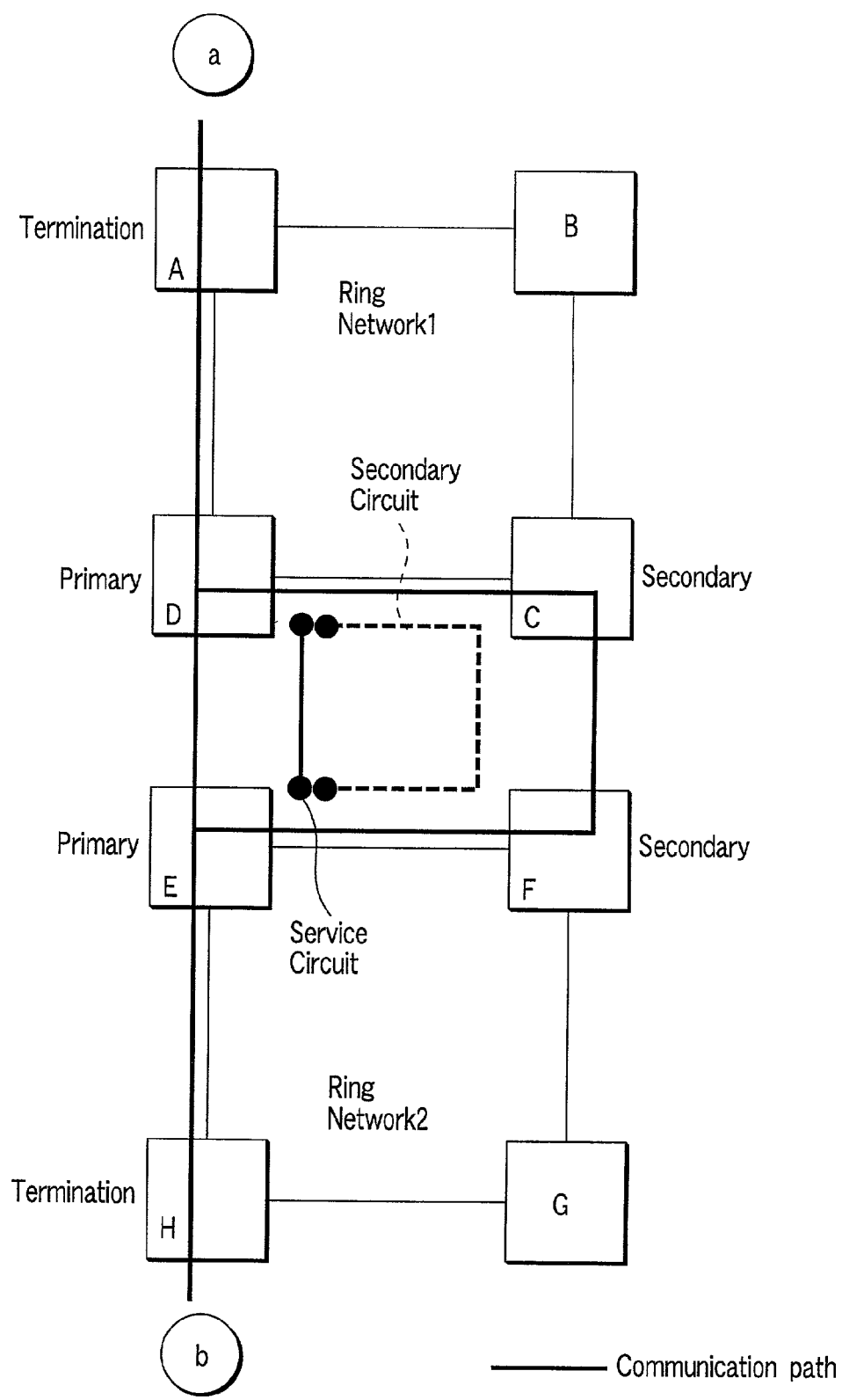
FIG. 6 shows Same Side routing.

As shown in FIG. 6, a node that dual-feeds (or drops and continues) the service traffic bidirectionally to the HS (high-speed) channel and the LS (low-speed) channel and selectively receives the service traffic from either the HS channel or LS channel is defined as a primary node. The primary node has the right to select the traffic supplied from two routes, that is, a choice of traffic. In FIG. 6, node D and E correspond to primary nodes.

A node that forms a backup route (that is, a protection route) previously prepared to detour the service traffic is defined as a secondary node. A node that terminates a path set over two ring networks is defined as a termination node. In FIG. 6, nodes C and F are secondary nodes and nodes A and H are termination nodes.

In ring interworking, a working route and a protection route are determined when a communication path is set. A working route is defined as a service circuit and a protection route is defined as a secondary circuit. These routes are determined on the basis of the form of the paths in the interconnection part composed of two pairs of interconnection nodes. For example, in FIG. 6, the route connecting node D and node E is a service circuit and the route connecting nodes D, C, F, and E is a secondary circuit. The path form shown in FIG. 6 is called "Same Side routing".

Figure 7:
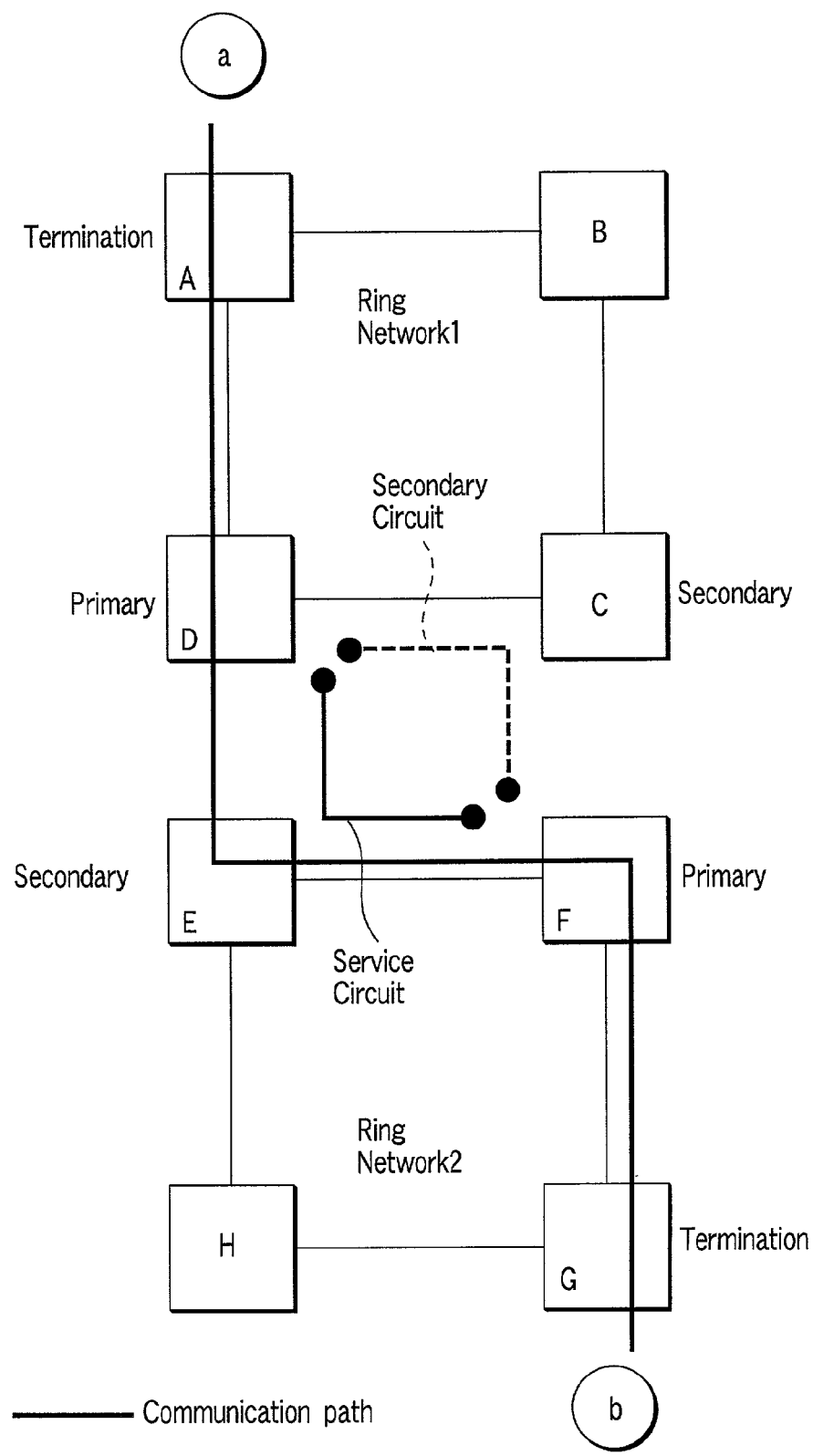
FIG. 7 shows Opposite Side routing.
Figure 8:
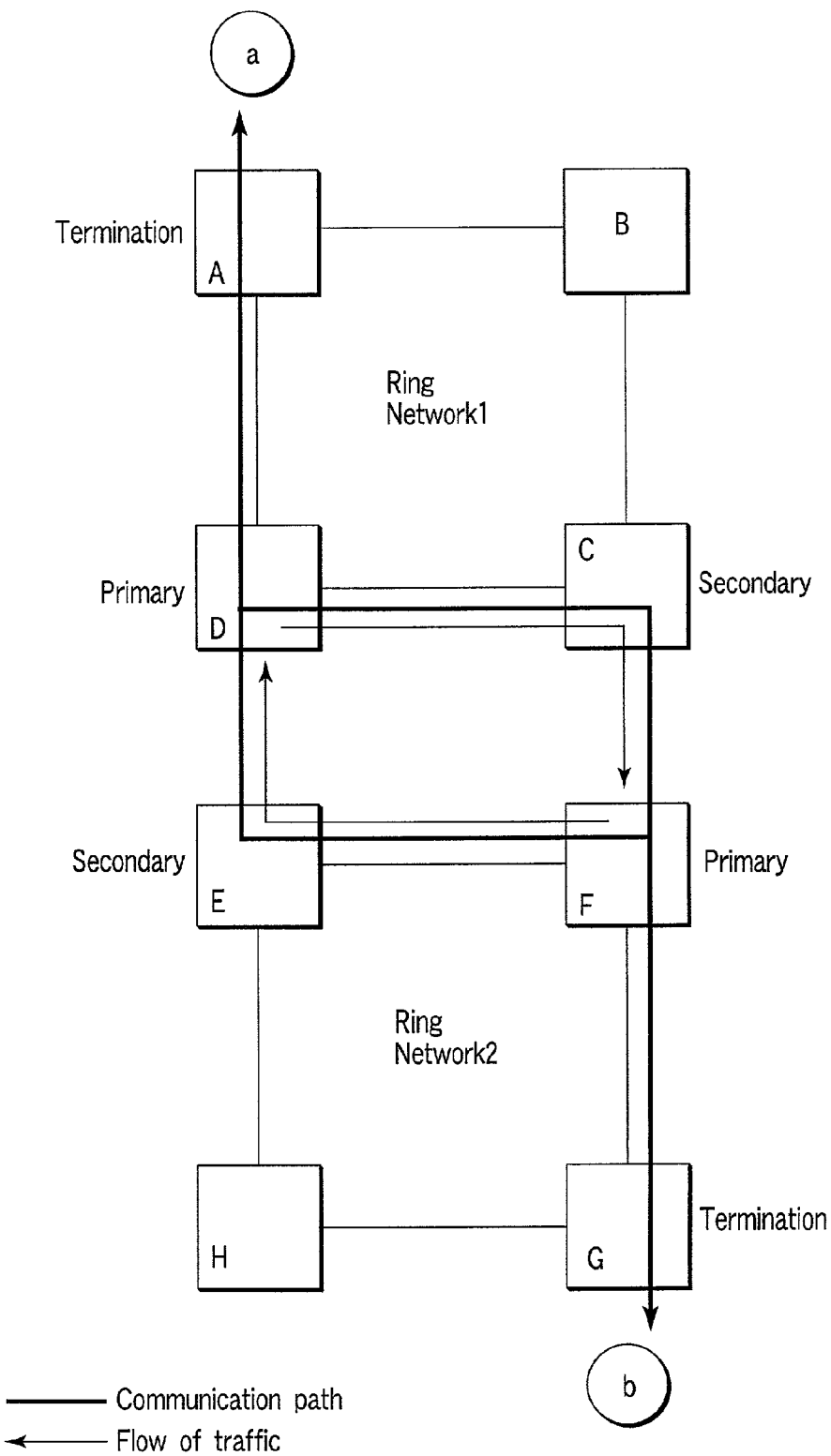
FIG. 8 shows Diverse Routing.
Figure 9:
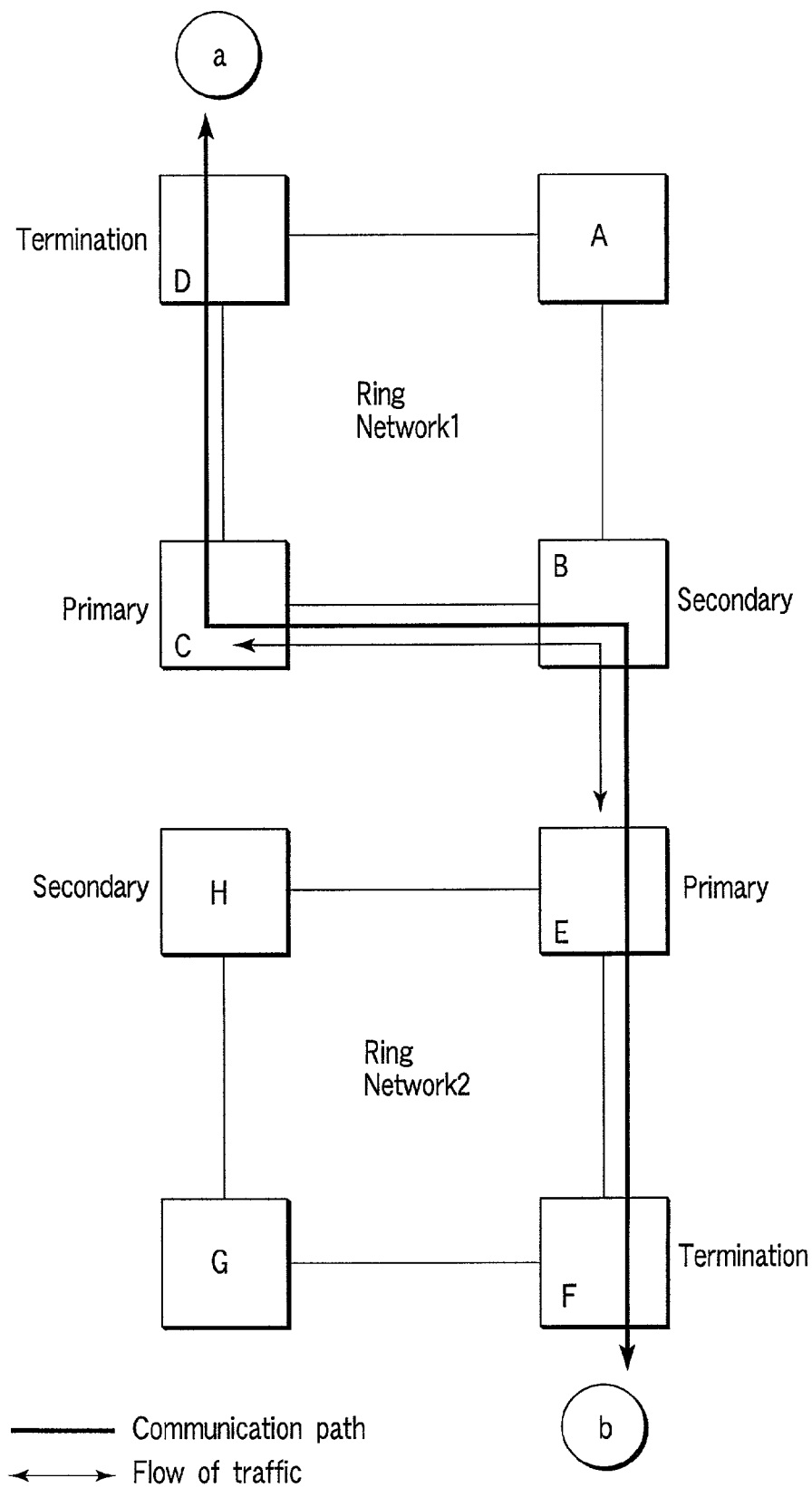
FIG. 9 shows UniForm Routing.

On the other hand, in FIG. 7, the route connecting nodes D, E, and F is a service circuit and the route connecting nodes D, C, and F is a secondary circuit. The path form shown in FIG. 7 is called "Opposite Side routing". In the path form of Opposite Side routing, Diverse Routing and Uniform Routing can be defined by the traffic route at the interconnection part. The path form of Diverse Routing is shown in FIG. 8 and that of Uniform Routing is shown in FIG. 9. When the network is controlled, no consideration is given to the difference between Diverse Routing and Uniform Routing.

Figure 10:
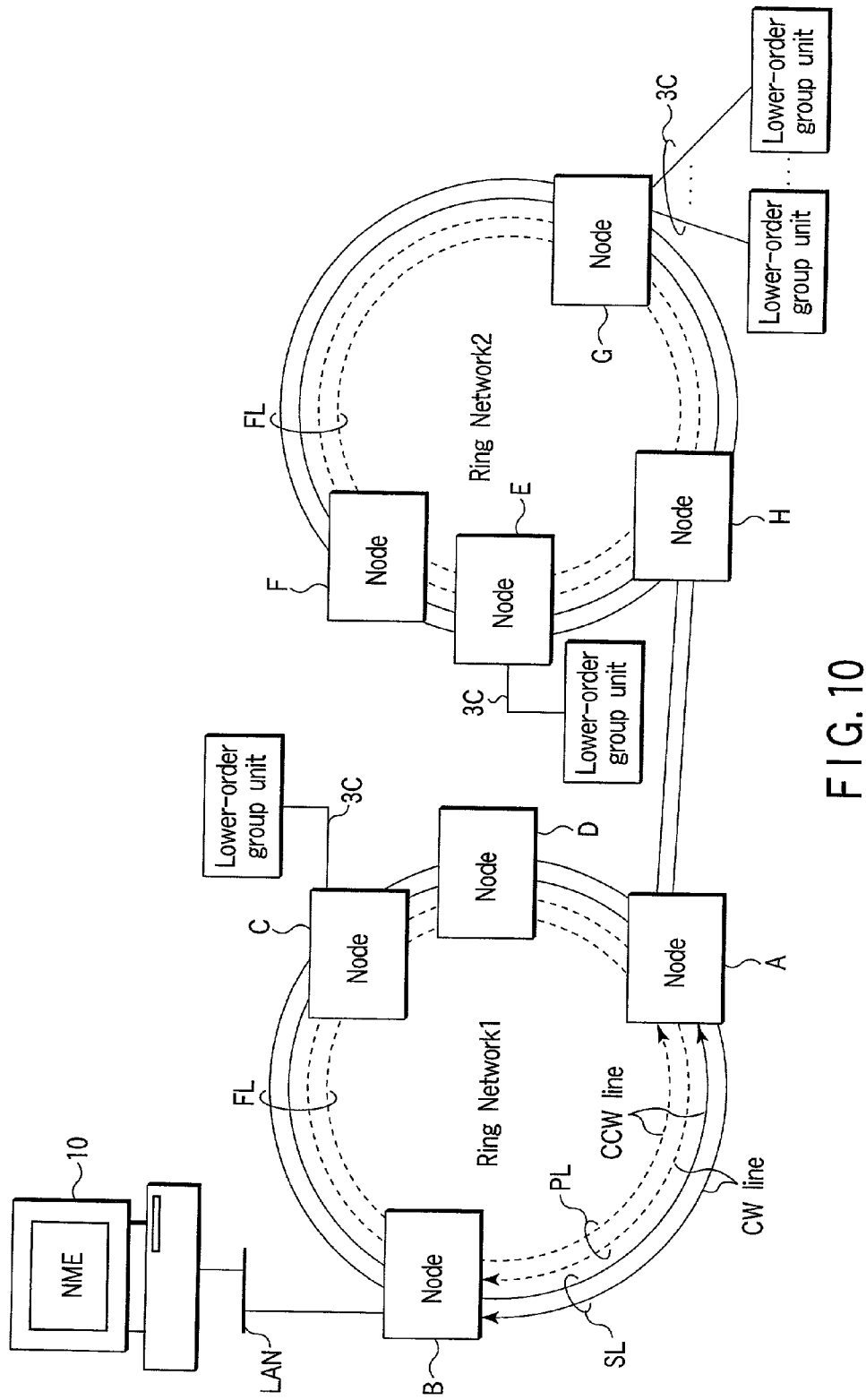
FIG. 10 shows Dual Node Interconnection (Single Node Interconnection)

In addition to the configuration of FIG. 1, there is a form where node A and node H are interconnected as shown in FIG. 10. Since in this configuration, a single node is related to interconnection in each ring network, it is called single node interconnection. Furthermore, although not shown, it is possible to provide a form where two or more nodes are interconnected in each ring network.

<When a Failure has Occurred between Node A and Node D>

Hereinafter, Dual Node Interworking based on Annex A to ITU-T Recommendation G. 841 will be explained. When a Ring APS function complying with Annex A to ITU-T Recommendation G. 841 is operated, a model different from the above-defined model must be newly defined. Taking into account a case where the Ring APS is in operation, a definition related to dual node interworking at the time of the operation of the Ring APS will be described.

The definitions of the primary node, secondary node, service circuit, and secondary circuit differ, depending on the path form of the dual node interconnection part and to which section the Ring APS function performs ring switching. More specifically, the functional definitions of the primary node and secondary node do not change. Only the physical positions of nodes having the primary or secondary function are defined again. When switching in the equipment is done or the LS-APS function operates, there is no need to define the node function again.

(In the Case of Same Side Routing)

Figure 11:
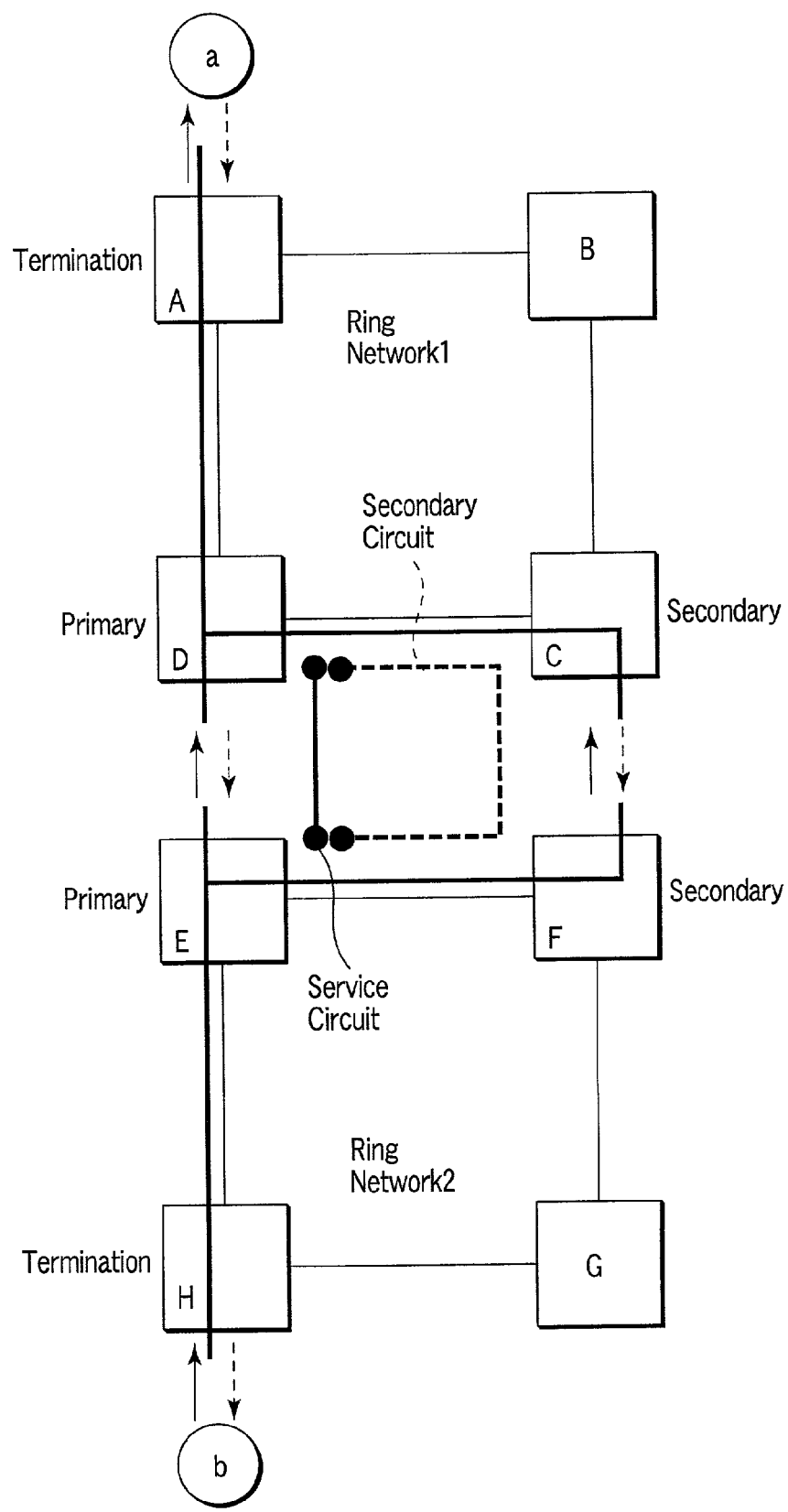
FIG. 11 shows a state of the Same Side routing in the initial setting.

FIG. 11 shows a state of the Same Side routing in the initial setting. In FIG. 11, nodes D and E are primary nodes, nodes F and E are secondary nodes, and nodes A and H are termination nodes. FIG. 11 shows the normal state, that is, the HS Side Fault Free State.

Figure 12:
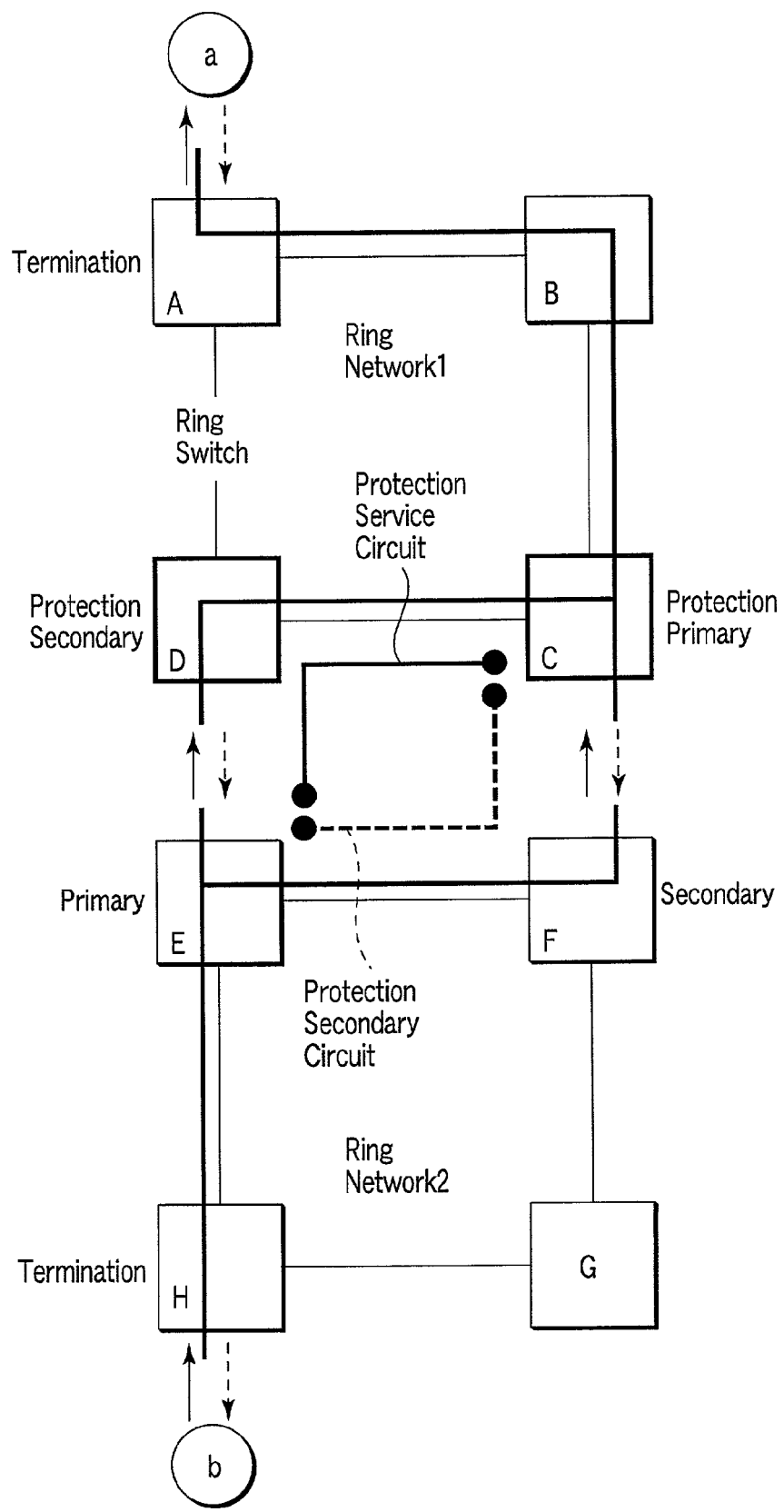
FIG. 12 shows the way that a secondary node is changed to a protection primary node on the Same Side routing.

FIG. 12 shows a case where an event that requests Ring Switch occurs between nodes A and D in the normal state of FIG. 11. The event is a case where failures occur in both of the service line SL and protection line PL in the segment or a case where NME 10 gives such a command as Forced Switch.

In FIG. 12, when the occurrence of the event has started Ring APS and Ring Switching has been done in the segment AD (the section between node A and node D, the same holds true in the explanation below), the traffic route is restored to a segment other than the segment AD. From this time on, a node acting as a secondary node carries out the function of a primary node. The node is newly defined as a protection primary node.

Conversely, after the ring switching has been completed, a node acting as a primary node before the ring switching carries out the function of a secondary node. The node is newly defined as a protection secondary node.

In FIG. 12, node C is redefined as a protection primary node and node D is redefined as a protection secondary node.

Furthermore, according to the change of the node having the right to select traffic, the working route is newly defined as a protection service circuit as shown in FIG. 12. In addition, the backup route is newly defined as a protection secondary circuit.

In the Case of Opposite Side Routing

FIG. 13 shows a state of the Opposite Side routing in the initial setting. In FIG. 13, nodes D and F are primary nodes, nodes C and E are secondary nodes, and nodes A and G are termination nodes. FIG. 13 shows a model in the normal state (the HS Side Fault Free State).

Figure 14:
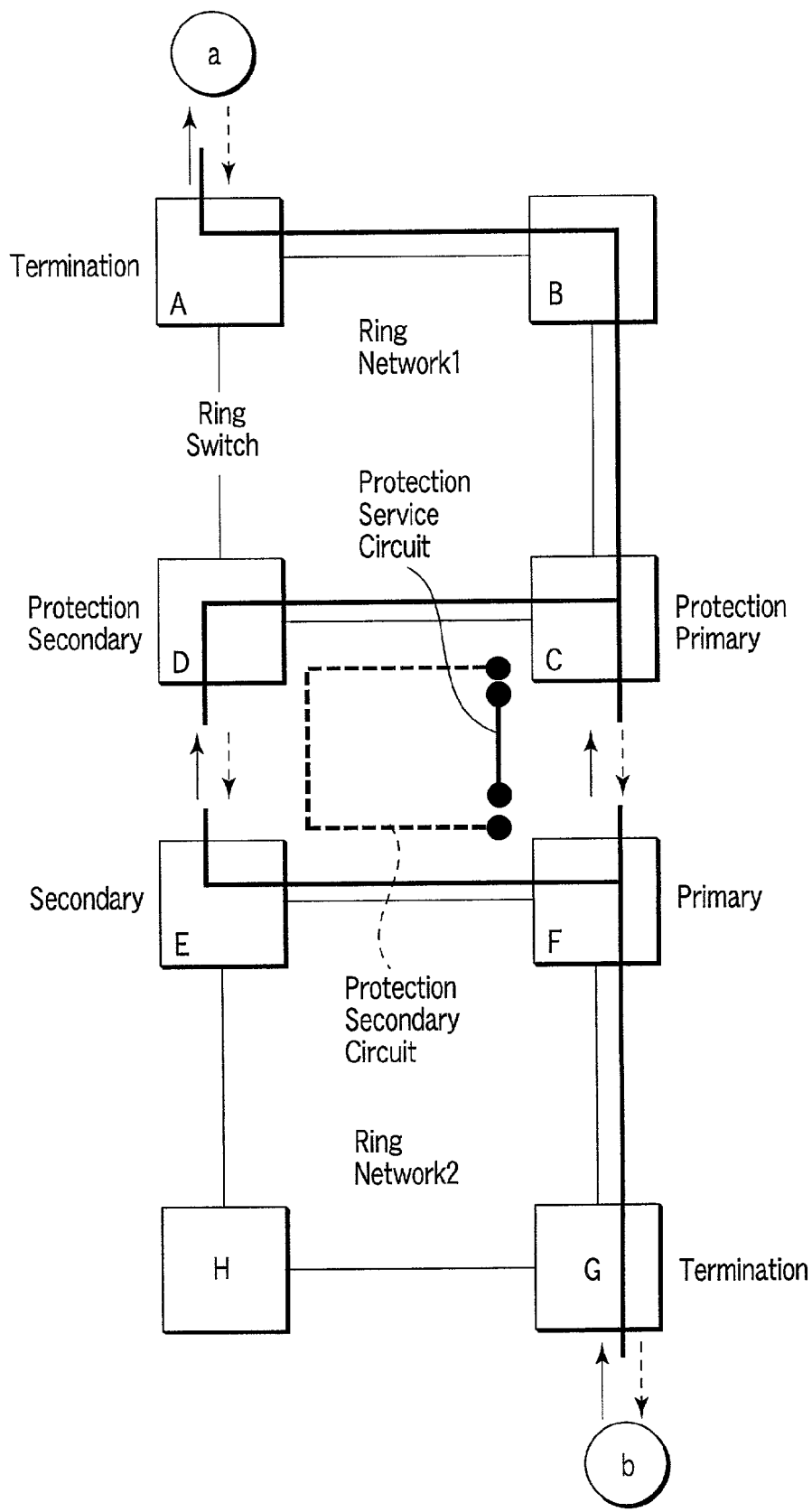
FIG. 14 shows the way that a secondary node is changed to a protection primary node on the Opposite Side routing.

FIG. 14 shows a case where an event that requests Ring Switching occurs between nodes A and D in the normal state of FIG. 13. In FIG. 14, when the occurrence of the event has started Ring APS and Ring Switching has been done in the segment AD, the traffic route is restored to a segment other than the segment AD. As in FIG. 12, node C is redefined as a protection primary node and node D is redefined as a protection secondary node.

Here, attention should be given to the following point. In the normal state of FIG. 11, the primary node choices the service circuit. In this state, there is no protection switching request about ring interworking. In FIG. 12, too, the protection primary node choices the protection service circuit. In this state, too, there is no protection switching request.

That is, even when the Ring APS function has started the ring switching, it does not request switching to the Ring Interworking function. Although the physical position of the primary node is changed as a result of the operation of the Ring APS function, the traffic selection state at the interconnection part remains unchanged. As shown in FIGS. 13 and 14, the same holds true when the path connection form is the Opposite Side routing.

<When a Failure has Occurred between Node C and Node D>

Figure 15:
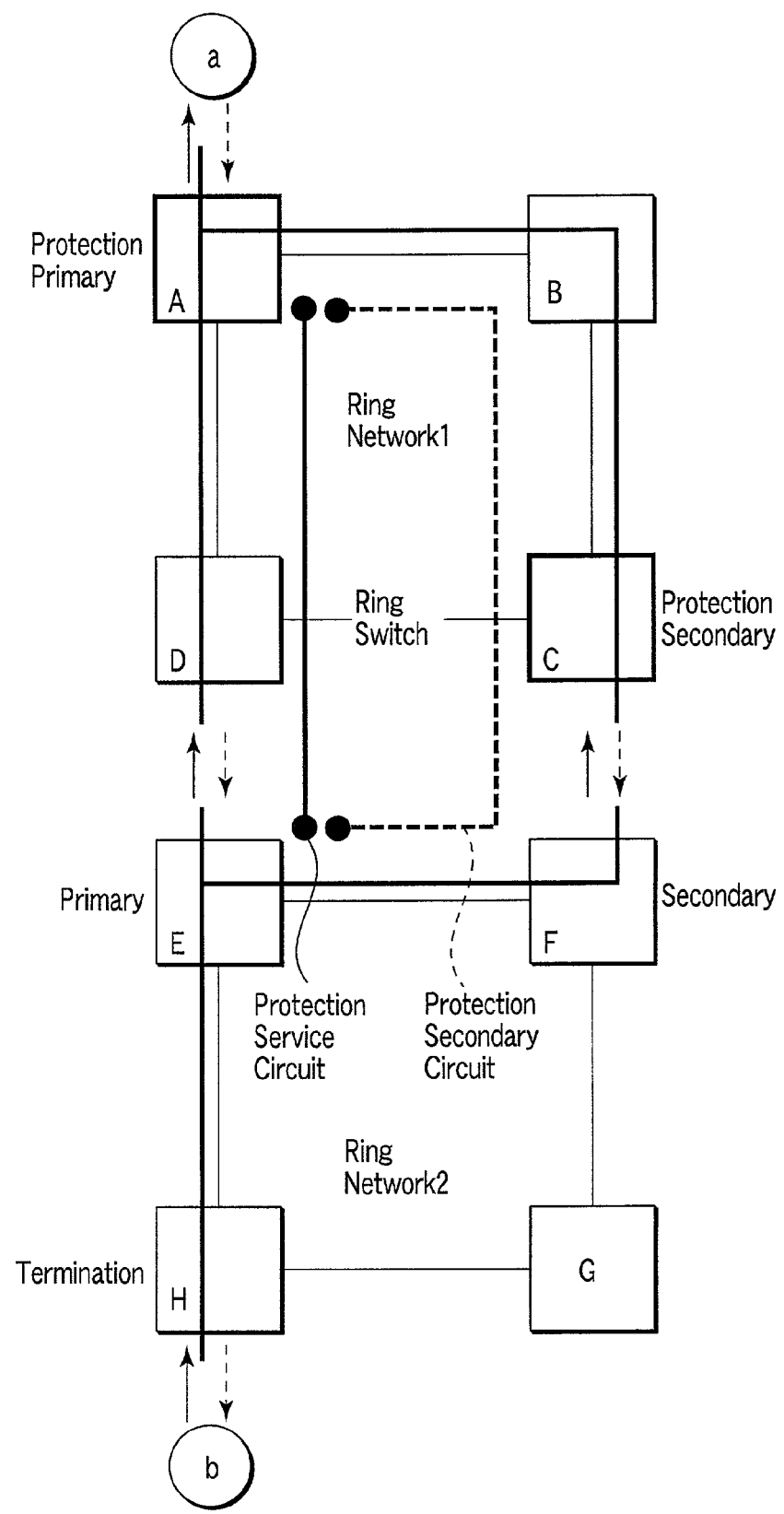
FIG. 15 shows the way that a termination node is changed to a protection primary node on the Same Side routing.

FIG. 15 shows a state where ring switching has been completed in the segment CD in the normal state of FIG. 11. After ring switching has been completed in the segment CD, the secondary circuit is restored to a protection secondary circuit in a segment other than the segment CD.

From this time on, the function of the primary node is performed by a node which was a termination node before the switching. This node, too, is defined as a protection primary node. The function of the secondary node is performed by a node which was a secondary node before the switching. This node, too, is defined as a protection secondary node. In FIG. 15, node A is redefined as a protection primary node and node C is redefined as a protection secondary node.

Furthermore, as shown in FIG. 15, the working route is newly defined as a protection service circuit. The protection route is newly defined as a protection secondary circuit.

Figure 16:
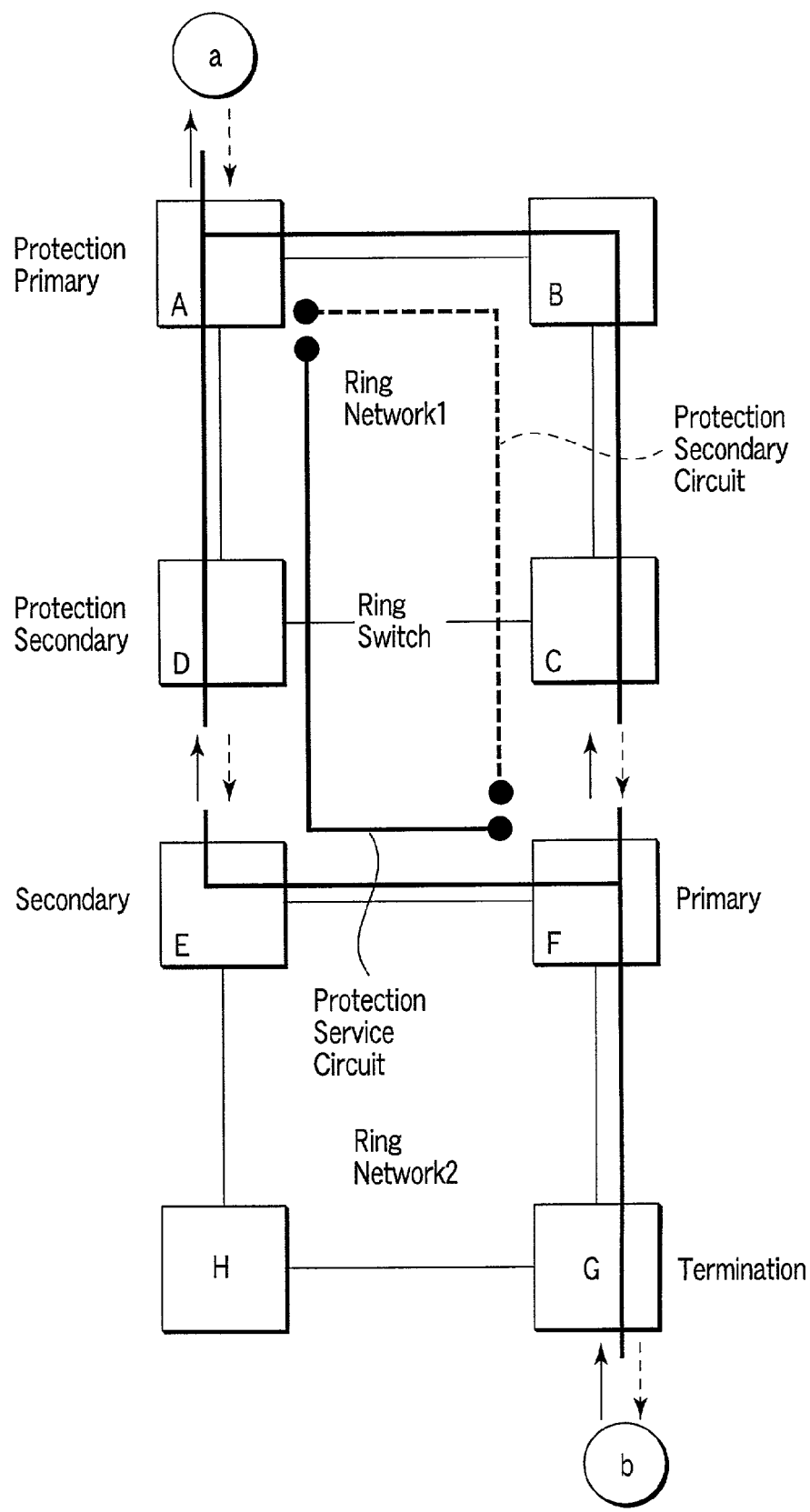
FIG. 16 shows the way that a termination node is changed to a protection primary node on the Opposite Side routing.

FIG. 16 shows a state where ring switching has been done in the segment CD in the normal state of FIG. 13. After the ring switching has been completed in the segment CD in FIG. 16, the secondary circuit is restored to a protection secondary circuit in a segment other than the segment CD. At this time, node A is redefined as a protection primary node and node C is redefined as a protection secondary node.

Here, attention should be given to items similar to those described above. In FIG. 15, the protection primary node choices the protection service circuit. In this state, there is no protection switching request. Therefore, even when the Ring APS function has started ring switching, it does not request switching from the Ring Interworking function.

When a Failure has Occurred between Node D and Node E

Next, a case where a failure has occurred between node D and node E, a part of the interconnection will be explained. In this case, it is necessary to avoid the failure by a composite operation of the Ring Interworking function and Ring APS function. The Ring APS function performs a protection operation on the path route created by a path setting function (which is a known functional object) in the network. For this reason, care should be taken when the present path state differs from the state set by the path setting function. That is, when the Ring Interworking function has selected the secondary circuit, the switching sequence by APS needs to be modified suitably.

Figure 17:
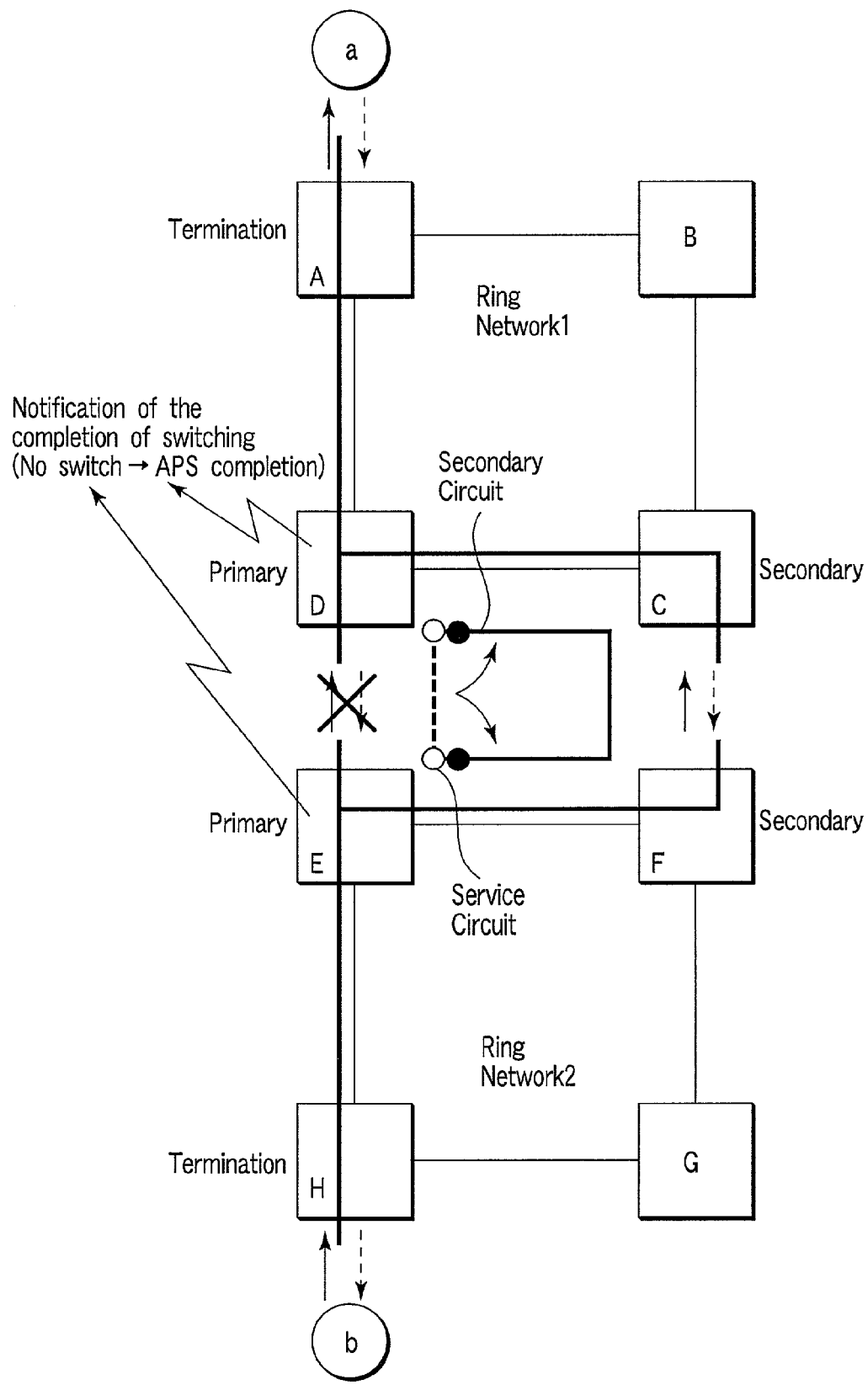
FIG. 17 shows a state where the Ring Interworking function operates as a result of an LS interface failure.

First, when a failure has occurred in the LS interface of the interconnection part in the state of FIG. 11, the Ring Interworking function is started. For instance, a failure has occurred in the segment DE, primary nodes D and E, select the secondary circuit as shown in FIG. 17.

Figure 18:
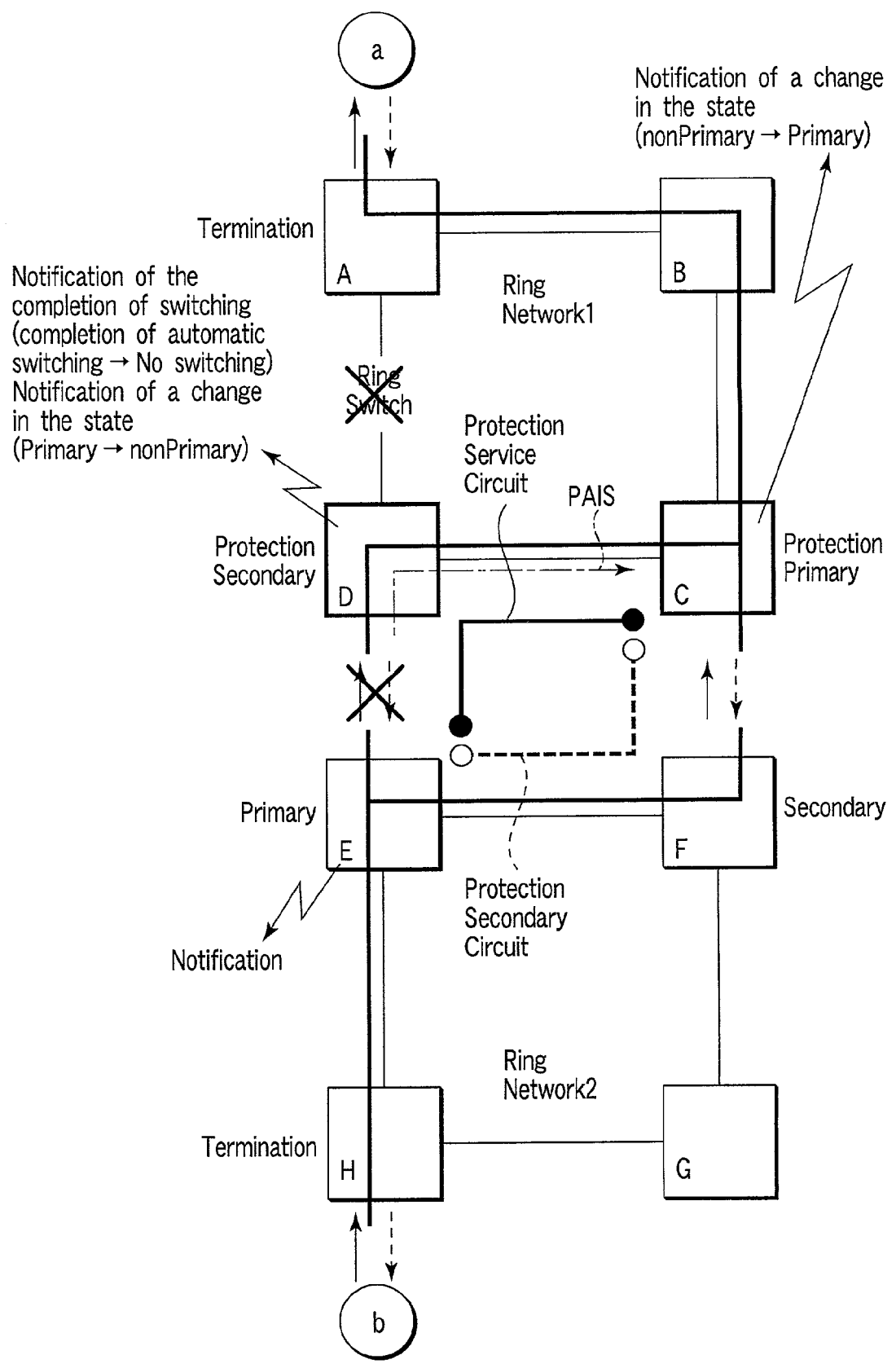
FIG. 18 shows an operation performed by Ring APS when the Ring Interworking function is in operation.

Next, a case where an HS interface failure has occurred in the state of FIG. 17 will be explained by reference to FIGS. 18 and 19. When an HS interface failure has occurred in the state of FIG. 17, the Ring APS function starts ring switching. FIG. 18 shows a case where a ring failure has occurred in the segment AD. However, the Ring APS function performs ring switching on a path of the Drop and Continue with Add form, a default path form, regardless of the switching state of the Ring Interworking Function. That is, since the Ring APS function tries to cause the path to detour to the protection service circuit in which a failure has developed, it is not desirable.

In the embodiment, to avoid the problem, the APS function supplies control information to the Ring Interworking function after the restoration of Ring APS. Then, the Ring Interworking function provided for each node is caused to recognize whether the state of its own node is a protection primary node or a protection secondary node. The place where a failure has developed, the identifier for a path in the restored state, or the like may be used as control information.

It is desirable that the exchange of control information between the APS function and Ring Interworking function should be realized in a closed form within a node. That is, in the embodiment, the exchange of control information between functional objects is made within a node. By doing this, there is no need to newly set the exchange of information between different nodes. In addition, communication between the Ring Interworking functions of different nodes is not needed.

To cause the Ring Interworking function of each node to recognize the state of its own node, there are two methods. One method is to supply control information to the Ring Interworking function and cause the Ring Interworking function to calculate the state. The other method is to cause the APS function to calculate the state of the node and inform the Ring Interworking function of the result.

When the Ring Interworking function which has received a notification of control information senses a path alarm, such as P-AIS (Pass Alarm Indication Signal), the protection primary node starts switching by Ring Interworking. As shown in FIG. 19, as a result of the Ring Interworking switching, node C, a protection primary node, selects the protection secondary circuit. When this state is reached, the path can be relieved without inducing misconnection.

Figure 19:
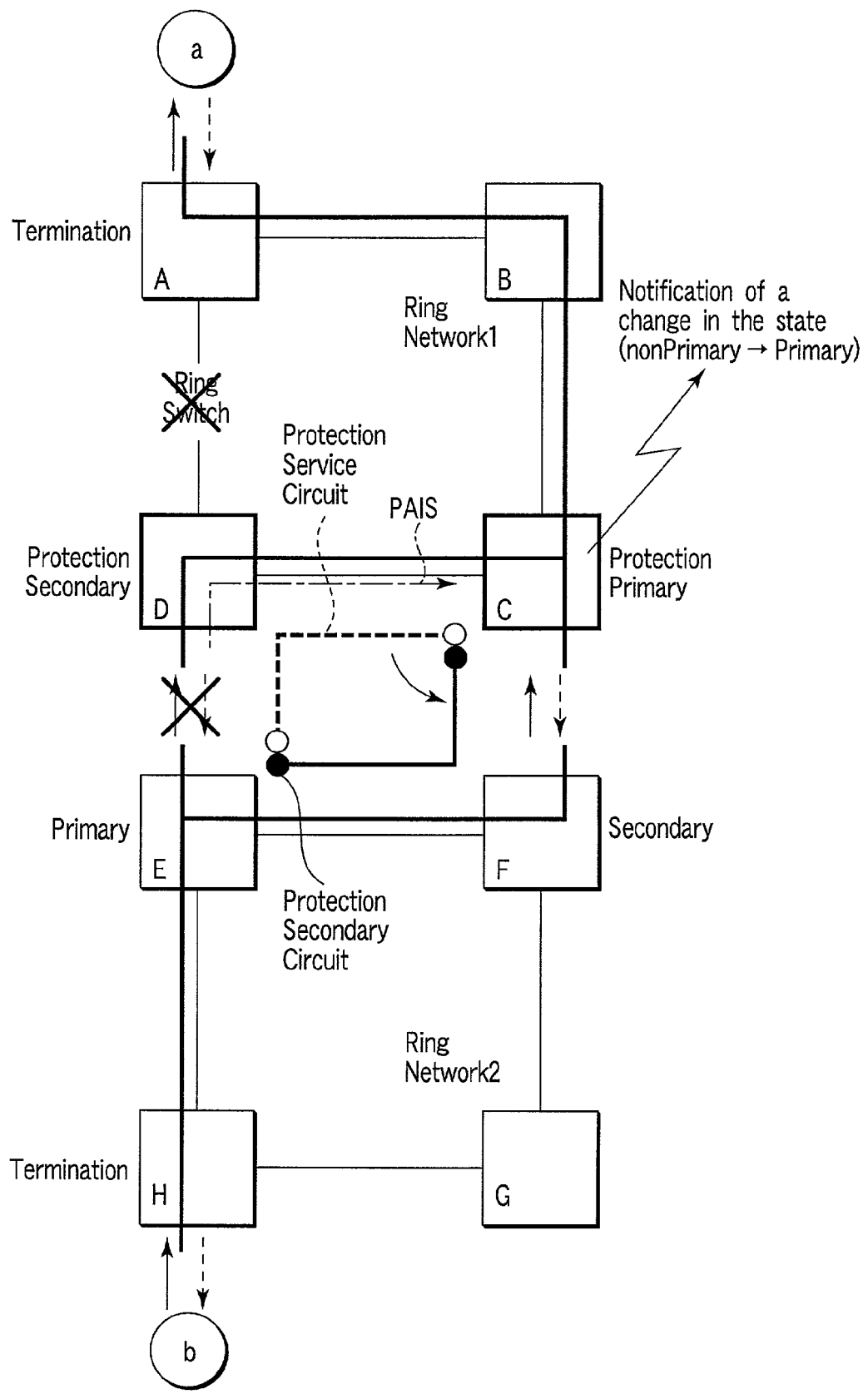
FIG. 19 shows a final state of restoration when complex switching has been done.

The P-AIS may be obtained from the LS interface side or HS interface side as shown in FIGS. 18 and 19.

The place from which the P-AIS is obtained changes according to the setting state of TSA 2-0 of the node.

As described above, the APS function supplies control information to the Ring Interworking function and operates the Ring APS function and Ring Interworking function in a composite manner, thereby enabling the service path to be restored.

Attention should be paid to the switching completion time when the Ring APS function operates after the Ring Interworking function has operated. According to Recommendation G. 841, the switching completion time permitted in Ring APS is up to 300 ms (including transmission delay). Since the above-described method realizes restoration with the mechanism where the Ring Interworking function and Ring APS function operate in a composite manner, it is necessary to totalize the switching time of each of the two functions and estimate the final switching completion time.

Arrows shown in FIG. 17 indicate notifications sent from the individual nodes to NME 10. The arrows extending from node D and node E in FIG. 17 are marked with (no switch request→APS complete), which is a notification to inform of the completion of switching.

Next, a method of selecting a secondary circuit using an external command will be explained. In the embodiment, a switch request command and a reverse request from an external OS (Operation System), such as NME 10, are supplied to a primary node. In the state where Ring APS is in a restoration operation, let a destination node to which a command is given be a protection primary node.

<When a node Failure has Occurred at Node D>

Figure 20:
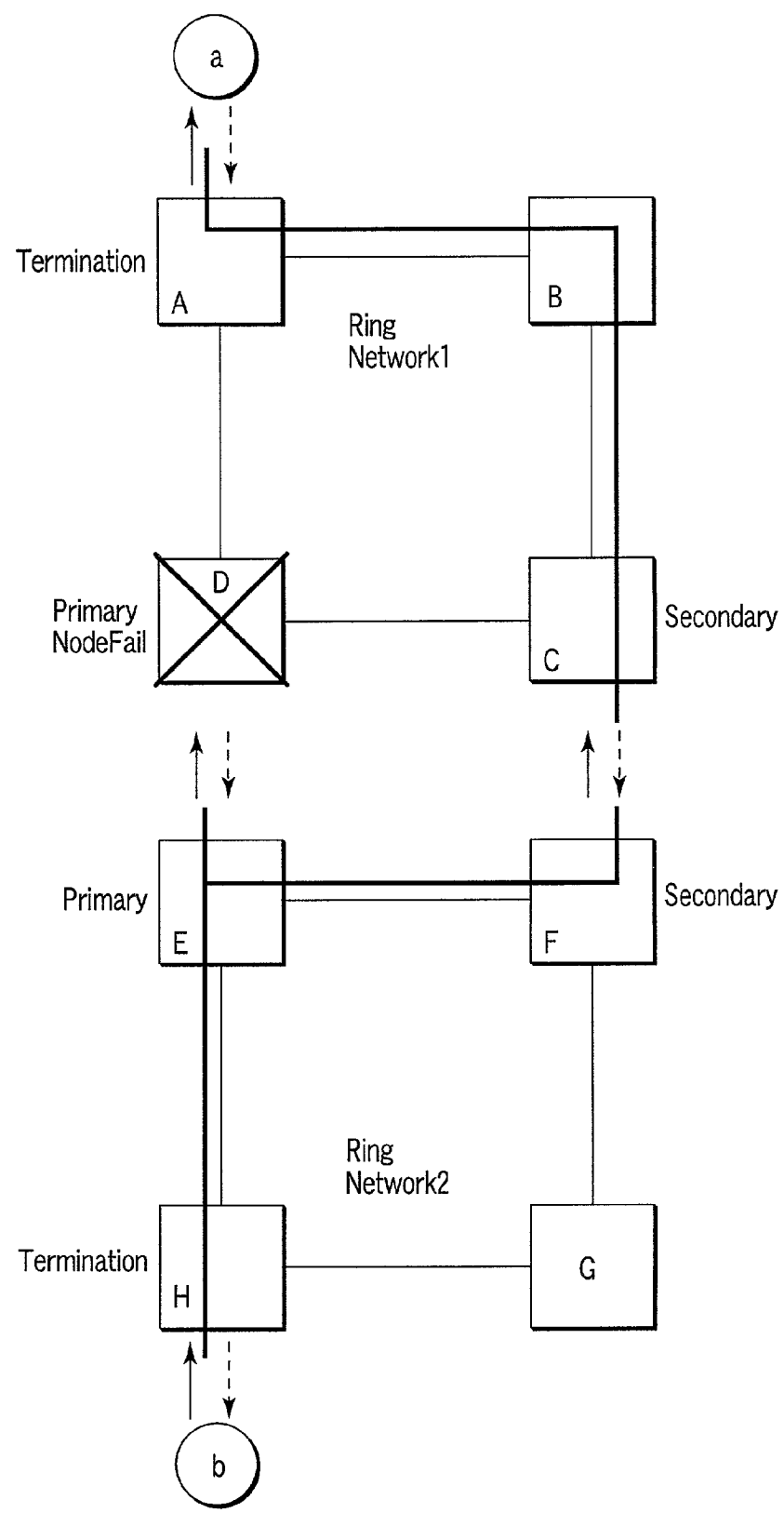
FIG. 20 shows a state of a restoration at the time of a node failure.

Next, referring to FIG. 20, the operation at the time of a node failure or node isolation (that is, a transmission line failure where a node is isolated) will be explained. When a failure has occurred in node D in the state of FIG. 11, ring switching is done as shown in FIG. 20 and the service traffic is restored.

In a network configuration with ring interconnections, since the form of path connection is special, use of the dual node interconnection form enables the restoration of the service traffic. In the embodiment, when ring APS is in operation, the restoration as shown in FIG. 20 is performed.

<State Notifying Function of each Node>

The monitoring function of each node in the embodiment will be explained. Each node is constantly monitoring the state of the service circuit and the state of the secondary circuit (that is, the state of the occurrence of a failure). Furthermore, when each type of protection function (that is, ring APS, in-system switching, or LS-APS) is started, each node changes the monitoring position according to the operating state of the protection function. When in-system switching or LS-APS function is started, each node monitors the service circuit and secondary circuit. When the Ring APS function has operated, each node monitors the protection service circuit and protection secondary circuit.

Next, the notifying function of each node in the embodiment will be explained. To inform the operator of its state, the primary node, secondary node, protection primary node, and primary secondary node send various notifications to an external OS. Notifications include a notification of path route creation, a state notification to notify a primary node for each path, and a notification of switching/revertive switching drawrepresenting the state of the path protection in Ring APS.

Figure 21:
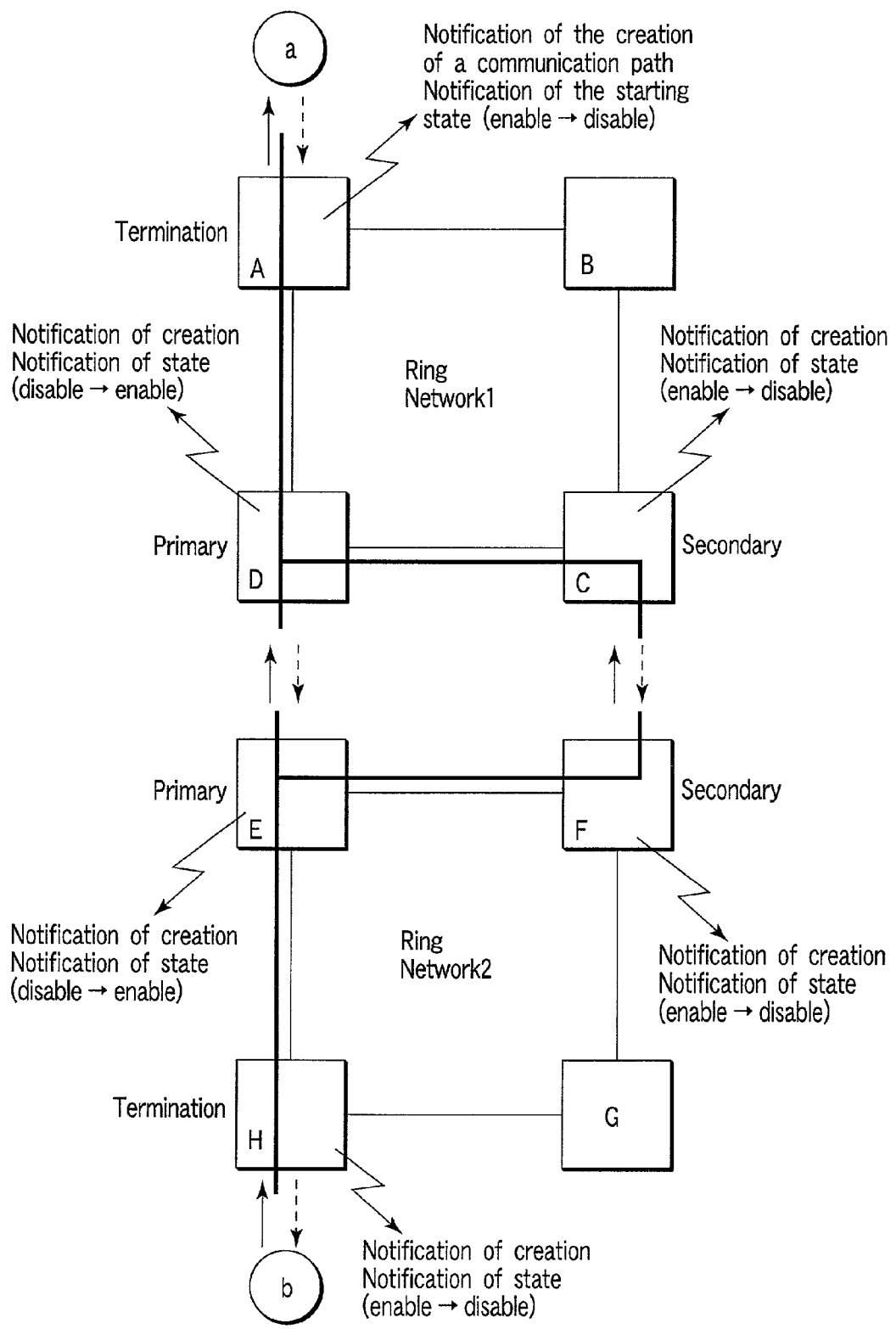
FIG. 21 shows a notification sent at the time of path setting.

FIG. 21, which shows a notification at the time of path creation, corresponds to the state where the paths of FIG. 11 have been set. At this time, any of the nodes A, C, D, E, F, and H sends a notification of communication path creation to NME 10. Nodes D and E, primary nodes, send a state notification (disable→enable) and inform NME 10 that they have the right of selecting traffic. Nodes C and F, secondary nodes, send a state notification (enable→disable) and inform NME 10 that they do not have the right of selecting traffic. Nodes A and H, termination nodes, send a state notification (enable→disable) and inform NME 10 that they do not have the right of selecting traffic.

Figure 22:
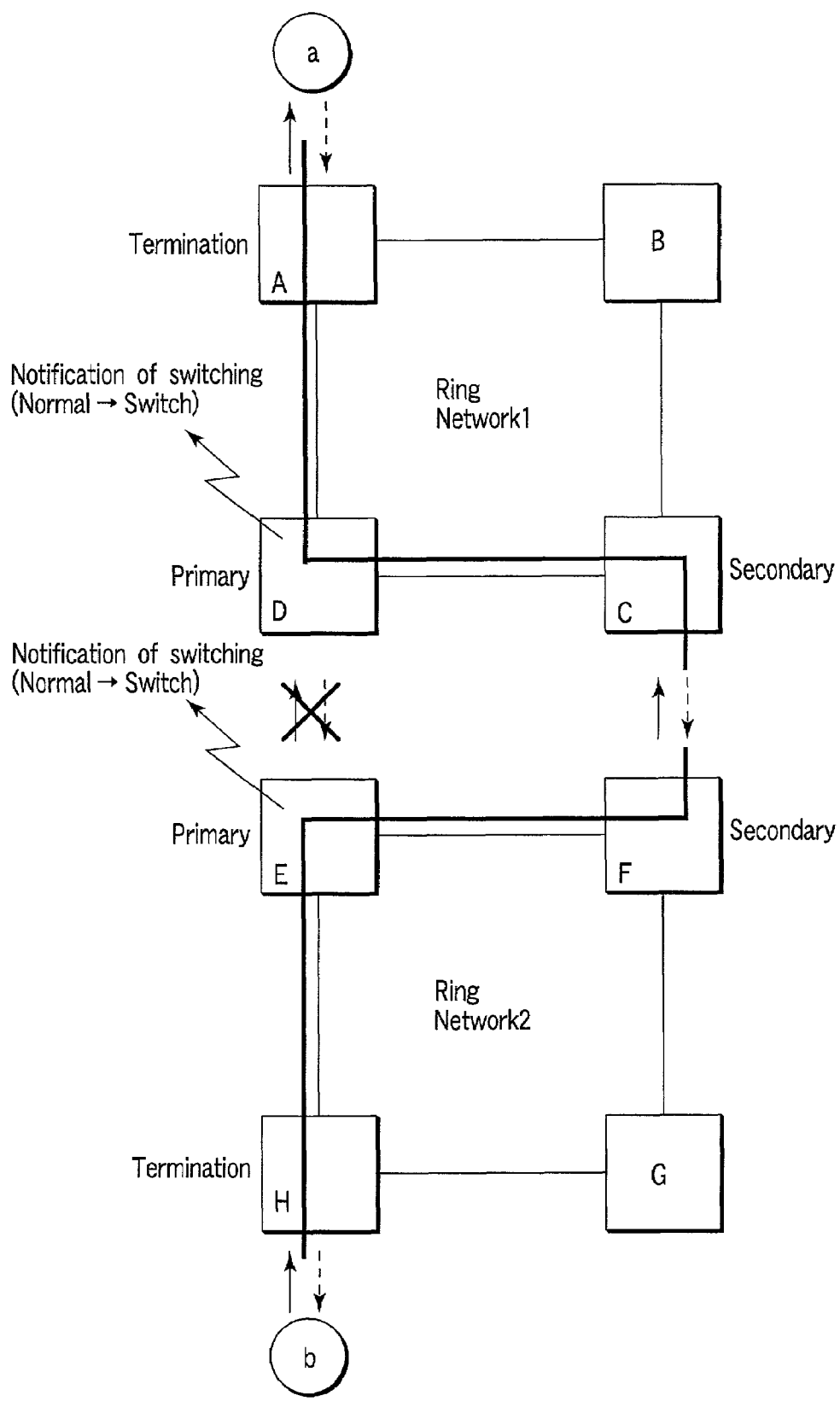
FIG. 22 shows a notification given when the Ring Interworking function is in operation.

FIG. 22, which shows a notification sent when the Ring Interworking function operates, corresponds to the state of FIG. 17. Nodes D and E, primary nodes, send a switching notification (normal→switching) to inform that they are in the switching state. A switching completion notification (no switching automatic switching complete) of FIG. 17 has a similar meaning.

Figure 23:
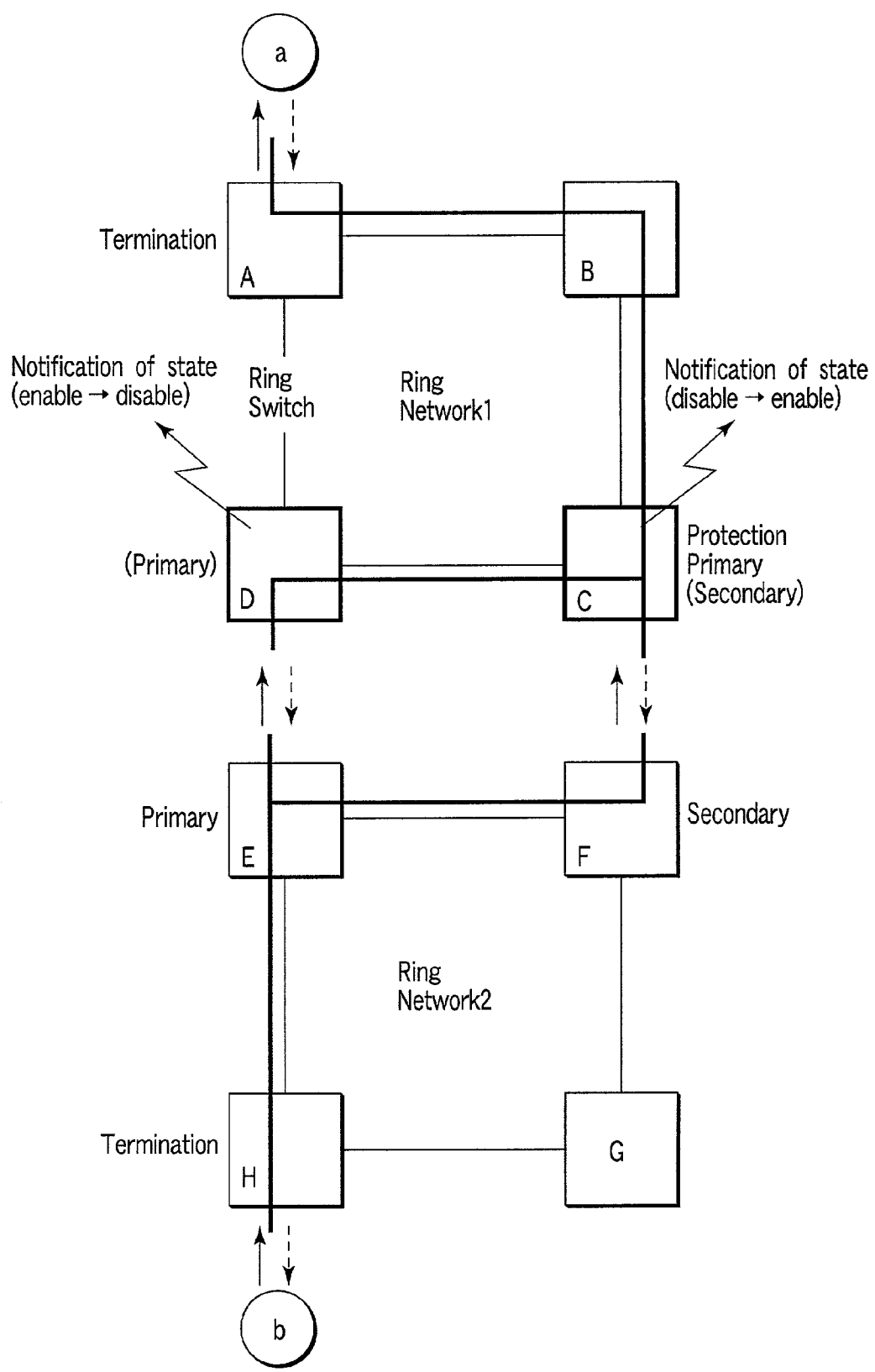
FIG. 23 shows an example of a notification sent from the Ring Interworking function when the Ring APS function is in operation.

FIG. 23, which shows a notification sent from the Ring Interworking function when the Ring APS function is in operation, corresponds to the state of FIG. 12. In FIG. 23, node C that has become a protection primary node sends a state notification (disable→enable) Node D that has become a protection secondary node sends a state notification (enable→disable) Here, (Secondary) and (Primary) in FIG. 23 mean the states before the change of the state.

Figure 24:
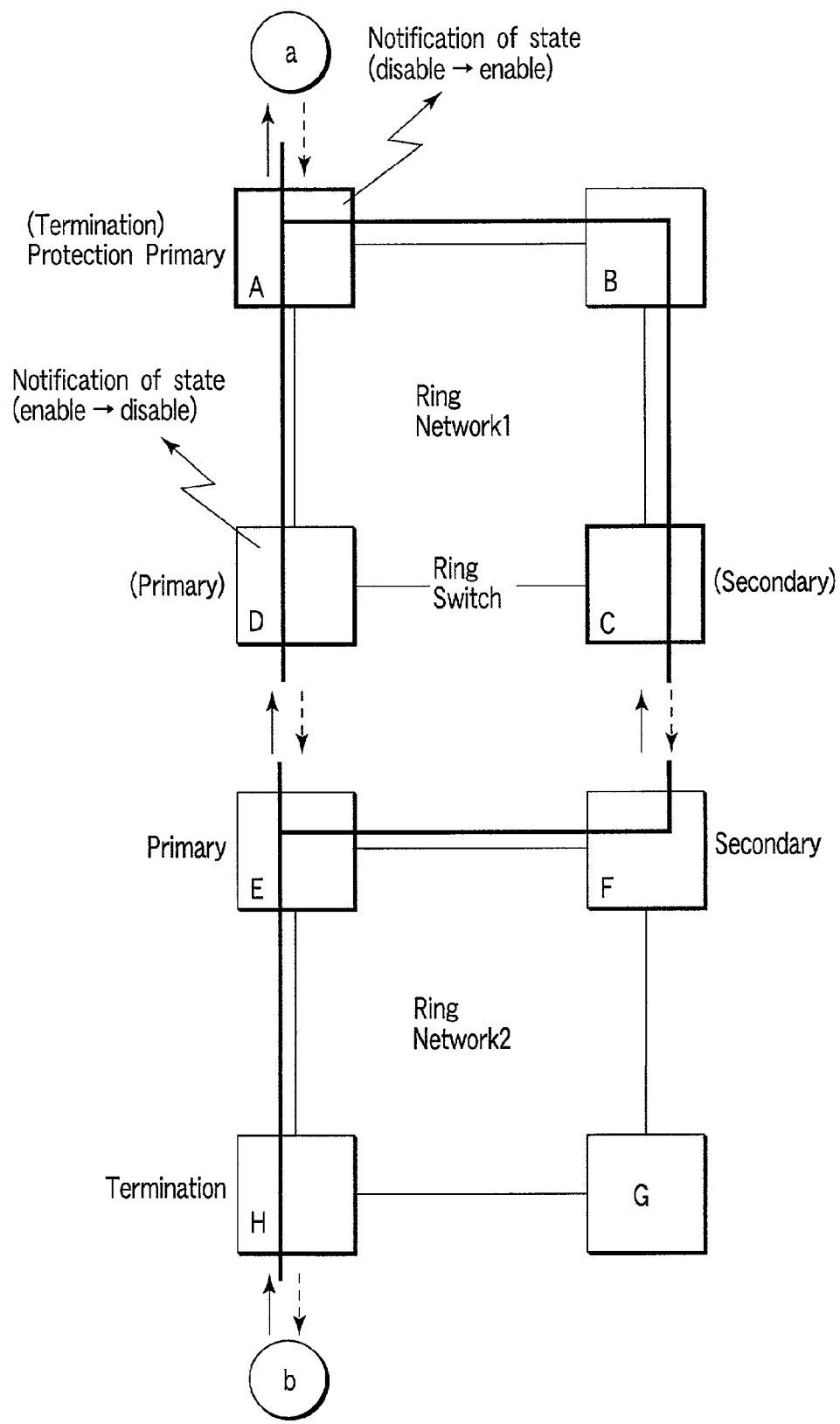
FIG. 24 shows an example of a notification sent from the Ring Interworking function when the Ring APS function is in operation.

FIG. 24, which shows another example of a notification sent from the Ring Interworking function when the Ring APS function is in operation, corresponds to the state of FIG. 15. In FIG. 24, node A that has become a protection primary node sends a state notification (disable→enable). Node C that has become a protection secondary node sends a state notification (enable→disable).

Figure 25:
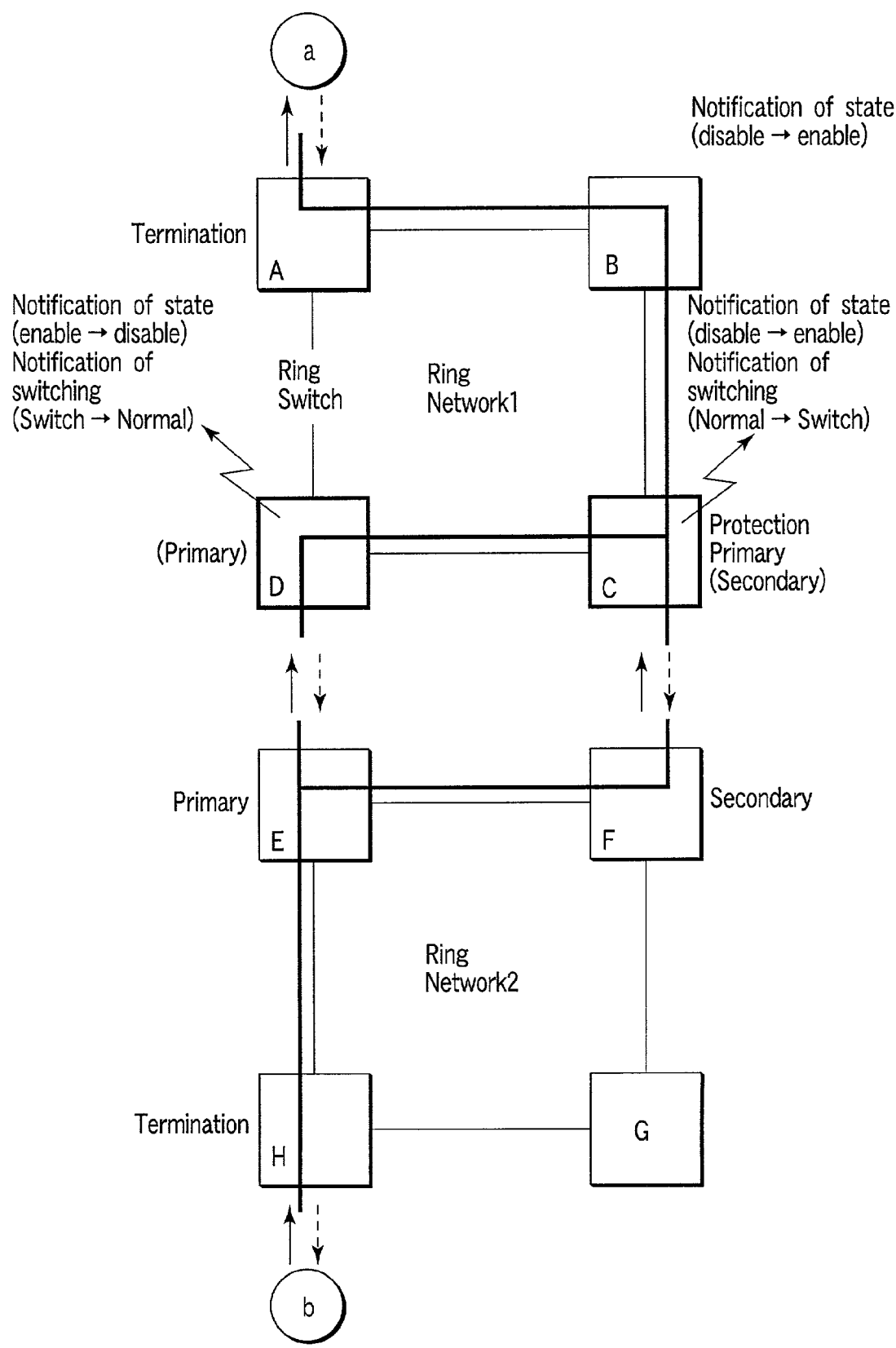
FIG. 25 shows an example of a notification sent from the Ring Interworking function when composite switching has been done.

FIG. 25, which shows a notification sent from the Ring Interworking function when the Ring APS function and Ring Interworking function are operating in a composite manner, illustrates a case where the state of FIG. 19 is reached by way of the state of FIG. 18. In the state of FIG. 18, node C that has become a protection primary node sends a state notification (non-primary→primary). Node D that has become a protection secondary node sends a state notification (primary→non-primary). As seen from the comparison with FIG. 25, (non-primary→primary) is synonymous with (disable enable) and (primary→non-primary) is synonymous with (enable→disable).

In the state of FIG. 19 that follows, node C that has selected a protection secondary circuit sends a protection notification (NoReq→Auto Sw Comp)

<Traffic Selecting State at each Node>

Next, using the pictorial views of FIGS. 26 to 38, the selecting state of traffic at each node will be explained.

FIGS. 26 to 38 are pictorial views of the selecting state of traffic at each node in the embodiment. A working fiber (drawrepresented by an outline solid line) corresponds to a service line SL and a protection fiber (drawrepresented by an outline single-dot-dash line) corresponds to a protection line PL. The arrows written in these transmission lines indicate service paths.

Figure 26:
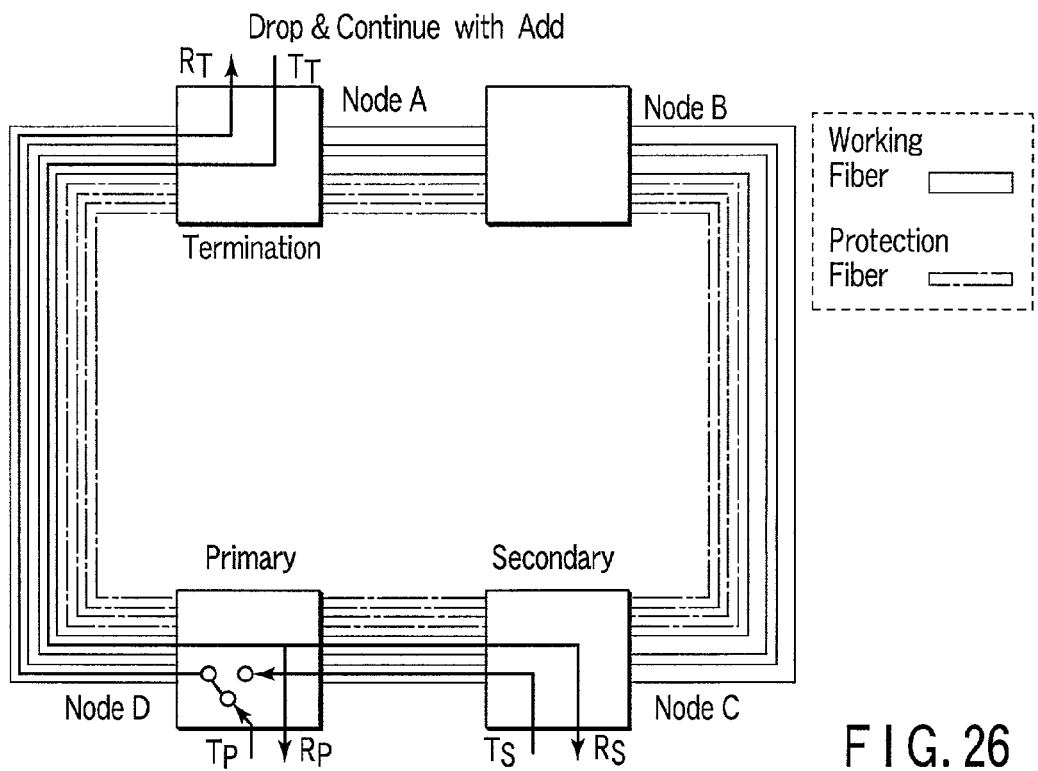
FIG. 26 is a pictorial view of an example of path setting in the normal state in Ring Network 1.

FIG. 26 shows an example of path setting in the normal state of Ring Network 1. In FIG. 26, traffic TS is introduced as traffic in the CW direction to node D, a primary node, from the HS side. And traffic TP is introduced as traffic in the CW direction to node D from the LS side. Node D has selected traffic TP from the LS side. In the pictorial views, the switches (with no reference characters) written in a box drawrepresent the switching state, thereby indicating the selecting state of traffic. The transfer of the switches is realized by the connection setting of, for example, TSA 2-0 (2-1). In FIG. 26, traffic TT=RP=RS and TP=RT. The form of node D, a primary node, is Drop & Continue with Add.

Figure 27:
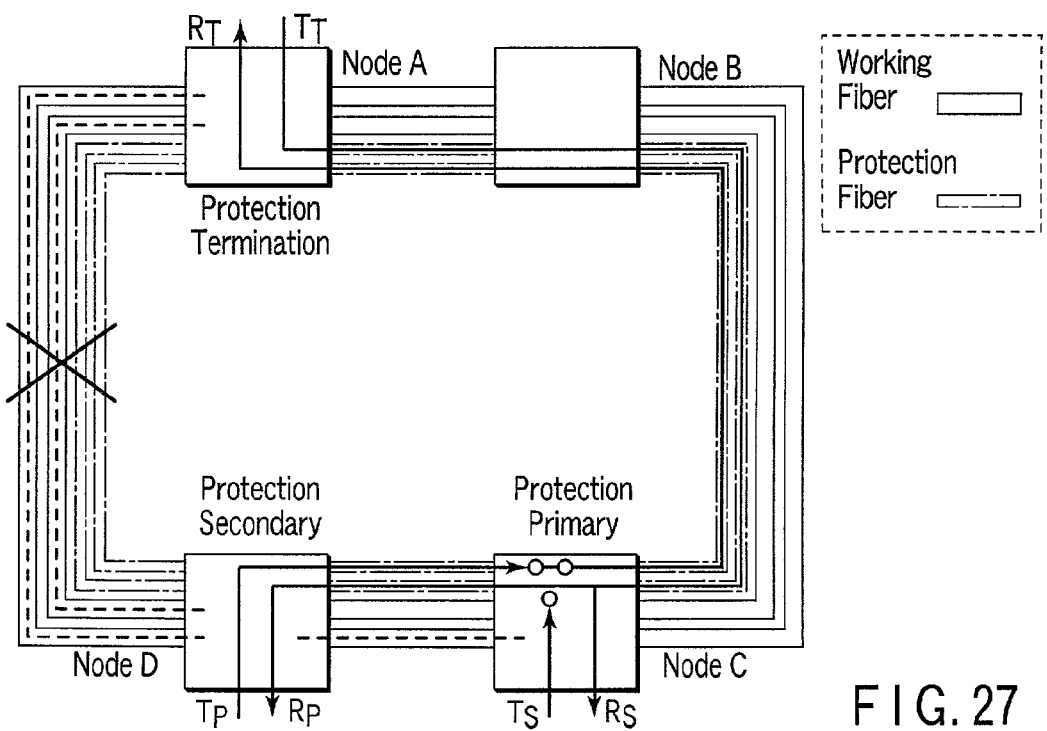
FIG. 27 is a pictorial view of the state of the paths when a ring failure has occurred in the segment AD in the state of FIG. 26.

When a ring failure (that is, a state where failures have occurred in the service line SL and protection line PL) has occurred in the segment AD in the state of FIG. 26, the state of the path is as shown in FIG. 27. That is, node C, which was a secondary node in FIG. 26, becomes a protection primary node in FIG. 27. Node C selects traffic TP supplied from node D via the CCW-direction protection fiber and continues the TP via the protection fiber until the next node (node B). In FIG. 27, since traffic TP=RT and TT=RS=RP, the same traffic transmitting and receiving state as in FIG. 26 is reproduced. In this way, the service path is restored.

Figure 28:
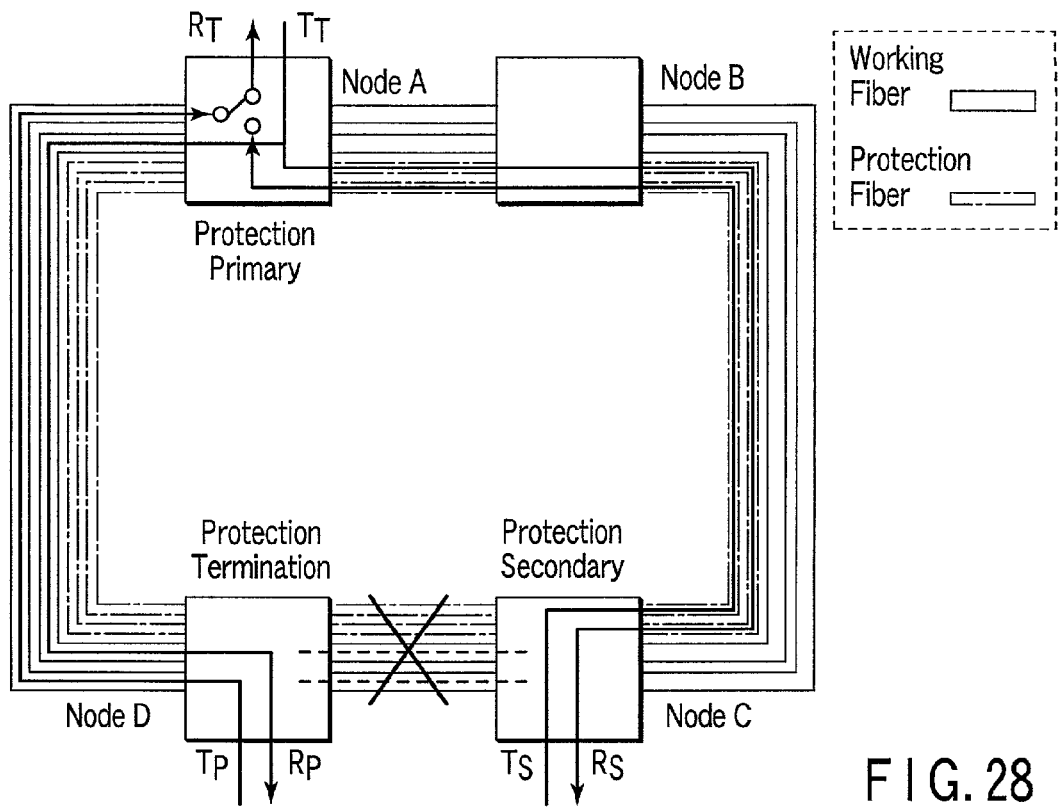
FIG. 28 is a pictorial view of the state of the paths when a ring failure has occurred in the segment CD in the state of FIG. 26.

On the other hand, when a ring failure has occurred in the segment CD in the state of FIG. 26, the state of the path is as shown in FIG. 28. That is, node A, which was a termination node in FIG. 26, becomes a protection primary node in FIG. 28. Node A selects traffic TP supplied from node D via the CW-direction working fiber and drops the traffic as traffic RT. Node A splits traffic TT added therein into two and sends one to the CCW-direction working fiber and the other to the CW-direction protection fiber. In this way, a traffic state with TT=RS=RP and TP=RT is set again, thereby relieving the service path of FIG. 26.

<Another Example of Path Setting>

Figure 29:
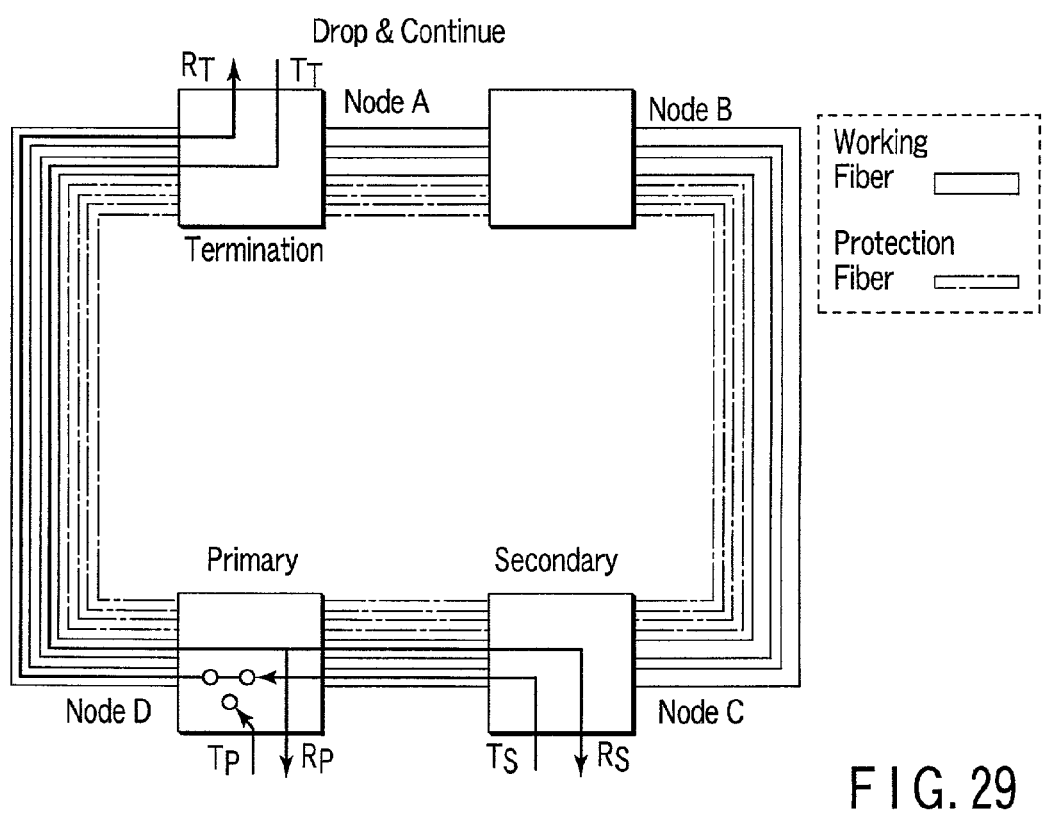
FIG. 29 is a pictorial view of another example of path setting in the normal state in Ring Network 1.

FIG. 29 shows another example of path setting in the normal state of Ring Network 1. In FIG. 29, TS is introduced as the CW-direction traffic to node D, a primary node, from the HS side. And TP is introduced as the CW-direction traffic to node D from the LS side. In FIG. 29, node D has selected traffic TS from the HS side. In FIG. 29, traffic TT=RP=RS and TS=RT. The form of node D, a primary node, is Drop & Continue.

Figure 30:
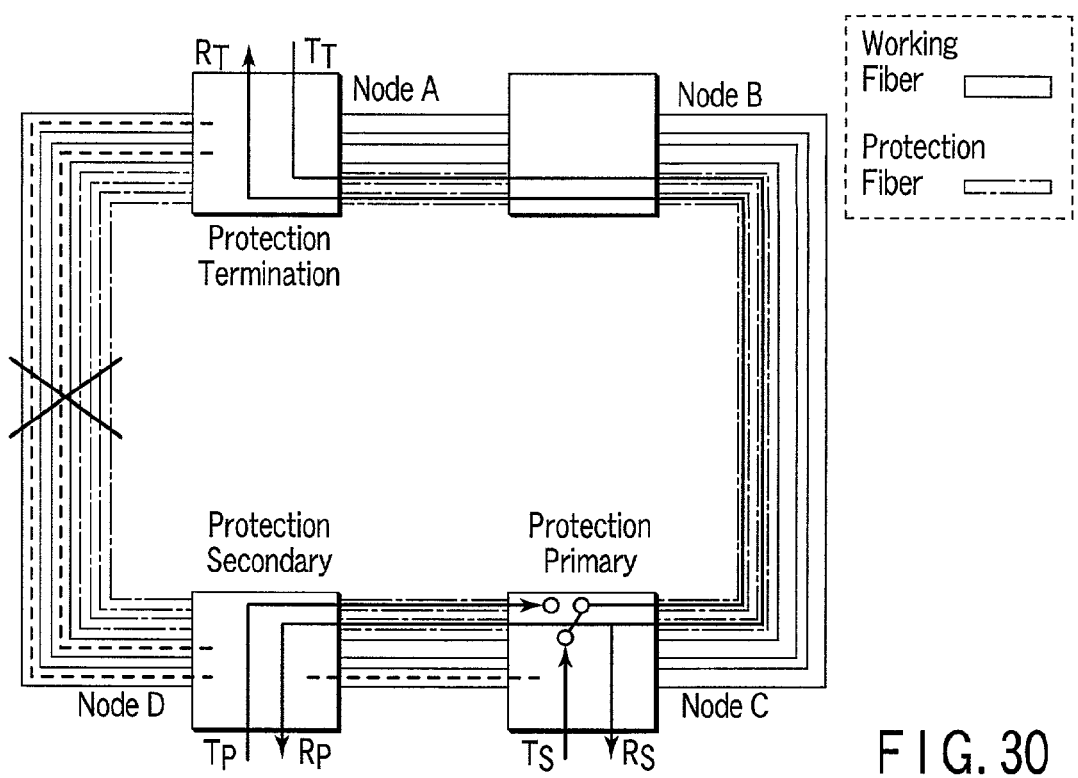
FIG. 30 is a pictorial view of the state of the paths when a ring failure has occurred in the segment AD in the state of FIG. 29.

When a ring failure has occurred in the segment AD in the state of FIG. 29, the state of the path is as shown in FIG. 30. That is, node C, which was a secondary node in FIG. 29, becomes a protection primary node in FIG. 30. Node C selects traffic TS introduced from its own LS and transmits the TS to the next node (node B) via the protection fiber. Node C, acting as a Drop & Continue with Add node, splits and terminates traffic TT from the CW-direction protection fiber and continues traffic TT until the next node D is reached. As a result, the state with TT=RS=RP and TS=RT is reproduced in FIG. 30, thereby relieving the service path of FIG. 29.

In FIG. 29, node D is a Drop & Continue node. At present, a path related to this type of node is not supposed to be relieved in Recommendation G. 841. In the embodiment, however, a path related to this type of node is relieved, taking Ring Interworking into account. This has been already explained.

Figure 31:
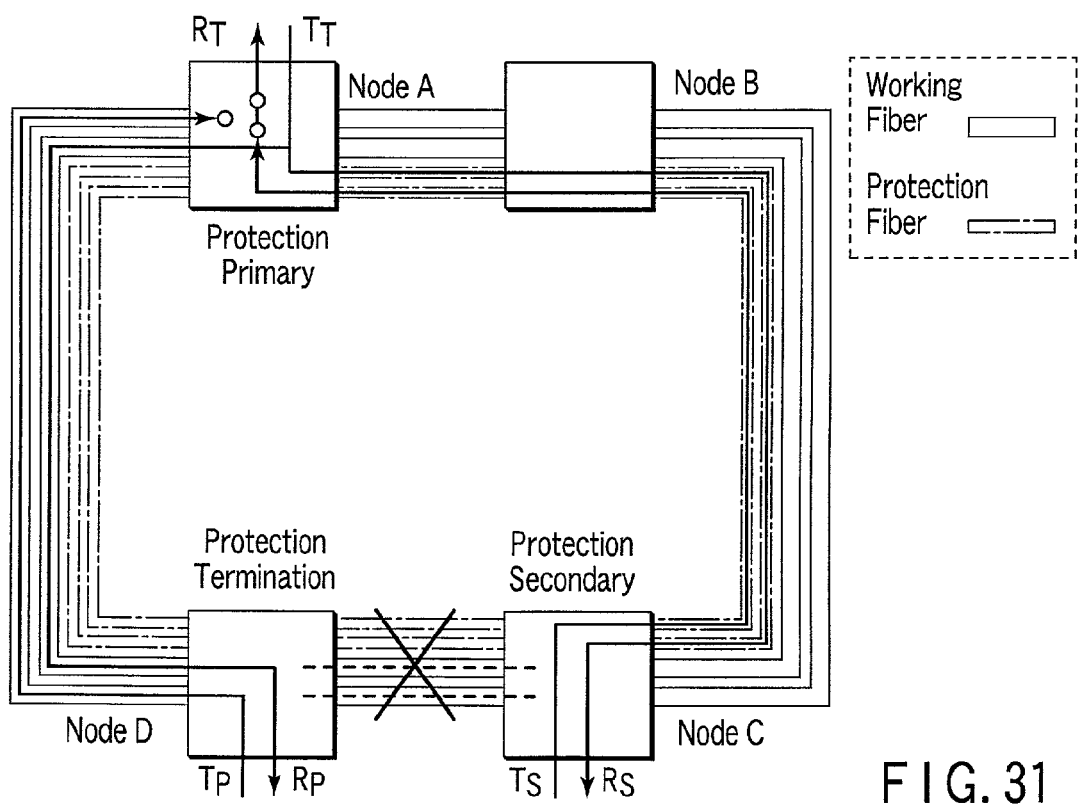
FIG. 31 is a pictorial view of the state of the paths when a ring failure has occurred in the segment CD in the state of FIG. 29.

On the other hand, when a ring failure has occurred in the segment CD in the state of FIG. 29, the state of the path is as shown in FIG. 31. That is, node A, which was a termination node in FIG. 29, becomes a protection primary node in FIG. 31. Node A selects traffic TS supplied from node C by way of node B through the CCW-direction working fiber and drops the traffic as traffic RT. Node A splits traffic TT added therein into two and sends one to the CCW-direction protection fiber and the other to the CW-direction protection fiber. In this way, a traffic state with TT =RS=RP and TS=RT is reproduced, thereby relieving the service path of FIG. 29.

Figure 32:
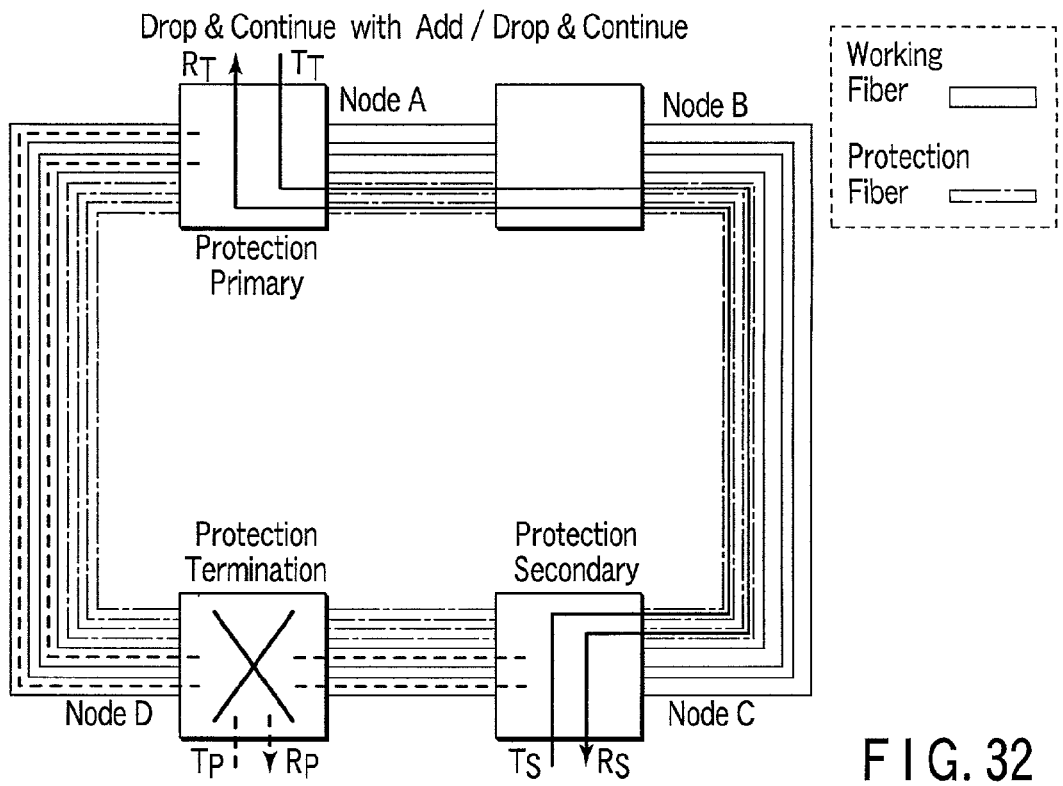
FIG. 32 is a pictorial view of the state of the paths when a failure has occurred in node D at the time of path setting in FIG. 26 or 29.

FIG. 32 is a pictorial view of a state of the paths when a failure has occurred in the path setting state shown in FIG. 26 or 29. In FIG. 32, a path going by way of node B is set again in the protection fiber between node A and node C.

Figure 33:
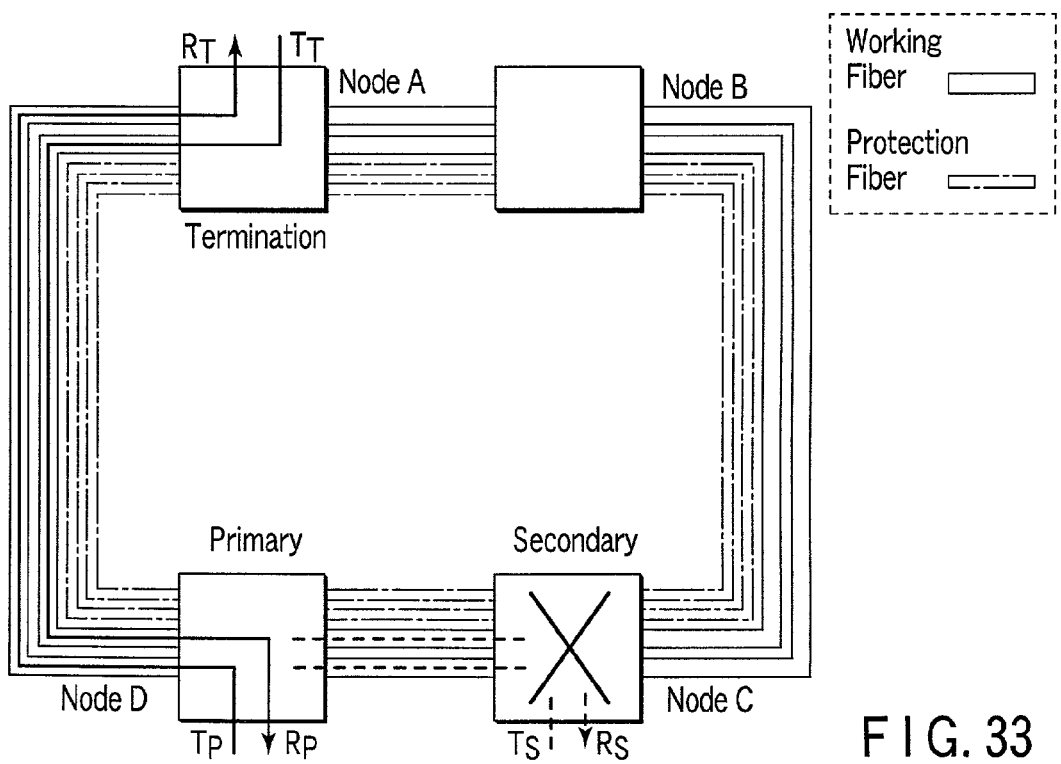
FIG. 33 is a pictorial view of the state of the paths when a failure has occurred in node C at the time of path setting in FIG. 26 or 29.

FIG. 33 is a pictorial view of a state of the paths when a failure has occurred at node C in the path setting state shown in FIG. 26 or 29. In FIG. 33, part of the original paths remain in the working fiber between node A and node D.

(Example of Setting a Path in such a Manner that it Extends over a Plurality of Rings)

Figure 34:
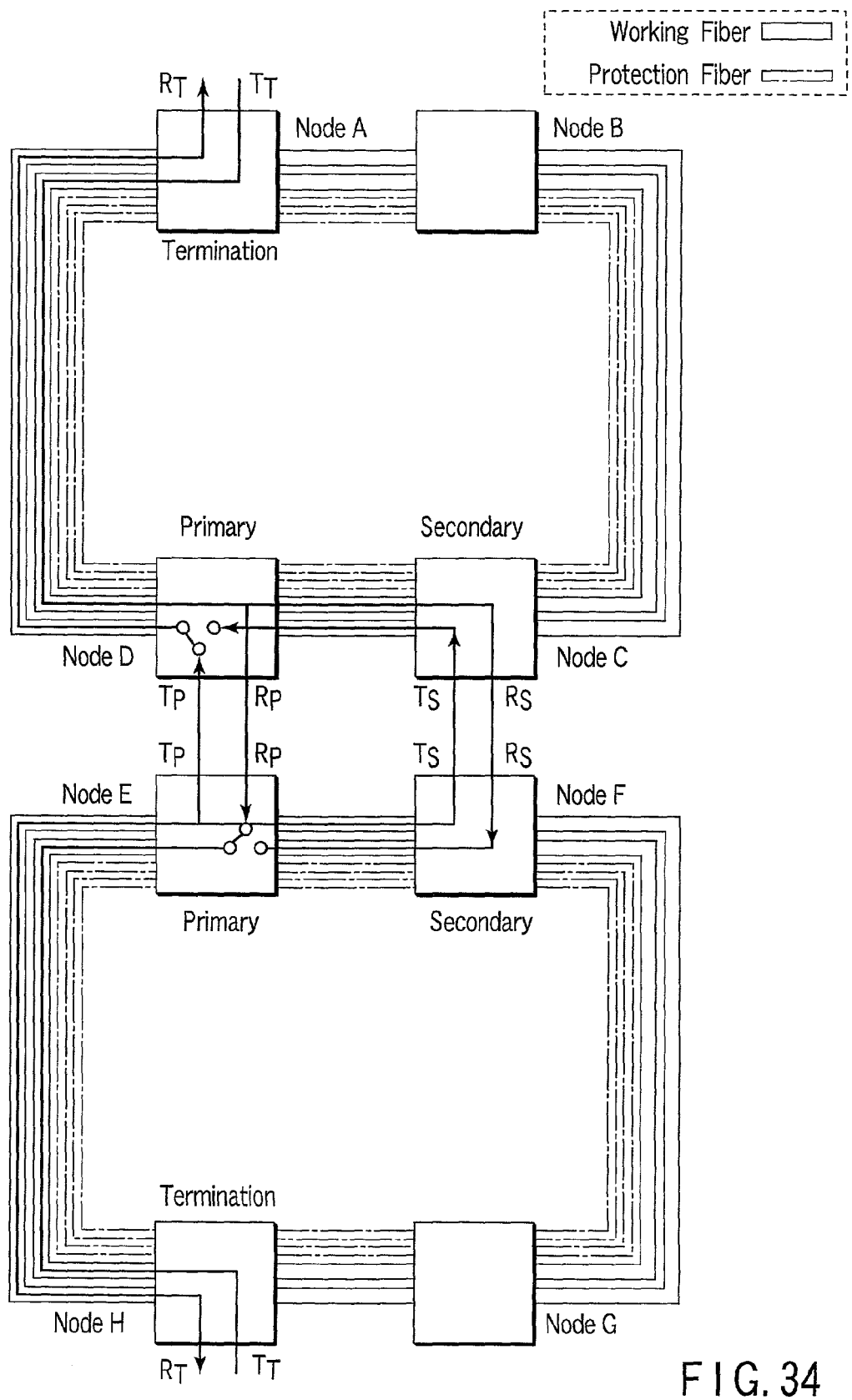
FIG. 34 is a pictorial view of an example of setting in the normal state the paths for interconnecting Ring Network 1 and Ring Network 2.

FIG. 34 is a pictorial view of an example of setting the paths in the normal state in such a manner that they extend over Ring Network 1 and Ring Network 2. The state shown in the figure corresponds to the state of FIG. 6. In FIG. 34, traffic TT=RP=RS and RT=TP TS.

Figure 35:
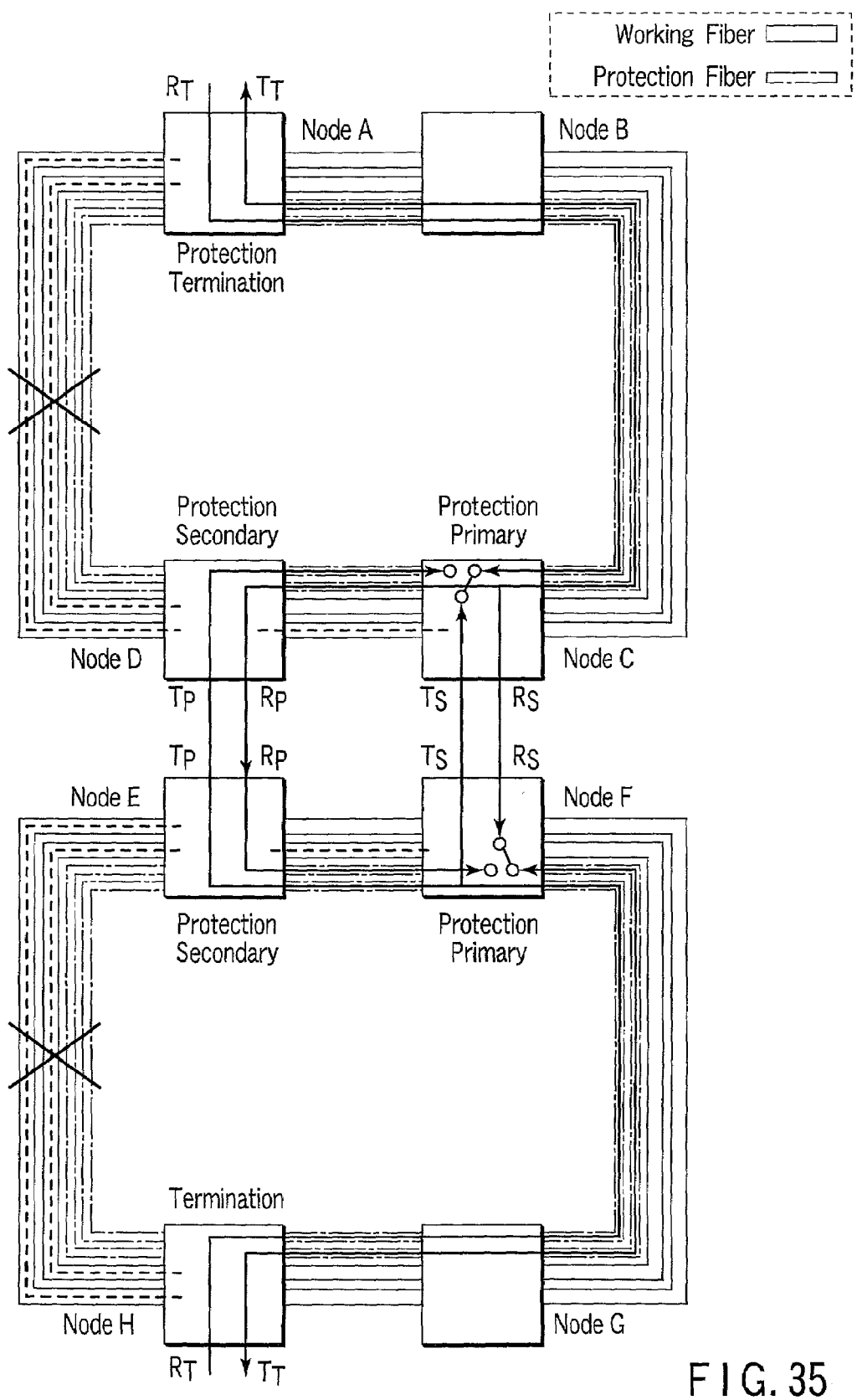
FIG. 35 is a pictorial view of the state of paths when failures have occurred in both of the segment AD and segment EH in the state of FIG. 34.

FIG. 35 shows a state where failures have occurred in the segment AD and segment EH in the state of FIG. 34. In the case, each of Ring Network 1 and Ring Network 2 realizes the state of FIG. 27, thereby realizing a state of the paths as shown in FIG. 35.

Figure 36:
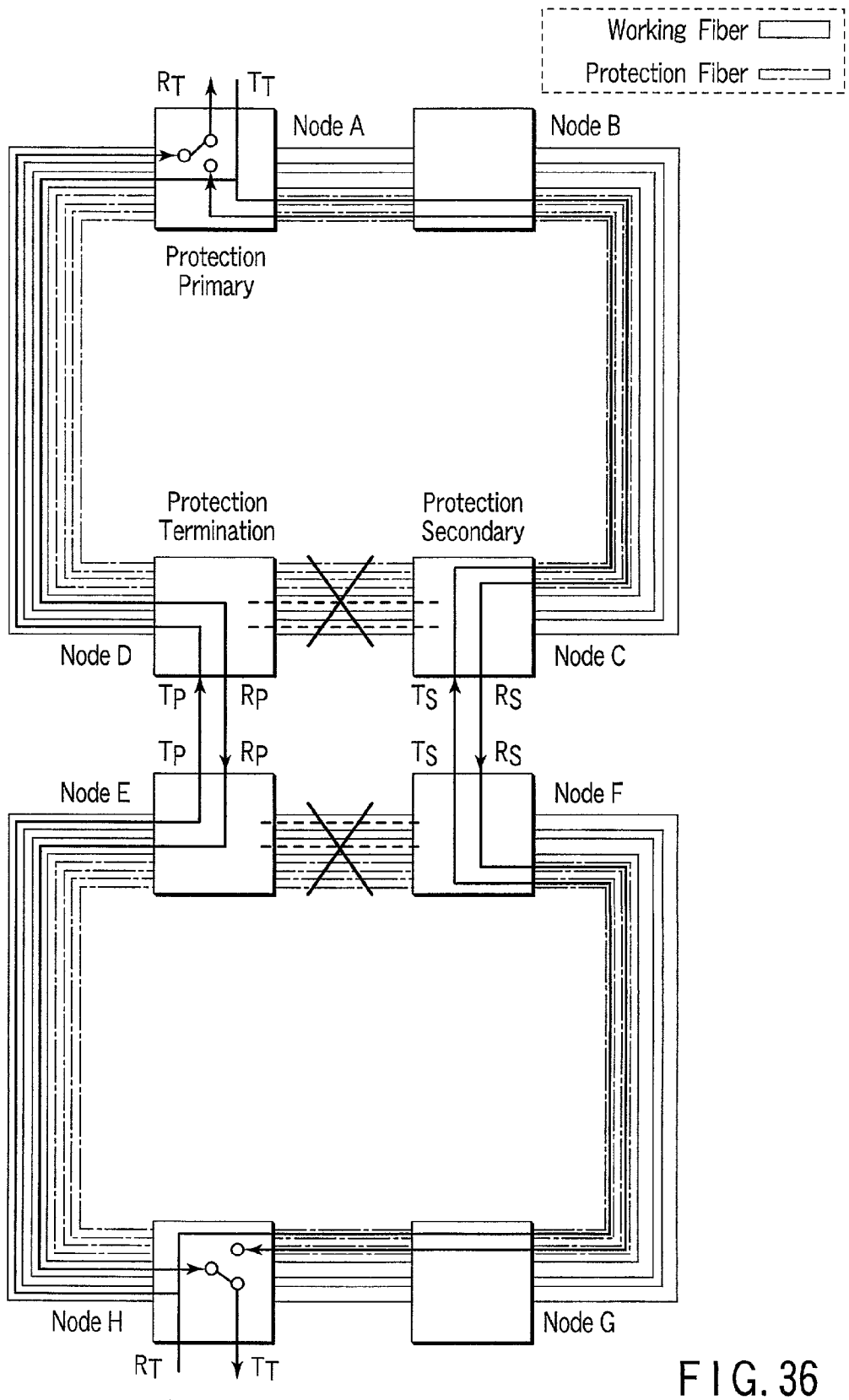
FIG. 36 is a pictorial view of the state of paths when failures have occurred in both of the segment CD and segment EF in the state of FIG. 34.

FIG. 36 shows a state where failures have occurred in the segment CD and segment EF in the state of FIG. 34. In this case, each of Ring Network 1 and Ring Network 2 realizes the state of FIG. 28, thereby realizing a state of the paths as shown in FIG. 36.

Figure 37:
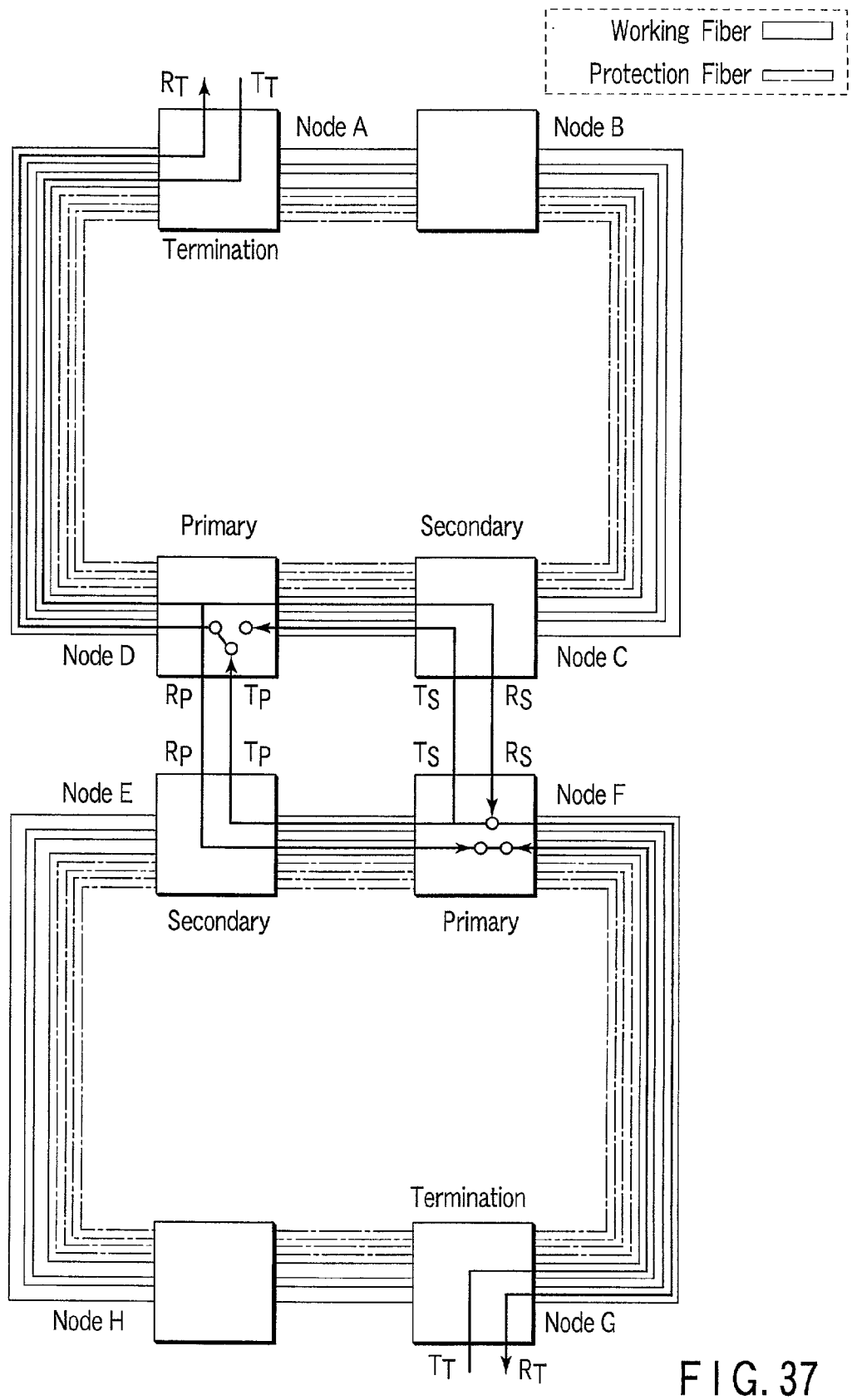
FIG. 37 is a pictorial view of another example of setting in the normal state the paths for interconnecting Ring Network 1 and Ring Network 2.

FIG. 37 is a pictorial view of another example of setting the paths in the normal state in such a manner that they extend over Ring Network 1 and Ring Network 2. The state shown in the figure corresponds to the state of FIG. 7. In FIG. 37, traffic TT=RP=RS and RT=TP=TS.

Figure 38:
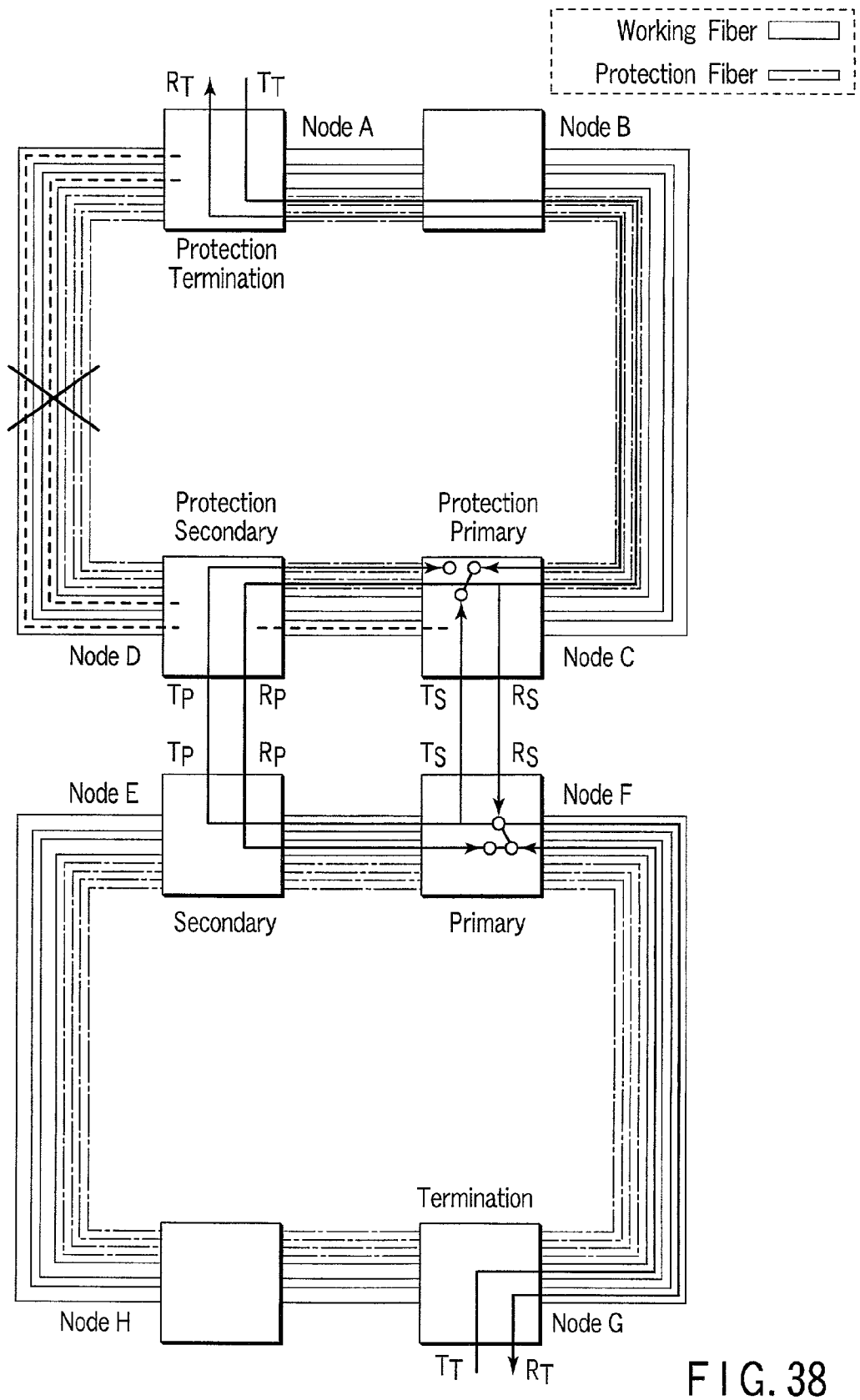
FIG. 38 shows a state where a failure has occurred in the segment AD in the state of FIG. 34.

FIG. 38 shows a state where a failure has occurred in the segment AD in the state of FIG. 37. In this case, each of Ring Network 1 and Ring Network 2 realizes the state of FIG. 30, thereby realizing a state of the paths as shown in FIG. 38. In FIG. 38, the state of FIG. 30 is realized in Ring Network 1. Then, in Ring Network 2, node F acting as a primary node effects switching so as to acquire traffic TT obtained from the HS side from the LS side. This realizes the state shown in FIG. 38, thereby relieving the service traffic.

<Description of the Operation of each Node>

Figure 39:
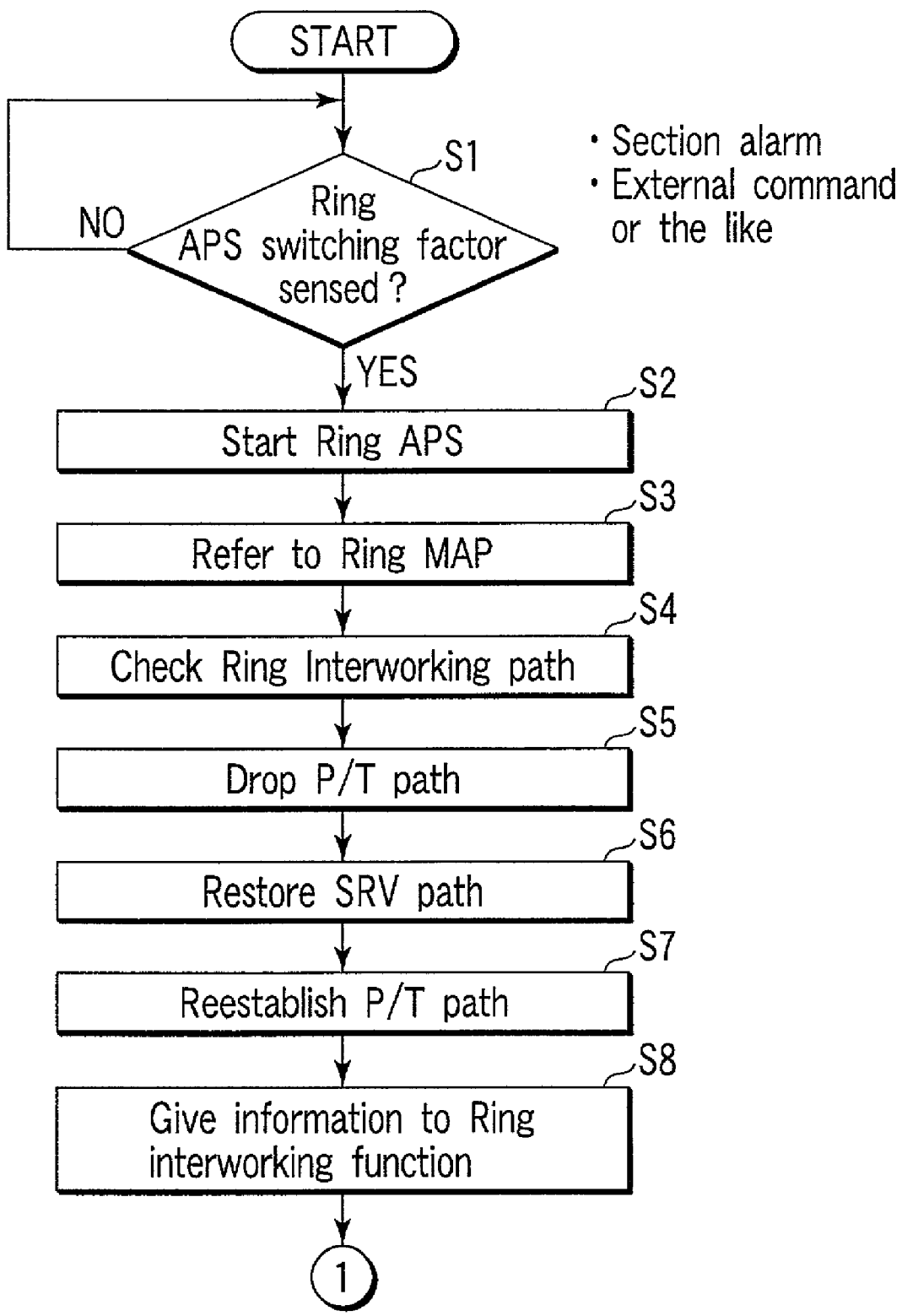
FIG. 39 is a first flowchart to help explain the switching operation at each of the pieces of node equipment A to H according to a first embodiment of the present invention.

Next, referring to the flowcharts of FIGS. 39 to 43, the operation at each of the nodes A to H in the embodiment will be explained. FIGS. 39 and 40 are a first flowchart to help explain the procedure for switching effected by the nodes A to H.

It is assumed that, at step S1 of FIG. 39, a certain node has sensed a request to perform protection switching related to Ring APS, such as MS-AIS (Multiplex Section Alarm Indication Signal) or an external command. Then, the node starts Ring APS at step S2.

At step S3, the node refers to the Ring MAP stored in the memory unit 6. Then, at step S4, the node ascertains which of the paths in the network is related to Ring Interworking. After that, at step S5, the node disconnects the P/T path (part-time path) set in the protection line PL.

The node, at step S6, detours the service path to the emptied protection line PL. At step S7, the node reestablishes a part-time path in empty protection channels. Then, at step S8, the node gives control information including the place where a failure has occurred and the identifier for a path in the restored state, to the Ring Interworking function.

Next, it is assumed that, at step S9 of FIG. 40, a certain node has sensed a request related to Ring Interworking switching, such as a path alarm or an external command. Then, at step S10, the node starts Ring Interworking switching. At step S11, the node judges whether Ring APS is in operation. If Ring APS is not in operation, the primary node switches the place from which traffic is to be obtained, thereby restoring the service path. On the other hand, if Ring APS is in operation at step S11, the protection primary node switches the place from which traffic is to be obtained, thereby restoring the service path.

Figure 41:
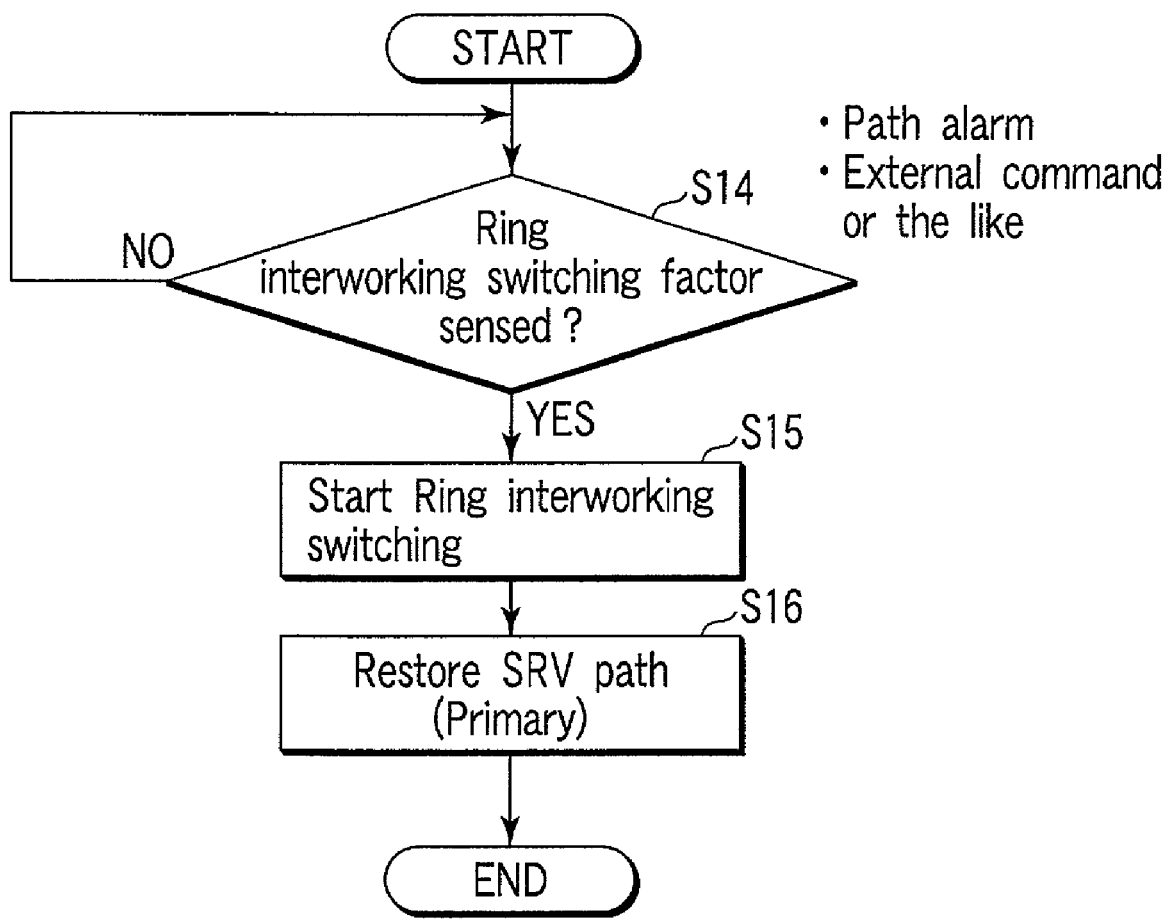
FIG. 41 is a flowchart to help explain the operation of the Ring Interworking function in a conventional system.

FIG. 41 is a flowchart to help explain the operation of the Ring Interworking function in a conventional system. As shown in the flowchart of FIG. 41, only the switching process in the primary node is considered in the conventional system. In the embodiment, however, a new state, Protection Primary, is defined. Then, when the switching of the traffic route is done with the Ring Interworking function, while APS is in operation, the protection primary node restores the service path. By doing this, cooperation between the Ring APS function and Ring Interworking function is realized. As a result, it is possible to avoid such a problem as the misconnection of traffic.

Figure 42:
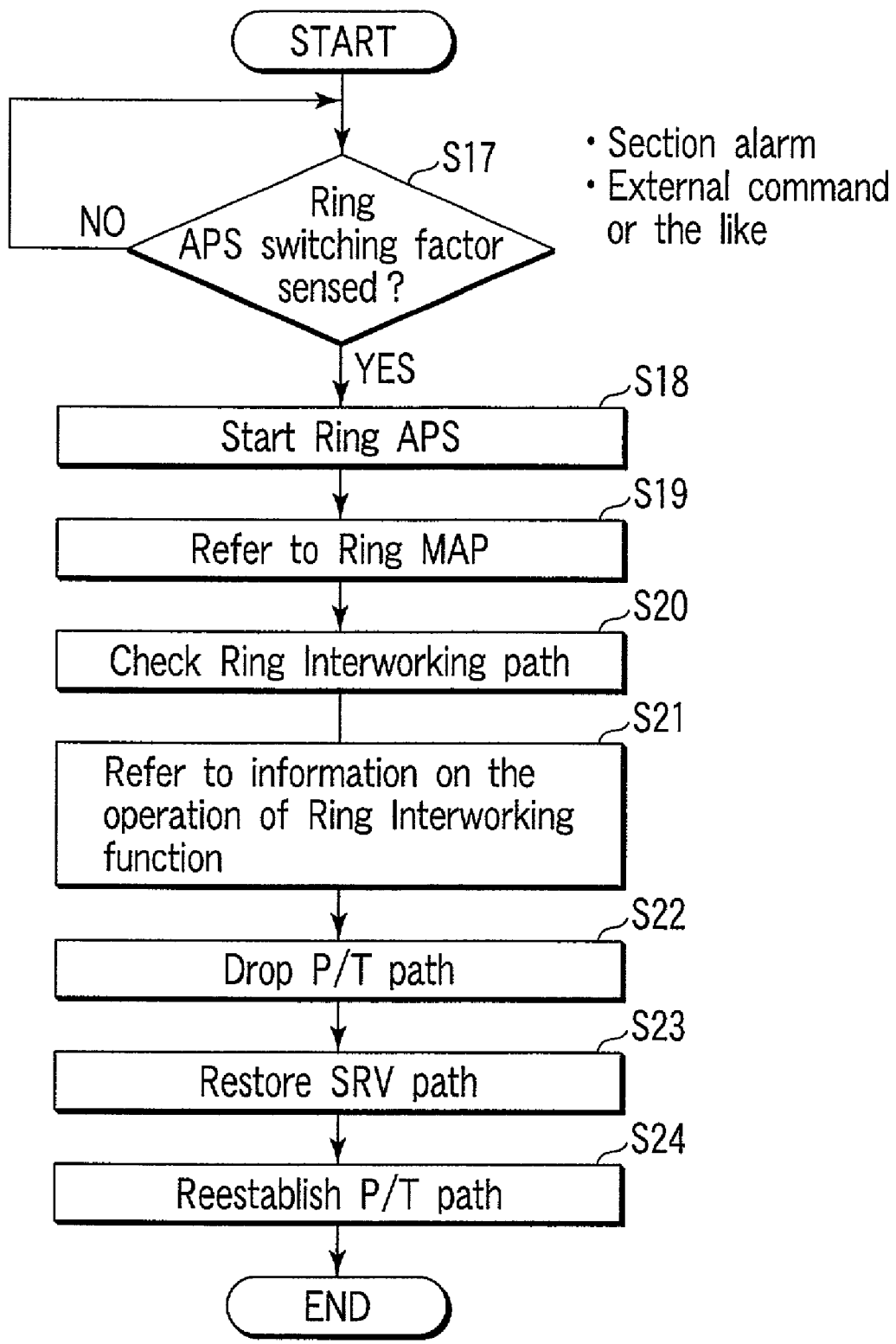
FIG. 42 is a flowchart showing another example of the operation in the first embodiment of the present invention.

FIG. 42 is a flowchart to help explain another example of the procedure for processing in the embodiment. In FIG. 42, step S17 to step S19 are the same as step S1 to step S3 in FIG. 39. In FIG. 42, the node that referred to the Ring Map at step S19 ascertains which path is related to the Ring Interworking function at step S20. Then, at step S21, the node checks information about the operation of the Ring Interworking function. At step S22 and later, the node proceeds to the process of restoring the service traffic.

Figure 43:
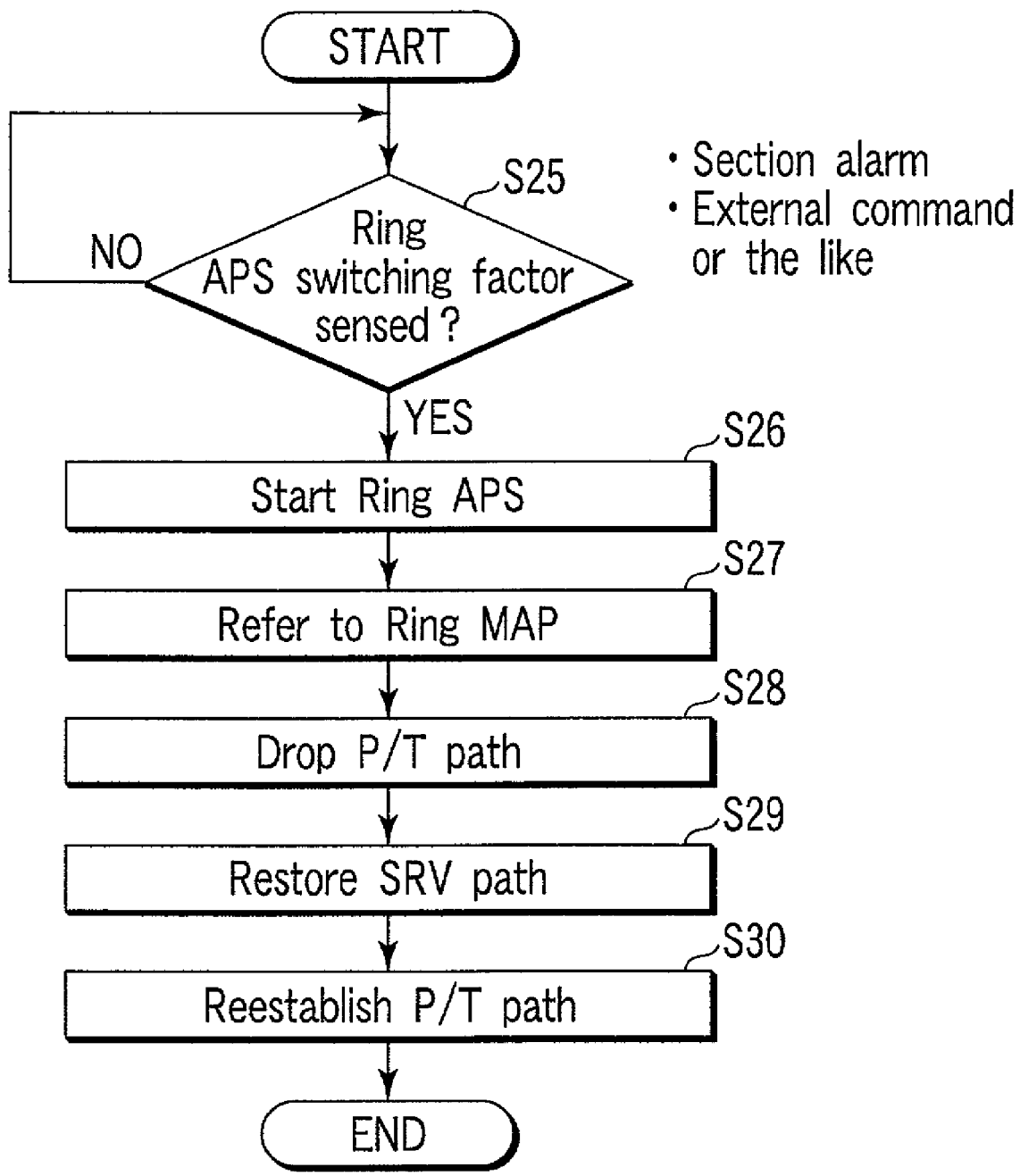
FIG. 43 is a flowchart to help explain the operation of a conventional APS function.

FIG. 43 is a flowchart to help explain the operation of a conventional APS function. As shown in FIG. 43, the APS function does not recognize the state of the Ring Interworking function in the conventional system. In contrast, the embodiment causes the APS function to recognize the state of the Ring Interworking function and carry out its process. By doing this, the cooperation between the APS function and Ring Interworking function can be realized.

SECOND EMBODIMENT

A second embodiment of the present invention will be explained. In the second embodiment, the form of a drawing on the display section 25 of NME 10, the control function according to the operation (such as a click operation with a mouse) on its window, and others will be explained. That is, in the second embodiment, a human-machine interface will be explained.

The individual functions described below are realized mainly by the display control section 110a of NME 10. Specifically, the following functions are realized by putting patches to the control program executed by the CPU 110. The control program is written in a adequate computer language and stored in the memory section 100.

Figure 44:
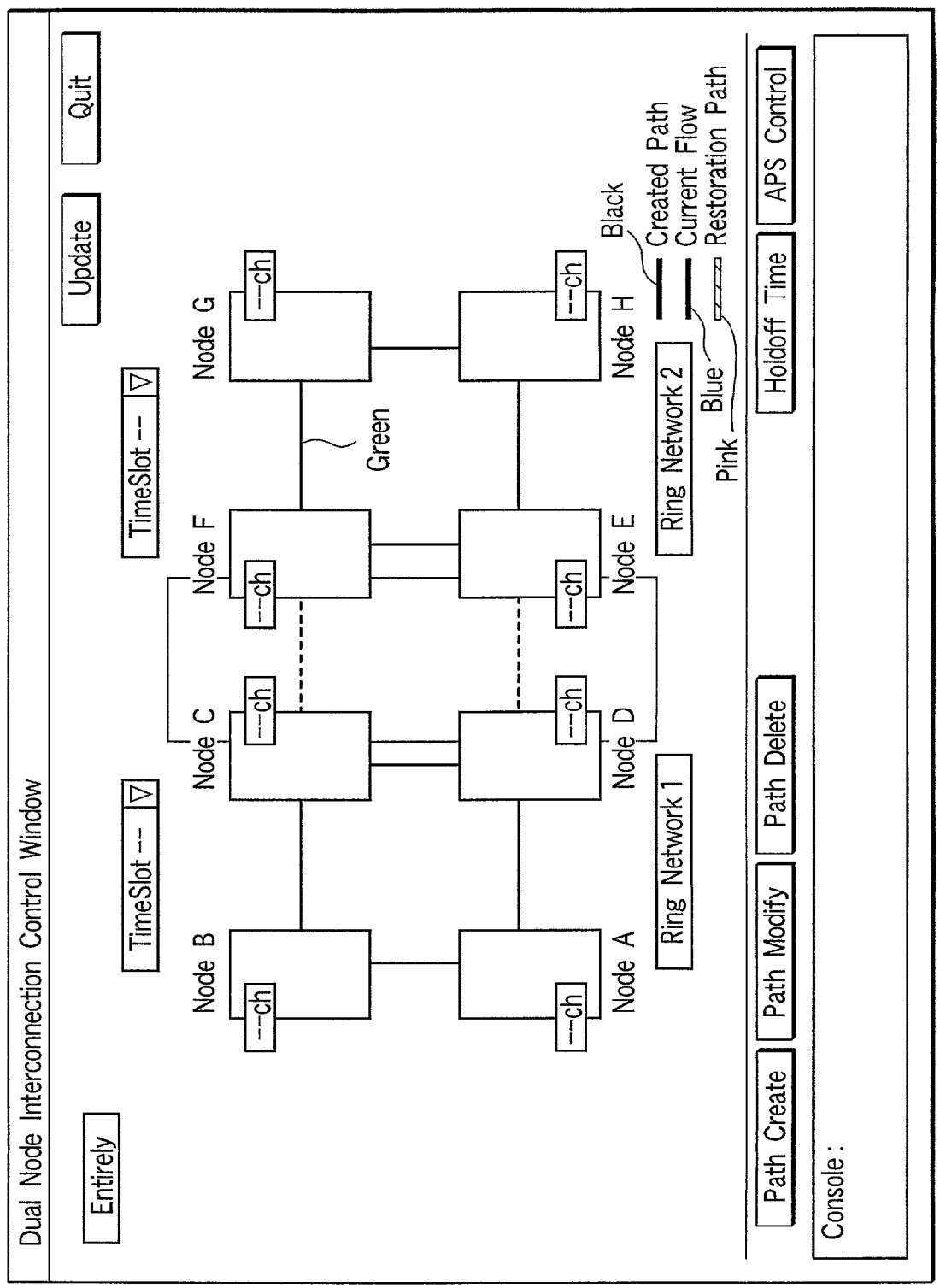
FIG. 44 illustrates a Dual Node Interconnection Control Window.

FIG. 44 shows a window appearing on the display section 25 of NME 10. The window, which is called "Dual Node Interconnection Control Window," displays the system configuration of FIG. 1 pictorially and graphically using different colors. In the window, an optical fiber line FL connecting a node to another node is drew by a green solid line and a lower-order line connecting nodes C and F and a lower-order line connecting nodes D and E are drew by dotted lines. If a failure has occurred in the optical fiber line FL or lower-order lines, the line corresponding to the fault segment is changed.

This window has a plurality of clickable function buttons. They include the following buttons: "Entirely," "Update," "Quit," "Path Create," "Path Modify," "Path Delete," "Hold-off Time," and "APS Control." Clicking these buttons causes various windows to appear.

The window of FIG. 44 has a drop-down list for specifying a Timeslot to be time-division-multiplexed. In FIG. 44, the drop-down list appears above each ring network. A Timeslot can be specified by inputting data from a keyboard or using a spin box, in addition to using the drop-down list.

Figure 45:
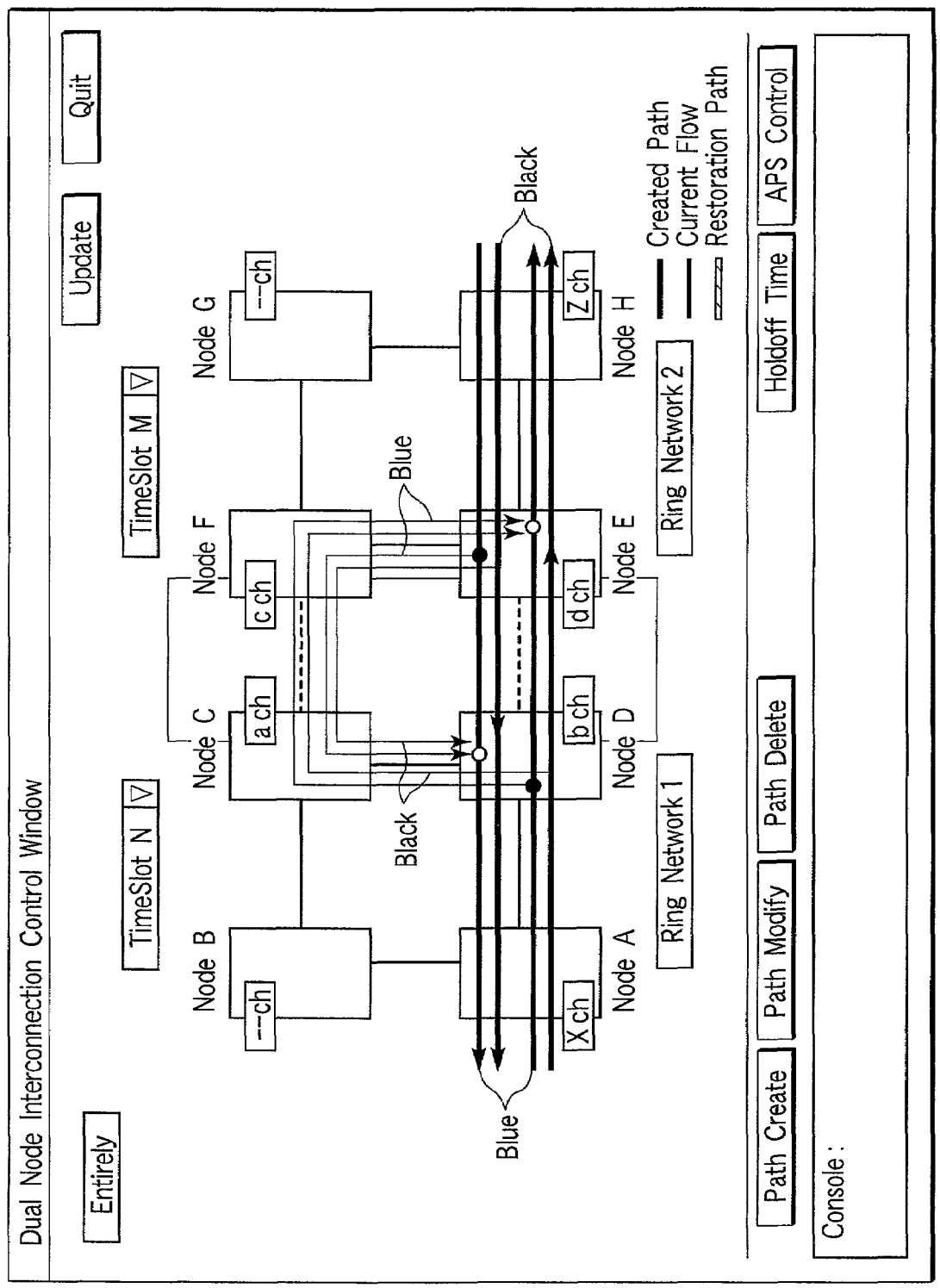
FIG. 45 shows an example of displaying the state of the paths (or traffic)

For instance, when Timeslot N in Ring Network 1 has been specified, if a path has already existed in the slot, the drawing on the screen is as shown in FIG. 45. In FIG. 45, the path (hereinafter referred to as Created Path), a concept to be operated, is drew by a black arrow and the current flow (hereinafter, referred to as Current Flow) of the Created Path in the network is drew by a blue arrow to distinguish between them.

The Timeslot in Ring Network 2 corresponding to Timeslot N in Ring Network 1 is calculated and displayed in the drop-down list. It is shown as TimeSlot M in FIG. 45.

This enables the operator to grasp the state of one interconnected path at a glance. Information about the interconnection is held on the NME 10 side when the path is created. When more than one NME 10 exists, all the NMEs 10 are caused to share the information via the management network. In the window of FIG. 45, a path existing only in a single Ring Network (that is, a path not interconnected) is also displayed.

Moreover, in the window of FIG. 45, the LS channel at each node of the displayed paths is displayed. For instance, x ch is displayed at node A and b ch is displayed at node D.

<Entirely>

Figure 46:
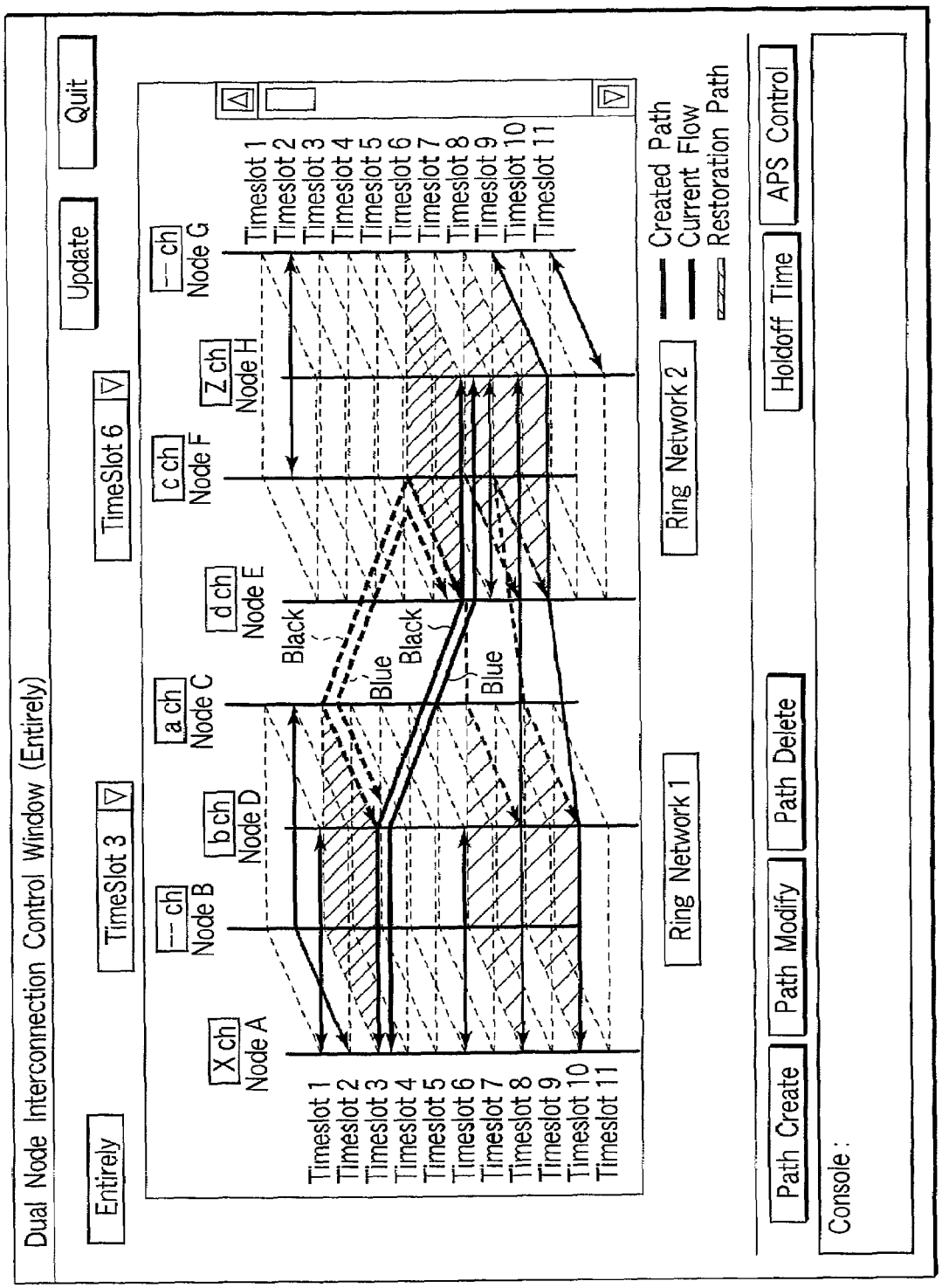
FIG. 46 illustrates a Path setting state check window about the entire network.

When the "Entirely" button is clicked, the window of FIG. 46 is displayed. This window is called "Dual Node Interconnection Control Window (Entirely)," and displays the state of all the paths existing in the network. The window of FIG. 46 can be considered to be what is obtained by stacking the contents of the display of FIG. 45 using Timeslots as the ordinate axis. In this figure, a pictorial view of Ring Network 1 and that of Ring Network 2 are shown.

In the window, too, when a Timeslot in either Ring Network is specified, the selected Timeslot and the Timeslot in the other Ring Network corresponding to the slot are displayed using, for example, different colors to distinguish one slot from the other. In FIG. 46, Timeslot 3 has been selected in Ring Network 1. The drawing of the LS channel of the path set in the slot changes according to the selected slot number.

For instance, the path set in Timeslot 3 in Ring Network 1 is set in Timeslot 6 in Ring Network 2. Therefore, when Timeslot 3 is specified in Ring Network 1, this slot and Timeslot 6 in Ring Network 2 are highlighted on the screen. This enables the operator to grasp the full picture of all the paths in the network at a glance. Furthermore, the operator can understand at a glance in which slot a path should be newly created.

In the window of FIG. 46, for example, a vertical scroll button is displayed at the right end. When this scroll button is clicked, a pictorial view of Ring Network 2 scrolls vertically in the window. This makes it possible to check a path that cannot go in a single screen as the Interworking Path connecting Timeslot 1 of Ring Network 1 and Timeslot 64 of Ring Network 2 cannot. Of course, two scroll windows may be displayed and both of the Ring Networks be scrolled vertically. Alternatively, the drawing of Ring Network 2 may be fixed and Ring Network 1 be scrolled.

<Path Create>

When "Path Create" is clicked, a Path Create window in FIG. 47 is displayed. This window is a subwindow used to create a path. Using this window, several path creating methods can be selected. This window enables not only a path extending over Ring Networks but also a path existing only in a Ring Network to be created.

In the window, the "Standard" button, "Pointing" button, "Choice" button, and "Quit" button are displayed. The procedure for creating a path when the "Standard" button is clicked includes the step of specifying the attribute of each node and the step of specifying the form of the path at the specified node.

The procedure for creating a path when the "Pointing" button is clicked includes the step of pointing each node with the mouse, while the operator is paying attention to the traffic flow of the path, and thereby connecting paths.

The procedure for creating a path when the "Choice" button is clicked includes the step of specifying both ends of a path, the step of calculating all the path routes that connect both of the two ends, the step of displaying the calculated path routes, and the step of selecting any one of the displayed path routes.

When the "Quit" button is clicked, the contents of the drawing on the screen in the window of FIG. 47 are returned to those of the original window.

<Standard>

Figure 48:
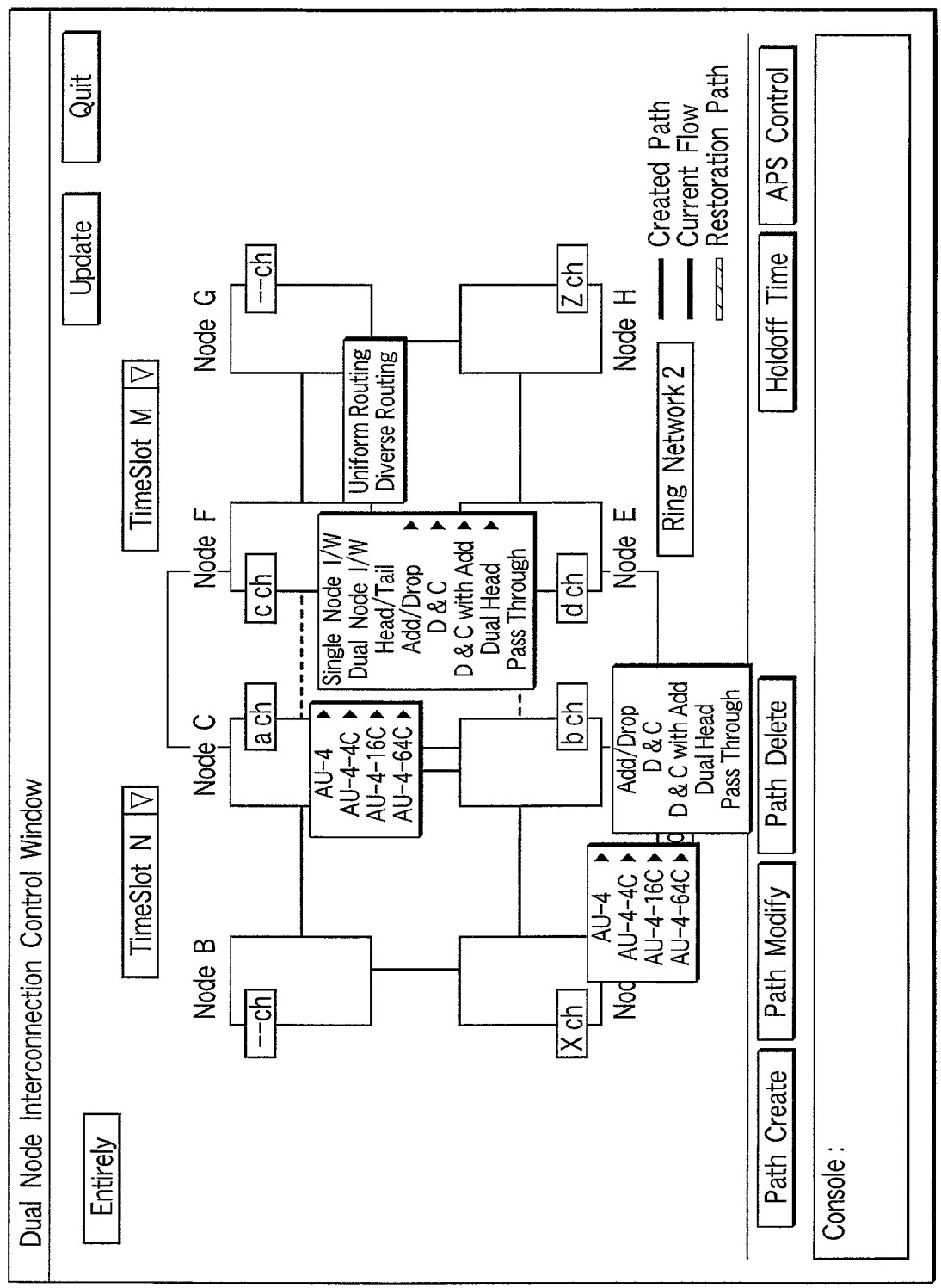
FIG. 48 shows a Path Create window in case 1.

When the "Standard" button is clicked in FIG. 47, the drawing on the screen is changed as shown in FIG. 48. A path is set as described in the following case 1 or case 2, using the window.

(Case 1)

In case 1, the Add/Drop node in each of Ring Network 1 and Ring Network 2 is specified by, for example, a click operation in the window of FIG. 48. Next, a Timeslot where a path is to be created is selected for each node using the drop-down list. Moreover, either a primary node or a secondary node is specified for an interconnection node. In addition, when an Opposite Side routing path route is formed, either Diverse Routing or Uniform Routing is specified. By carrying out such a procedure, the route of a path to be set is determined.

More specifically, when the Add/Drop Node in each Ring Network is specified, a single drop-down list is displayed. Using the drop-down list, an LS channel at each node is selected. Then, a menu window for selecting Concatenated Type is displayed. This menu window is displayed in such a manner that it is superposed on Node A or Node C in FIG. 48. The Concatenated Type includes AU-4 and AU-4-4c. Furthermore, a menu window for specifying Path Type (that is, a small window drew as Add/Drop or D&C in FIG. 48) is displayed. Using this window, Path Type is specified. In addition, a menu for specifying either Diverse Routing or Uniform Routing is displayed in such a manner that it is superposed on node F in FIG. 48.

When a plurality of paths are created, the aforementioned procedure is repeated. Then, the "Update" button is clicked, requests for creating paths are sent in a bundle to each node.

Once a network topology has been determined, items that can be selected at each node are determined. At that time, it is convenient to prevent items other than selectable ones from appearing on the screen (or to make items other than selectable ones inactive). That is, as the procedure for creating paths progresses, nodes capable of becoming termination nodes, nodes capable of becoming D & C (Drop and Continue) nodes, or nodes capable of becoming D & C with Add nodes are limited. According to this, the items to be displayed are also limited. As for Concatenated Type and Path Type, only the selectable items are displayed.

(Case 2)

In case 2, the items to be selected are the same as those in case 1 except that the attribute (such as Concatenated Type, Path Type, Diverse Routing/Uniform Routing, or LS channel) of a node is selected using a sub-window.

FIG. 49 shows an example of a subwindow. This window is displayed when a node where a path is to be created is clicked. Use of this window enables LS channel, Concatenation Type, Path Type, and Route Type (Diverse Routing/Uniform Routing) to be specified together.

(Pointing)

When "Pointing" is clicked in the window of FIG. 47, a drop-down list for listing an LS channel appears in, for example, the window of FIG. 50. Using the drop-down list, a Timeslot is first specified. Then, nodes through which a path goes are clicked with the mouse, thereby determining a path route. Then, a path is set by specifying an LS channel at each node.

Specifically, a path is set by clicking sequentially the path (or the route of nodes A→D→E →H) extending from Ring Network 1 to Ring Network 2 and the path (or the route of nodes H→E→D→A) extending from Ring Network 2 to Ring Network 1. In the procedure, when the service circuit has been set, calculating automatically a secondary circuit on the basis of the result with NME 10 saves time and labor. Furthermore, it is desirable that NME 10 should reject a request for an attempt to set conflicting routes.

Furthermore, NME 10 may determine which of the specified two routes is made a service circuit according to the transmission distance between interconnection nodes. It is preferable to make the shortest route a service circuit.

(Choice)

When "Choice" is clicked in the window of FIG. 47, the subwindow "Select Node" of FIG. 51 appears. In this window, when an Add/Drop Node in Ring Network 1 and an Add/Drop Node in Ring Network 2 are selected, NME 10 calculates all the routes that can be set between the selected two nodes. The calculated routes appear in the "Search for Route" window of FIG. 51. For the sake of simplicity, only the service circuit is displayed in FIG. 51.

The operator selects one of the routes drew as Route 1, Route 2, . . . in the "Search for Route" window, thereby setting a path. An LS channel is specified after the route has been calculated.

Information about the distance between nodes (that is, the Segment length) may be stored as an item of Configuration data about the network into NME 10 and the path with the shortest distance among all the calculated routes may be recommended by NME 10. Alternatively, the path that has the smallest number of nodes through which the path passes may be recommended. By the above methods, the path can be set.

<Path Delete>

Conversely, when the "Path Delete" button of FIG. 45 is clicked, the process of deleting the path can be carried out. That is, after the path to be deleted is clicked on the screen, when the "Path Delete" button is clicked, the path is deleted.

<Update>

After the path is set as described above, when the "Update" button is clicked, the result of the setting is sent as a control request to each node. Then, at the node that has received the request, the process of creating a path is carried out. Before the process is completed, both switching by Ring Interworking and switching by APS must be suppressed. Next, the operation of suppressing the switching operations will be explained.

For instance, because there is no input signal when a path is created or because of the difference in path creating timing between nodes, Ring Interworking starts protection switching immediately after the path is created. To avoid this, protection switching is locked out after the path is created. This suppresses the unnecessary switching immediately after the creation of the path. Then, when the state has become stable, the lockout is released to allow switching.

The timing for releasing the lockout has two modes. One mode is such that NME 10 releases the lockout automatically when it has received a Path Create complete response from the node. The other mode is such that the operator releases the lockout after NME 10 has received a Path Create complete response. The Lockout function for the APS function is designed to support two similar modes.

<Monitoring the State of Traffic Restoration>

Figure 52:
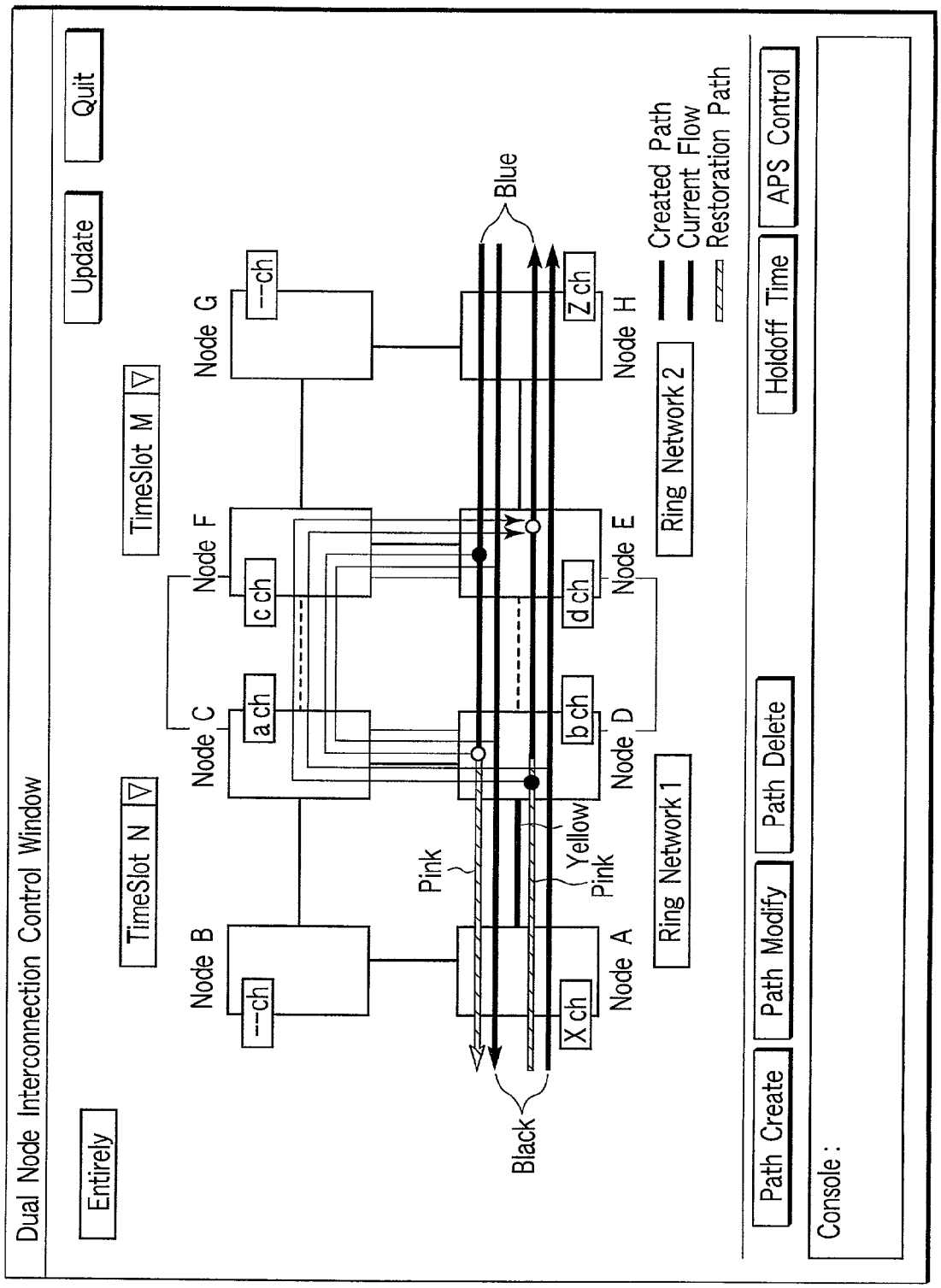
FIG. 52 shows an example of displaying the state of HS APS starting.
Figure 53:
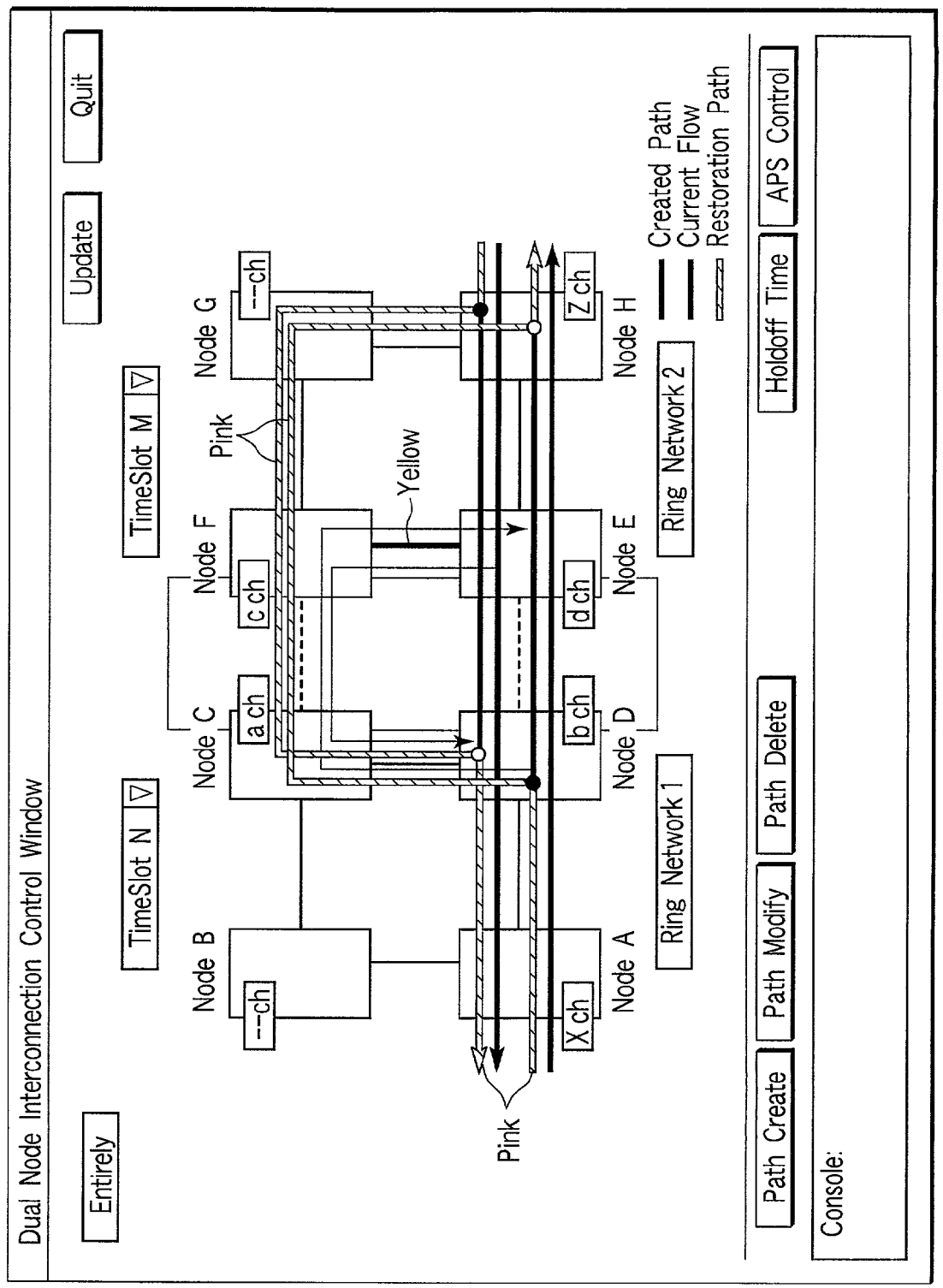
FIG. 53 shows an example of displaying the state of HS APS starting.

Next, the monitoring of the state of traffic restoration will be explained. FIGS. 52 and 53 are drawings to help explain a window displayed in the state of FIG. 45. These windows display a state of traffic restoration by HS APS and a state of traffic restoration by Ring Interworking on a single screen. That is, using the window of FIG. 52 or 53, the operator can check the entire route from the Add/Drop node of Ring Network 1 to the Add/Drop node of Ring Network 2 together with the restoration state of HS APS/Ring Interworking.

As for HS APS, both of the restored route and the original route (that is, the route in the normal state) are displayed. FIG. 52 shows a state where a Span failure has occurred between node A and node D (that is, in the segment AD) and Span switching is in operation.

FIG. 53 shows a state where a Ring failure has occurred between node F and node E (that is, in the segment EF) and another failure has occurred in the interconnection part which connected Node D of Ring Network 1 and Node E of Ring Network 2. According to this, a state where Ring APS and Ring Interworking switching are in operation is shown in the window of FIG. 53.

In each of FIGS. 52 and 53, the original route and current route (that is, restoration route) are distinguished by the color, thickness, and type of lines, and the like. In the second embodiment, a fault segment is drew by yellow and the current route (or restoration route) is drew by pink (or by a hatched arrow).

<APS Control>

Figure 54:
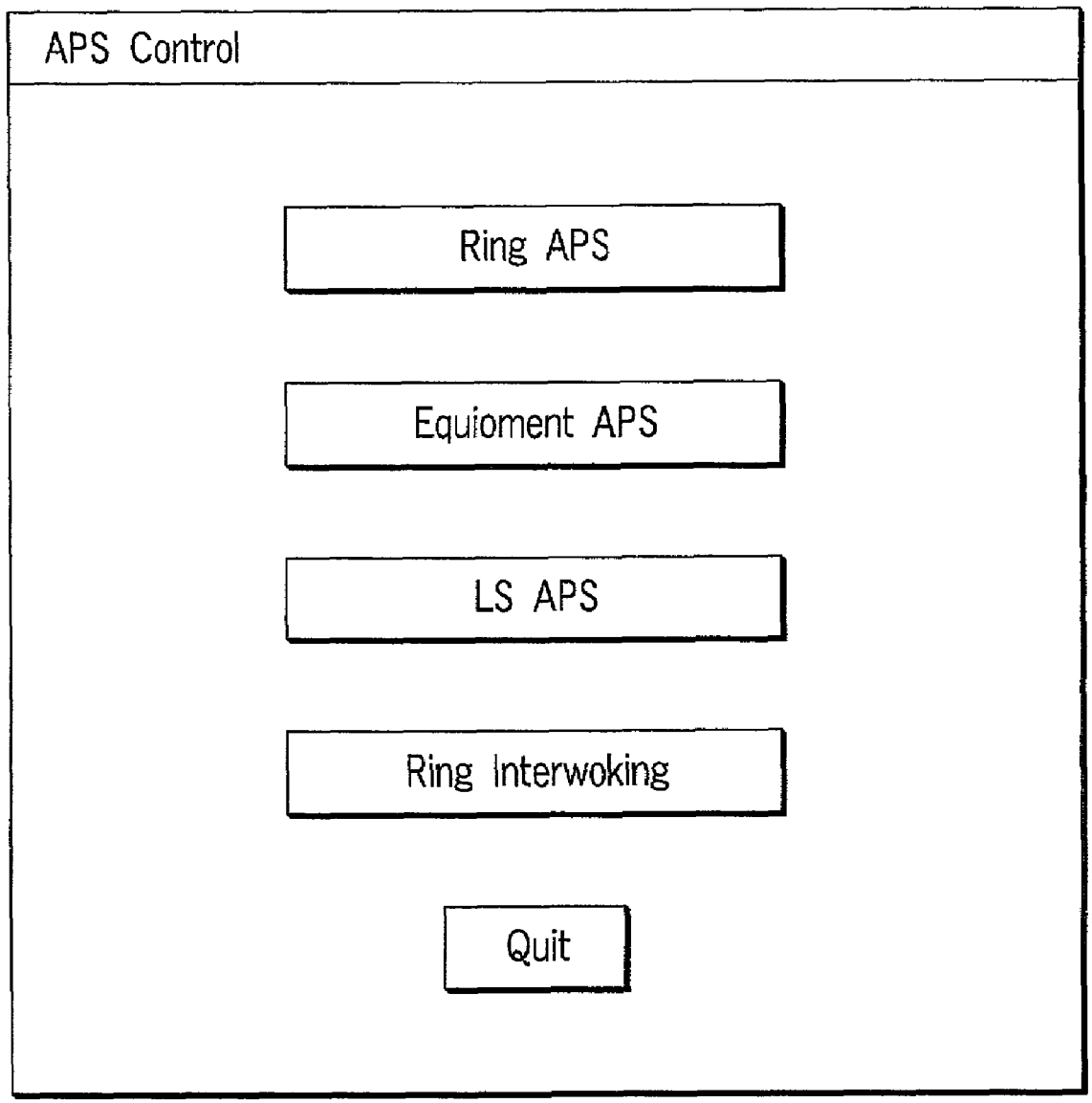
FIG. 54 illustrates an APS Control Window.

Next, FIG. 54 will be explained. The window of FIG. 54 is a subwindow appearing when the "APS Control" button (on the main screen) is clicked. This window is used to deal with external commands related to a plurality of APS functions each node has. In FIG. 54, "Ring APS," "Equipment APS," "LS APS," and "Ring Interworking" are displayed as APS functions. These mean HS-side switching (HS APS), in-system switching, LS-side switching, and switching by the Ring Interworking function, respectively.

In this window, when any button is clicked, the APS function to be operated is selected and an external command related to the selected APS function is sent to each node. As described in the first embodiment, when HS APS conformed with ITU-T Recommendation G.841 Annex A is activated, the types of nodes to be controlled by Ring Interworking change. For example, the types of nodes change from primary nodes to protection secondary nodes.

To cope with this, control requests related to external commands about Ring Interworking are transferred in advance to all the nodes that will possibly be controlled. Alternatively, when NME 10 has recognized that HS APS is in operation, external commands are transferred to the related nodes. By doing this, the external commands related to Ring Interworking can be executed, while HS APS is in operation.

Figure 55:
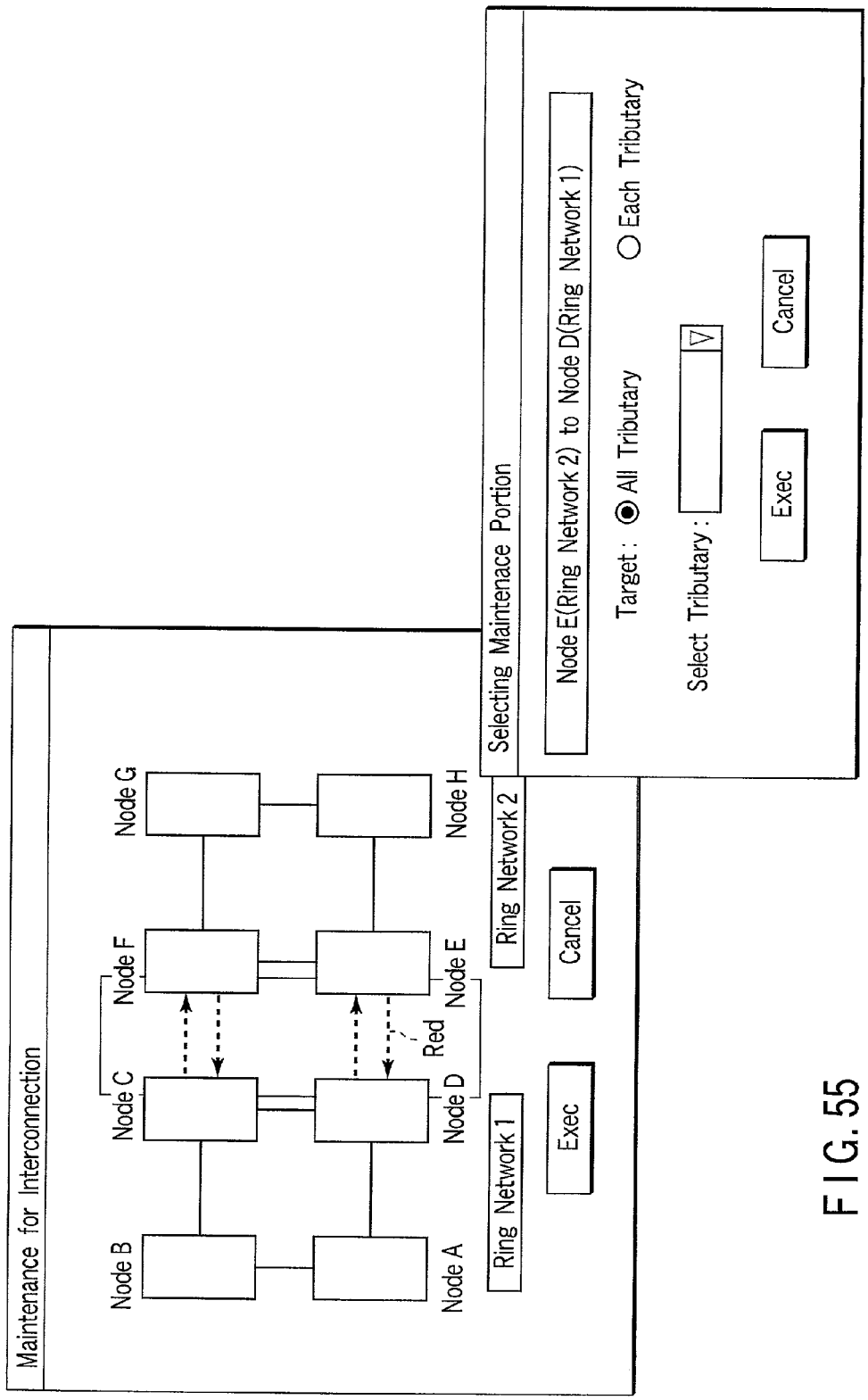
FIG. 55 illustrates the maintenance Window for the Interconnection parts.

FIG. 55 will be explained. When "Ring Interworking" of FIG. 54 is clicked, the "Maintenance for Interconnection" window of FIG. 55 appears. In this window, the state of a failure in the Dual Node Interconnection part is drew by a red arrow. When the operator clicks, for example, the red arrow after having checked the segment where a failure has occurred in the window, the "Selecting Maintenance Portion" window appears at the bottom right of the figure. This window is used to select a segment to be operated.

It is possible to select, as Target, All Tributary that selects all the Fibers interconnecting nodes and Each Tributary that can specify Fibers separately. When processing to bidirectional path is performed, the process of selecting a target is repeated more than once. In this window, after the target fiber is selected, an external command to be sent is selected and transmitted.

When the fiber in the interconnection part is maintained, there may be a case where the external commands are required to be transmitted together to the relevant segment. In this case, All Tributaries is selected. Then, the external commands are sent together to the selected segment.

To sum up, after the fiber the external command deals with is determined, all the paths related to the fiber are retrieved, which enables the external command to be invoked in the Timeslot of the relevant node.

On the other hand, when Each Tributary is selected, another window for giving an external command to each path in the fiber is opened. The "Select Tributary" drop-down list is used to extract the interconnected channels (meaning fibers, not paths) and display them.

NME 10 gathers Protection Status from the nodes where the operational status of Ring Interworking is Enable (or Primary).

<Hold-off Time>

The window of FIG. 56 will be explained. This window is a subwindow which is displayed when the button of "Hold-off Time" (for example, see FIG. 45) is clicked and which is for setting a Holdoff timer. Using this window, a Ring Network in which a Holdoff timer is set is selected from the drop-down list of the target. In FIG. 56, it is assumed that Ring Network 1 has been selected. It is possible to set the values of the Holdoff timer in 100-millisecond steps in the range from 0 to 10 seconds. The set values appear in the column Requested Value. After the values have been set, when the button of "Exec" is clicked, the contents of the setting are sent to each node in the target Ring Network.

Hold-off time is the time from when a failure occurs until the traffic route forming process is started by protection switching. That is, hold-off time is a guard time from when a failure is sensed until protection switching is started. There are two types of protection switching: one is effected by the APS control section 5a shown in FIG. 2 and the other is done by the interworking control section 5b shown in FIG. 2. Thus, hold-off time is defined for both of the protection switching effected by the APS control section 5a shown in FIG. 2 and the protection switching effected by the interworking control section 5b shown in FIG. 2. In this embodiment, hold-off time for each protection switching can be set separately using the window of FIG. 56.

<Lockout>

The commands given from the NME 10 to each node further include a command to prevent either protection switching effected by the APS control section 5a shown in FIG. 2 or protection switching effected by the interworking control section 5b shown in FIG. 2 or both of them from being started. This command (hereinafter, referred to as Lockout command) is given to each node automatically in advance before the procedure for creating a path.

Furthermore, the command to stop both of the APS function and interworking function can also be sent in a situation other than the creation of a path. Such a situation includes system maintenance.

If protection switching is started while a path is being created, the information related to the setting state of the path at one node does not match with that at another node, which will possibly bring about the misconnection of the path. To overcome this problem, the Lockout command is given to each node, thereby preventing protection switching from being effected while a path is being created. This makes it possible to prevent the misconnection of the path.

As described above, with the second embodiment, it is possible to improve the human-machine interface and increase the convenience of the system operation.

THIRD EMBODIMENT

FIG. 57 shows the configuration of a ring interconnection network according to a third embodiment of the present invention. This system is obtained by interconnecting a plurality of networks (Network A, Network B, and Network C). The networks A, B, and C have nodes A1 to A6, nodes B1 to B6, and nodes C1 to C5, respectively. Node A2 is connected to node B1, node A3 is connected to node B4, and node A5 is connected to node B6 via interconnection lines CL, thereby realizing the interconnection between network A and network B. In addition, node B2 is connected to node Cl, node B3 is connected to node C4, and node B5 is connected to node C6 via interconnection lines CL, thereby realizing the interconnection between network B and network C.

The individual nodes are connected to each other via bidirectional service lines SL and protection lines PL. Therefore, the configuration of each of the networks A, B, and C is a so-called 4-fiber ring.

In FIG. 57, a unidirectional path (shown by a solid line) is set which is added at node A4 and follows the route including nodes A1, A2, B1, B2 and C1 and reaches node C2.

For this path, two protection routes have been prepared beforehand in the section between network A and network B. One protection route is split at node A2, passes through nodes A3 and B4, and reaches node B1. The other protection route is split at node A3, passes through nodes A5, B6, and B4, and reaches node B1.

Furthermore, for this path, two protection routes have been prepared beforehand in the section between network B and network C. One protection route is split at node B2, passes through nodes B3 and C4, and reaches node C1. The other protection route is split at node B3, passes through nodes B5, C6, and C4, and reaches node C1.

On the other hand, a unidirectional path (shown by a dotted line) is set which is added at node C2 and follows the route including nodes C1, B2, B1, A2 and A1 and reaches node A4. This path and the path shown by the solid line make a pair.

For this path, two protection routes have been prepared beforehand in the section between network B and network C. One protection route is split at node C1, passes through nodes C4 and B3, and reaches node B2. The other protection route is split at node C4, passes through nodes C5, B5, and B3, and reaches node B2.

Furthermore, for this path, two protection routes have been prepared beforehand in the section between network A and network B. One protection route is split at node B1, passes through nodes B4 and A3, and reaches node A2. The other protection route is split at node B4, passes through nodes B6, A5, and A3, and reaches node A2.

In this way, the interconnected dual homing paths are formed. At this time, let node A4 be a head node, node C2 be a tail node, node A be a pass-through node, nodes B4, C4 be Interconnection head nodes, nodes A2, B2 be Interconnection-Drop nodes, nodes B1, C1 be Interconnection-Add nodes, and nodes A3, B3 be Interconnection tail nodes.

Generally, in each ring network to be interconnected, the types of nodes are determined as follows:

[Interconnection head node]: A node that not only adds the going traffic but also terminates the returning traffic.

[Interconnection-Add node]: A node that not only allows the going traffic to pass through or adds the going traffic therein but also allows the returning traffic to pass through and splits and terminates the returning traffic therein.

[Pass-through node]: A node that allows the going traffic and the returning traffic to pass through.

[Interconnection-Drop node]: A node that not only allows the going traffic to pass through and splits and terminates it therein but also allows the returning traffic to pass through or adds the returning traffic therein.

[Interconnection tail node]: A node that terminates the going traffic and adds the returning traffic.

In FIG. 57, the solid-line path corresponds to the going side and the dotted-line path corresponds to the returning side.

FIG. 58 illustrates a model of a path setting state of network B in FIG. 57. The reference numeral at each node corresponds to that in FIG. 57. An arrow in the figure, which draws a path set in the transmission line, corresponds to a single time-division-multiplexed timeslot.

In FIG. 58, service traffic is set only in the service line (without a reference numeral). In the path setting as shown in the figure, node B6 is an Interconnection head node, nodes B4, B1 are Interconnection-Add nodes, nodes B2, B3 are Interconnection-Drop nodes, and node B5 is an Interconnection tail node. That is, traffic is transmitted using one head node, two Interconnection-Add nodes, two Interconnection-Drop nodes, and one tail node.

Figure 59:
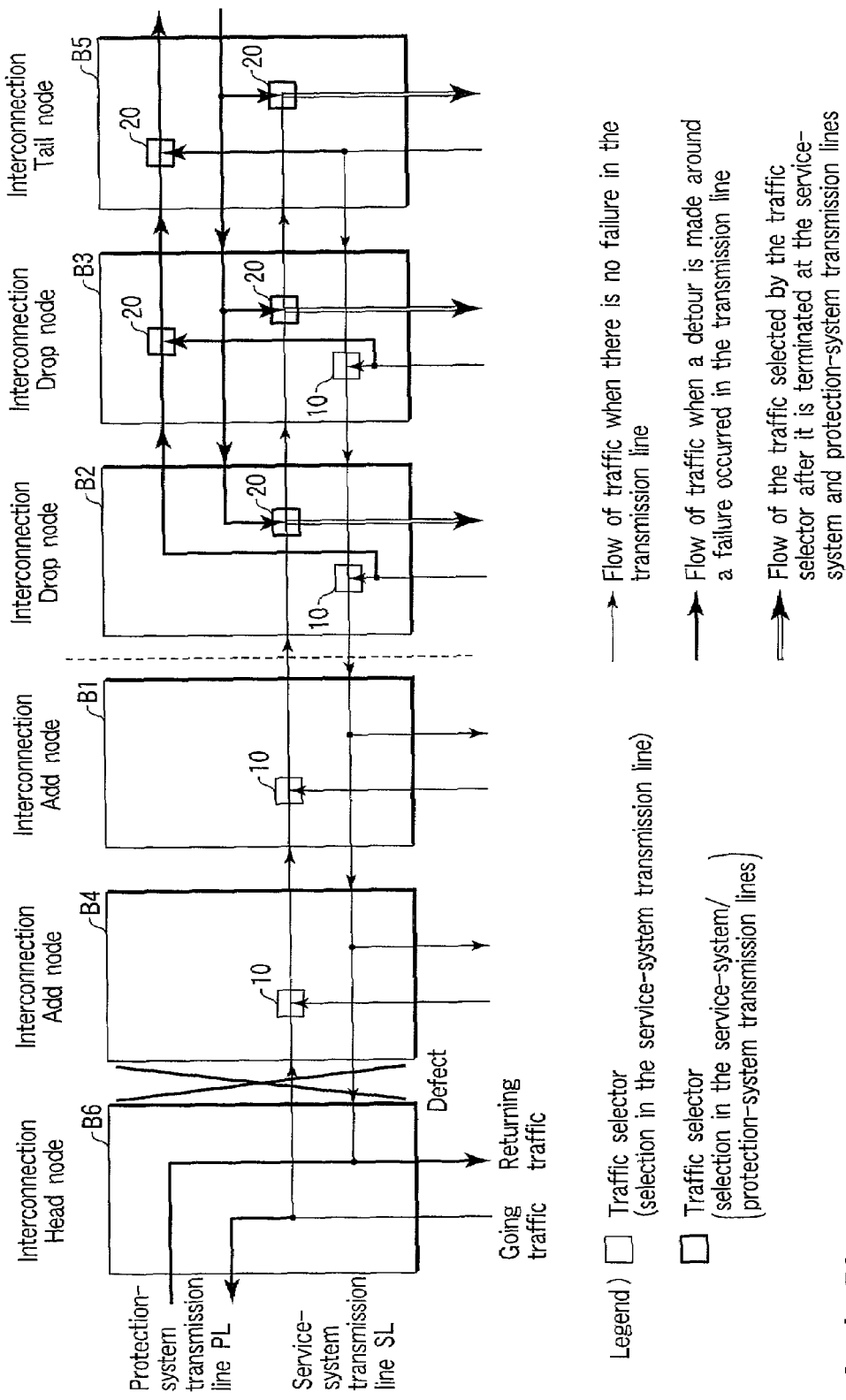
FIG. 59 shows an example of path setting in case 1 in the third embodiment.

Each of the nodes B1 to B6 includes traffic selectors 10 and 20 (as shown in FIG. 59). The traffic selector 10 receives traffic flowing through two service lines and selects the traffic flowing through either service line SL. The traffic selector 20 receives the traffic flowing through the service line SL and the traffic flowing through the protection line PL and selects the traffic from either transmission line.

Next, the operation in the third embodiment will be explained using several cases.

(Case 1)

If a failure has occurred in the service and protection line between node B6 and node B4 in the state (normal state) of FIG. 58, ring switching is effected, thereby setting the paths again as shown in FIG. 59. That is, in the third embodiment, if failures have occurred in the service and protection line between the head node transmitting traffic and an Interconnection-Add node, ring switching is effected by the Transoceanic method determined in ITU-T Recommendation G. 841. At this time, the processes at each node are as follows:

(1) The Interconnection head node detours the going traffic added to the service line in the direction of the fault section to the protection line opposite to the fault section. Furthermore, the Interconnection head node takes in the returning traffic terminated at the service line in the direction of the fault section from the protection line opposite to the fault section and terminates the returning traffic.

(2) The Interconnection-Add node does not change the transmitting state of traffic.

(3) The pass-through node detours the traffic using the protection line.

(4) The Interconnection-Drop node detours the returning traffic inserted in the service line in the direction of the fault section to the protection line opposite to the fault section. Furthermore, the Interconnection-Drop node, when there is another Interconnection-Drop node, selects the effective one from the returning traffic added at the node and the detoured returning traffic. In addition, the Interconnection-Drop node takes in the going traffic terminated at the service line in the direction of the fault section from the protection line opposite to the fault section and terminates the going traffic. Thereafter, the effective traffic is selected.

(5) The Interconnection tail node detours the returning traffic added to the service line in the direction of the fault section to the protection line opposite to the fault section. Furthermore, the Interconnection tail node selects the effective one from the returning traffic added at the Interconnection-Drop node and the detoured traffic. In addition, the Interconnection tail node takes in the going traffic terminated at the service line in the direction of the fault section from the protection line opposite to the fault section and terminates the going traffic. Thereafter, the effective traffic is selected.

(Case 2)

If failures have occurred in the service line and protection line between node B1 and node B2 in the state of FIG. 58, ring switching is effected, thereby setting the paths again as shown in FIG. 60. That is, in the third embodiment, if failures have occurred in the service system and protection line between an Interconnection-Add node and an Interconnection-Drop node, ring switching is effected by the Transoceanic method determined in ITU-T Recommendation G. 841. At this time, the processes at each node are as follows:

(6) The Interconnection head node detours the going traffic added to the service line in the direction of the fault section to the protection line opposite to the fault section. Furthermore, the Interconnection head node selects the effective one of the going traffic added at the Interconnection-Add node and the detoured traffic. In addition, the Interconnection head node takes in the returning traffic terminated at the service line in the direction of the fault section from the protection line opposite to the fault section and terminates the returning traffic.

(7) The Interconnection-Add node detours the going traffic added to the service line in the direction of the fault section to the protection line opposite to the fault section. Furthermore, the Interconnection-Add node, when there is another Interconnection-Add node, selects the effective one of the going traffic added at the latter node and the detoured going traffic. In addition, the Interconnection-Add node takes in the returning traffic terminated at the service line in the direction of the fault section from the protection line opposite to the fault section and terminates the returning traffic.

(8) The pass-through node detours the traffic using the protection line.

(9) The Interconnection-Drop node detours the returning traffic added to the service line in the direction of the fault section to the protection line opposite the fault section. Furthermore, the Interconnection-Drop node, when there is another Interconnection-Drop node, selects the effective one of the returning traffic added at the latter node and the detoured returning traffic. In addition, the Interconnection-Drop node takes in the going traffic terminated at the service line in the direction of the fault section from the protection line opposite the fault section and terminates the going traffic.

(10) The Interconnection tail node detours the returning traffic added to the service line in the direction of the fault section to the protection line opposite the fault section. Furthermore, the Interconnection tail node selects the effective one of the returning traffic added at the Interconnection-Drop node and the detoured returning traffic. In addition, the Interconnection tail node takes in the going traffic terminated at the service line in the direction of the fault section from the protection line opposite to the fault section and terminates the going traffic.

(Case 3)

If failures have occurred in the service line and protection line between node B3 and node B5 in the state of FIG. 58, ring switching is effected, thereby setting the paths again as shown in FIG. 61. That is, in the third embodiment, if failures have occurred in the service system and protection line between an Interconnection-Drop node and an Interconnection tail node, ring switching is effected by the Transoceanic method determined in ITU-T Recommendation G. 841. At this time, the processes at each node are as follows:

(11) The Interconnection head node detours the going traffic added to the service line in the direction of the fault section to the protection line opposite to the fault section. Furthermore, the Interconnection head node selects the effective one of the going traffic added at the Interconnection-Add node and the detoured going traffic. In addition, the Interconnection head node takes in the returning traffic terminated at the service line in the direction of the fault section from the protection line opposite to the fault section and terminates the returning traffic. Thereafter, the effective traffic is selected.

(12) The Interconnection-Add node detours the going traffic added to the service line in the direction of the fault section to the protection line opposite to the fault section. Furthermore, the Interconnection-Add node, when there is another Interconnection-Add node, selects the effective one of the going traffic added at the latter node and the detoured going traffic. In addition, the Interconnection-Add node takes in the returning traffic terminated at the service line in the direction of the fault section from the protection line opposite the fault section and terminates the returning traffic. Thereafter, the effective traffic is selected.

(13) The pass-through node detours the traffic using the protection line. The Interconnection-Drop node does not change the transmitting state of traffic.

(14) The Interconnection tail node detours the returning traffic added to the service line in the direction of the fault section to the protection line opposite to the fault section. In addition, the Interconnection tail node takes in the going traffic terminated at the service line in the direction of the fault section from the protection line opposite to the fault section and terminates it.

(Case 4)

If failures have occurred in the service line and protection line between node B6 and node B5 in the state of FIG. 58, switching is not done as shown in FIG. 62 in the third embodiment. That is, in the third embodiment, if failures have occurred in the service system and protection line in a plurality of sections in a clockwise and a counterclockwise direction between the Interconnection head node and Interconnection tail node, the service traffic is not detoured to the protection side.

(Case 5)

Figure 63:
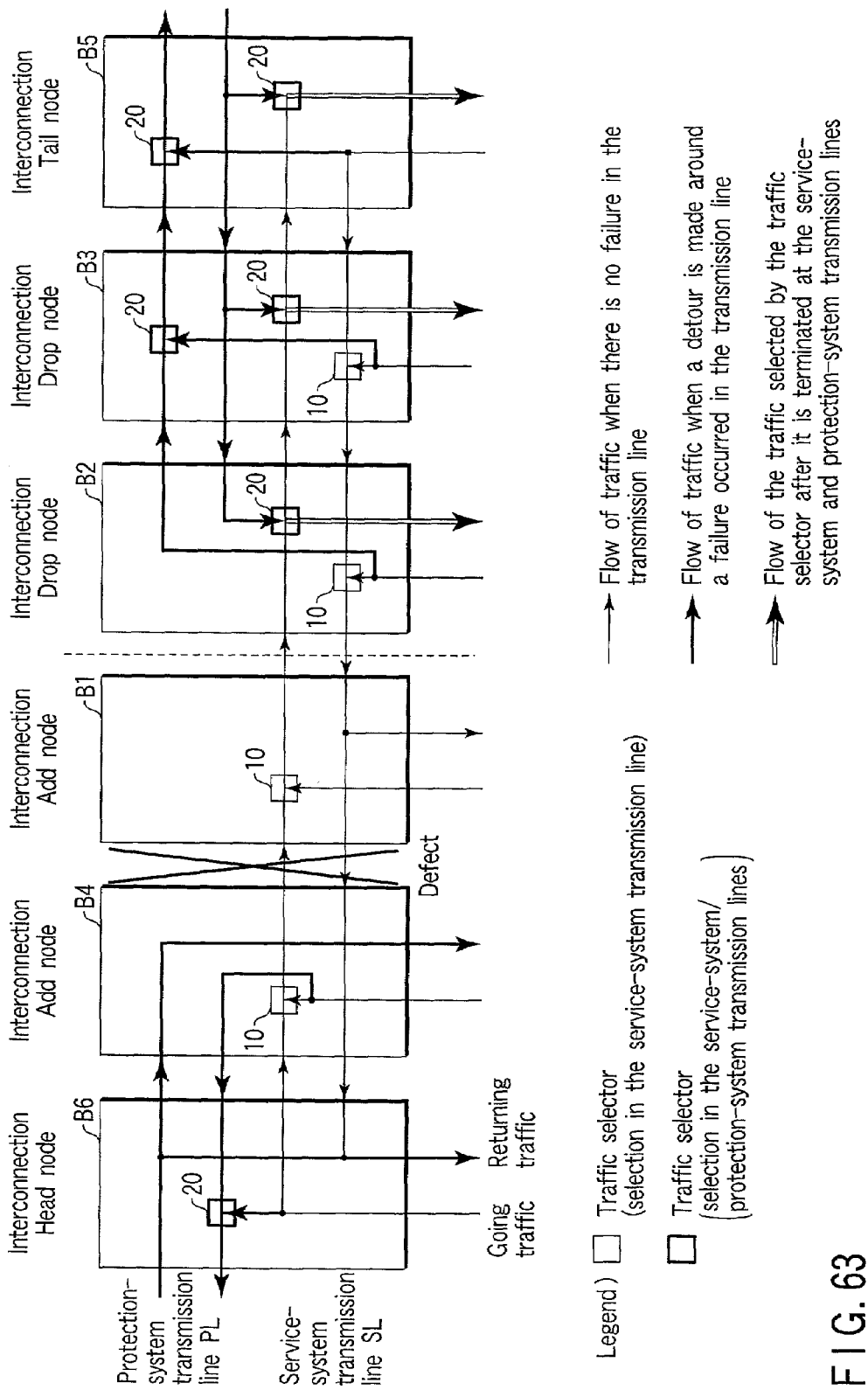
FIG. 63 shows an example of path setting in case 5 in the third embodiment.

If failures have occurred in the service line and protection line between node B4 and node B1 in the state of FIG. 58, ring switching is effected, thereby setting the paths again as shown in FIG. 63. That is, in the third embodiment, if failures have occurred in the service system and protection line between a plurality of sections between Interconnection-Add nodes, ring switching is effected by the Transoceanic method determined in ITU-T Recommendation G. 841. At this time, the processes at each node are as follows:

(15) The Interconnection head node detours the going traffic added to the service line in the direction of the fault section to the protection line opposite to the fault section. Furthermore, the Interconnection head node selects the effective one of the going traffic added at the Interconnection-Add node and the detoured going traffic. In addition, the Interconnection head node takes in the returning traffic terminated at the service line in the direction of the fault section from the protection line opposite to the fault section and terminates the returning traffic.

(16) The Interconnection-Add node located between the Interconnection head node and the fault section detours the going traffic added to the service line in the direction of the fault section to the protection line opposite to the fault section. Furthermore, the Interconnection-Add node, when another Interconnection-Add node exists between the Interconnection head node and the fault section, selects the effective one of the going traffic added at the latter node and the detoured going traffic. In addition, the Interconnection-Add node takes in the returning traffic terminated at the service line in the direction of the fault section from the protection line opposite to the fault section and terminates the returning traffic.

(17) Interconnection-Add nodes other than the above one do not change the transmitting state of traffic.

(18) The pass-through node detours the traffic using the protection line.

(19) The Interconnection-Drop node detours the returning traffic added to the service line in the direction of the fault section to the protection line opposite the fault section. Furthermore, the Interconnection-Drop node, when there is another Interconnection-Drop node, selects the effective one of the returning traffic added at the latter node and the detoured returning traffic. In addition, the Interconnection-Drop node takes in the going traffic terminated at the service line in the direction of the fault section from the protection line opposite to the fault section and terminates the going traffic. Thereafter, the effective traffic is selected.

(20) The Interconnection tail node detours the returning traffic added to the service line in the direction of the fault section to the protection line opposite to the fault section. Furthermore, the Interconnection tail node selects the effective one of the returning traffic added at the Interconnection-Drop node and the detoured returning traffic. In addition, the Interconnection tail node takes in the going traffic terminated at the service line in the direction of the fault section from the protection line opposite to the fault section and terminates the going traffic. Thereafter, the effective traffic is selected.

(Case 6)

If failures have occurred in the service line and protection line between node B2 and node B3 in the state of FIG. 58, ring switching is effected, thereby setting the paths again as shown in FIG. 64. That is, in the third embodiment, if failures have occurred in the service system and protection line in a plurality of sections between Interconnection-Drop nodes, ring switching is effected by the Transoceanic method determined in ITU-T Recommendation G. 841. At this time, the processes at each node are as follows:

(21) The Interconnection head node detours the going traffic added to the service line in the direction of the fault section to the protection line opposite to the fault section. Furthermore, the Interconnection head node selects the effective one of the going traffic added at the Interconnection-Add node and the detoured going traffic. In addition, the Interconnection head node takes in the returning traffic terminated at the service line in the direction of the fault section from the protection line opposite to the fault section and terminates the returning traffic. Thereafter, the effective traffic is selected.

(22) The Interconnection-Add node detours the going traffic added to the service line in the direction of the fault section to the protection line opposite to the fault section. Furthermore, the Interconnection-Add node, when there is another Interconnection-Add node, selects the effective one of the going traffic added at the latter node and the detoured going traffic. In addition, the Interconnection-Add node takes in the returning traffic terminated at the service line in the direction of the fault section from the protection line opposite to the fault section and terminates the returning traffic. Thereafter, the effective traffic is selected.

(23) The pass-through node detours the traffic using the protection line.

(24) The Interconnection-Drop node located between the Interconnection tail node and the fault section detours the returning traffic added to the service line in the direction of the fault section to the protection line opposite to the fault section. Furthermore, the Interconnection-Drop node, when another Interconnection-Drop node exists between the Interconnection tail node and the fault section, selects the effective one of the returning traffic added at the latter node and the detoured returning traffic. In addition, the Interconnection-Drop node takes in the going traffic terminated at the service line in the direction of the fault section from the protection line opposite to the fault section and terminates the going traffic.

(25) Interconnection-Drop nodes other than the above one do not change the transmitting state of traffic.

(26) The Interconnection tail node detours the returning traffic added to the service line in the direction of the fault section to the protection line opposite to the fault section. Furthermore, the Interconnection tail node selects the effective one of the returning traffic added at the Interconnection-Drop node and the detoured returning traffic. In addition, the Interconnection tail node takes in the going traffic terminated at the service line in the direction of the fault section from the protection line opposite to the fault section and terminates the going traffic.

The process of selecting the effective traffic carried out at each node in case 1 to case 6 are based on the following judgment.

As a result of comparing the two traffics inputted to the traffic selectors 10, 20, the traffic of an actual signal is judged to be effective. The traffic of a pseudo transfer signal, such as AIS (Alarm Indication Signal), is judged to be ineffective.

In addition, as a result of comparing the contents of the two traffics inputted to the traffic selector 10 on the service line side, the traffic of an actual signal is judged to be effective. The traffic of a pseudo transfer signal, such as AIS, is judged to be ineffective.

Furthermore, the selecting state of the traffic selector 10 at the present node may be determined on the basis of the selected state of the traffic at the traffic selector 10 at another node.

As described above, in the third embodiment, traffic flowing through two service lines are given to each of the nodes B1 to B6. Each of the nodes B1 to B6 includes the traffic selectors 10 and 20. The traffic selector 10 selects traffic flowing through either service line. The traffic selector 20 selects either the traffic flowing through the service line or the traffic flowing through the protection line. Then, the selecting state of each of the traffic selectors 10, 20 is changed according to the way that a fault has occurred, thereby setting a new path route.

By doing this, it is possible to provide a ring interconnection network system free from erroneous connections even when a failure is avoided by the Transoceanic method.

The present invention is not limited to the above embodiments.

For instance, in the above embodiments, systems using SDH have been explained. The idea of the present invention is not restricted to SDH and may be applied to, for example, SONET (Synchronous Optical Network), an ANSI (American National Standards Institute) standard.

When persons having ordinary skill in the art implement nodes complying with Recommendation G. 841 or Recommendation G. 842, nodes that carry out an Add/Drop process using electric signals (hereinafter, referred to as ADM (Add Drop Multiplexer)) are widely used at present. In the future, however, nodes that carry out an Add/Drop process in an optical signal region (hereinafter, referred to as OADM (Optical Add Drop Multiplexer)) are expected to be widely used.

The ADM uses each time-division-multiplexed slot as a path, whereas the OADM uses a wavelength-division-multiplexed optical signal of each wavelength as a path. This is the point where the ADM and OADM differs basically. Specifically, the ADM effects Ring Interworking on a path basis, whereas the OADM effects Ring Interworking on a wavelength basis. The present invention, however, may be applied to this type of node (OADM), because the invention does not require paths to be time-division-multiplexed.

While in the above embodiments, the present invention has been applied to a 4-fiber ring system, it may be applied to a 2-fiber ring system.

Furthermore, the names of the buttons and windows in the second embodiment may be determined at will.

This invention may be practiced or embodied in still other ways without departing from what has been described in this specification.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A ring interconnection network system having a plurality of ring networks which have a plurality of nodes and a transmission line connecting these nodes in a ring and a plurality of connection parts which connect the plurality of ring networks to each other, said ring interconnection network system comprising:

a first self-healing function which, when a failure has occurred in said ring networks, forms a shortest communication route to avoid the failure;

a second self-healing function which, when a failure has occurred in said connection parts, forms a communication route to avoid the failure, wherein said second self-healing function forms routes for transmitting the same signal in at least two of said plurality of connection parts beforehand and, when a failure has occurred in the connection parts, switches between these routes to form a communication route for avoiding said failure;

switching control means for causing said first self-healing function and said second self-healing function to function in cooperation with each other without contradiction;

a first and a second ring network each of which includes a plurality of nodes including a first and a second interconnection node and a transmission line connecting these nodes in a ring;

a first interconnection line which connects a first interconnection node of said first ring network and a first interconnection node of said second ring network to each other; and a second interconnection line which connects a second interconnection node of said first ring network and a second interconnection node of said second ring network to each other, wherein:

said second self-healing function gives the first interconnection nodes of said first and second ring networks the right of selecting traffic from either said transmission line or said interconnection line to form routes for transmitting the same signal in said first and second interconnection lines; and in a case where a traffic switching request has occurred in a segment other than the segment between said first and second interconnection nodes in said first ring network and the place where the request has occurred relates to a path interconnecting said first and second ring networks, said second self-healing function, when said first self-healing function has operated according to said request, transfers said right of selecting traffic from said first interconnection node to said second interconnection node in said first ring network.

2. A ring interconnection network system having a plurality of ring networks which have a plurality of nodes and a transmission line connecting these nodes in a ring and a plurality of connection parts which connect the plurality of ring networks to each other, said ring interconnection network system comprising:

a first self-healing function which, when a failure has occurred in said ring networks, forms a shortest communication route to avoid the failure;

a second self-healing function which, when a failure has occurred in said connection parts, forms a communication route to avoid the failure, wherein said second self-healing function forms routes for transmitting the same signal in at least two of said plurality of connection parts beforehand and, when a failure has occurred in the connection parts, switches between these routes to form a communication route for avoiding said failure;

switching control means for causing said first self-healing function and said second self-healing function to function in cooperation with each other without contradiction;

a first and a second ring network each of which includes a plurality of nodes including a first and a second interconnection node and a transmission line connecting these nodes in a ring;

a first interconnection line which connects a first interconnection node of said first ring network and a first interconnection node of said second ring network to each other; and a second interconnection line which connects a second interconnection node of said first ring network and a second interconnection node of said second ring network to each other, wherein:

said second self-healing function gives the first interconnection nodes of said first and second ring networks the right of selecting traffic from either said transmission line or said interconnection line to form routes for transmitting the same signal in said first and second interconnection lines; and in a case where a traffic switching request has occurred in the segment between said first and second interconnection nodes in said first ring network and the place where the request has occurred relates to a path interconnecting said first and second ring networks, said second self-healing function, when said first self-healing function has operated according to said request, transfers said right of selecting traffic from said first interconnection node to a node which terminates said path.

3. A ring interconnection network system having a plurality of ring networks which have a plurality of nodes and a transmission line connecting these nodes in a ring and a plurality of connection parts which connect the plurality of ring networks to each other, said ring interconnection network system comprising:

a first self-healing function which, when a failure has occurred in said ring networks, forms a shortest communication route to avoid the failure;

a second self-healing function which, when a failure has occurred in said connection parts, forms a communication route to avoid the failure, wherein said second self-healing function forms routes for transmitting the same signal in at least two of said plurality of connection parts beforehand and, when a failure has occurred in the connection parts, switches between these routes to form a communication route for avoiding said failure;

switching control means for causing said first self-healing function and said second self-healing function to function in cooperation with each other without contradiction;

a first and a second ring network each of which includes a plurality of nodes including a first and a second interconnection node and a transmission line connecting these nodes in a ring;

a first interconnection line which connects a first interconnection node of said first ring network and a first interconnection node of said second ring network to each other; and a second interconnection line which connects a second interconnection node of said first ring network and a second interconnection node of said second ring network to each other, wherein:

said second self-healing function gives the first interconnection nodes of said first and second ring networks the right of selecting traffic from either said transmission line or said interconnection line to form routes for transmitting the same signal in said first and second interconnection lines; and in a case where traffic switching requests have occurred in a segment other than the segment between said first and second interconnection nodes and in said second interconnection line in said first ring network and the places where the requests have occurred relate to a path interconnecting said first and second ring networks, said second self-healing function, when said first self-healing function has operated according to said requests, transfers said right of selecting traffic from said first interconnection node to said second interconnection node in said first ring network, and the second interconnection node selects traffic from said first interconnection line.

4. A ring interconnection network system having a plurality of ring networks which have a plurality of nodes and a transmission line connecting these nodes in a ring and a plurality of connection parts which connect the plurality of ring networks to each other, said ring interconnection network system comprising:

a first self-healing function which, when a failure has occurred in said ring networks, forms a shortest communication route to avoid the failure;

a second self-healing function which, when a failure has occurred in said connection parts, forms a communication route to avoid the failure, wherein said second self-healing function forms routes for transmitting the same signal in at least two of said plurality of connection parts beforehand and, when a failure has occurred in the connection parts, switches between these routes to form a communication route for avoiding said failure;

switching control means for causing said first seif-healing function and said second self-healing function to function in cooperation with each other without contradiction;

a first and a second ring network each of which includes a plurality of nodes including a first and a second interconnection node and a transmission line connecting these nodes in a ring;

a first interconnection line which connects a first interconnection node of said first ring network and a first interconnection node of said second ring network to each other; and a second interconnection line which connects a second interconnection node of said first ring network and a second interconnection node of said second ring network to each other, wherein:

said second self-healing function gives the first interconnection node of said first ring network and the second interconnection node of said second ring network the right of selecting traffic from either said transmission line or said interconnection line to form routes for transmitting the same signal in said first and second interconnection lines, and in a case where a traffic switching request has occurred in a segment other than the segment between said first and second interconnection nodes in said first ring network and the place where the request has occurred relates to a path interconnecting said first and second ring networks, said second self-healing function, when said first self-healing function has operated according to said request, transfers said right of selecting traffic from said first interconnection node to said second interconnection node in said first ring network.

5. A ring interconnection network system having a plurality of ring networks which have a plurality of nodes and a transmission line connecting these nodes in a ring and a plurality of connection parts which connect the plurality of ring networks to each other, said ring interconnection network system comprising:

a first self-healing function which, when a failure has occurred in said ring networks, forms a shortest communication route to avoid the failure;

a second self-healing function which, when a failure has occurred in said connection parts, forms a communication route to avoid the failure, wherein said second self-healing function forms routes for transmitting the same signal in at least two of said plurality of connection parts beforehand and, when a failure has occurred in the connection parts, switches between these routes to form a communication route for avoiding said failure;

switching control means for causing said first self-healing function and said second self-healing function to function in cooperation with each other without contradiction;

a first and a second ring network each of which includes a plurality of nodes including a first and a second interconnection node and a transmission line connecting these nodes in a ring;

a first interconnection line which connects a first interconnection node of said first ring network and a first interconnection node of said second ring network to each other; and a second interconnection line which connects a second interconnection node of said first ring network and a second interconnection node of said second ring network to each other, wherein:

said second self-healing function gives the first interconnection node of said first ring network and the second interconnection node of said second ring network the right of selecting traffic from either said transmission line or said interconnection line to form routes for transmitting the same signal in said first and second interconnection lines, and in a case where a traffic switching request has occurred in the segment between said first and second interconnection nodes in said first ring network and the place where the request has occurred relates to a path interconnecting said first and second ring networks, said second self-healing function, when said first self-healing function has operated according to said request, transfers said right of selecting traffic from said first interconnection node to a node which terminates said path.

6. A ring interconnection network system comprising:

a first, a second, and a third ring network where a plurality of nodes are connected in a ring via a service line and a protection line;

a first interconnection line which connects a first interconnection node in the first ring network and a second interconnection node in the second ring network;

a second interconnection line which connects a third interconnection node adjacent to said first interconnection node in the first ring network and a fourth interconnection node adjacent said second interconnection node in the second ring network;

a third interconnection line which connects a fifth interconnection node adjacent to said third interconnection node in the first ring network and a sixth interconnection node adjacent said fourth interconnection node in the second ring network;

a fourth interconnection line which connects a seventh connection node in the second ring network and an eighth interconnection node in said third ring network;

a fifth interconnection line which connects a ninth interconnection node adjacent said seventh interconnection node in the second ring network and a tenth interconnection node adjacent to said eighth interconnection node in the third ring network; and a sixth interconnection line which connects an eleventh interconnection node adjacent said ninth interconnection node in the second ring network and a twelfth interconnection node adjacent to said tenth interconnection node in the third ring network, wherein in a case where a communication path extending from said first ring network, passing through said second ring network, and reaching said third ring network is set, when the communication oath passes the segment between said first ring network and said second ring network, the oath is caused to pass through at least two of said first to third interconnection lines, and when the communication oath passes the segment between said second ring network and said third ring network, the path is caused to pass through at least two of said fourth to sixth interconnection lines, wherein, when failures have occurred in the service line and protection line between said fourth interconnection node and sixth interconnection node, any one of said seventh, ninth, and eleventh interconnection nodes sets the route of said communication path again for said sixth interconnection node via the protection line opposite the fault segment.

7. A ring interconnection network system, comprising:

a first, a second, and a third ring network where a plurality of nodes are connected in a ring via a service line and a protection line;

a first interconnection line which connects a first interconnection node in the first ring network and a second interconnection node in the second ring network;

a second interconnection line which connects a third interconnection node adjacent to said first interconnection node in the first ring network and a fourth interconnection node adjacent said second interconnection node in the second ring network;

a third interconnection line which connects a fifth interconnection node adjacent to said third interconnection node in the first ring network and a sixth interconnection node adjacent said fourth interconnection node in the second ring network;

a fourth interconnection line which connects a seventh connection node in the second ring network and an eighth interconnection node in said third ring network;

a fifth interconnection line which connects a ninth interconnection node adjacent said seventh interconnection node in the second ring network and a tenth interconnection node adjacent to said eighth interconnection node in the third ring network; and a sixth interconnection line which connects an eleventh interconnection node adjacent said ninth interconnection node in the second ring network and a twelfth interconnection node adjacent to said tenth interconnection node in the third ring network, wherein in a case where a communication oath extending from said first ring network, passing through said second ring network, and reaching said third ring network is set, when the communication oath passes the segment between said first ring network and said second ring network, the path is caused to pass through at least two of said first to third interconnection lines, and when the communication oath passes the segment between said second ring network and said third ring network, the path is caused to pass through at least two of said fourth to sixth interconnection lines, wherein, when failures have occurred in the service line and protection line between said second interconnection node and seventh interconnection node, any one of said fourth, sixth, ninth, and eleventh interconnection nodes sets the route of said communication path again for said second interconnection node and said seventh interconnection node via the protection line opposite the fault segment.

8. A ring interconnection network system, comprising:

a first, a second, and a third ring network where a plurality of nodes are connected in a ring via a service line and a protection line;

a first interconnection line which connects a first interconnection node in the first ring network and a second interconnection node in the second ring network;

a second interconnection line which connects a third interconnection node adjacent to said first interconnection node in the first ring network and a fourth interconnection node adjacent said second interconnection node in the second ring network;

a third interconnection line which connects a fifth interconnection node adjacent to said third interconnection node in the first ring network and a sixth interconnection node adjacent said fourth interconnection node in the second ring network;

a fourth interconnection line which connects a seventh connection node in the second ring network and an eighth interconnection node in said third ring network;

a fifth interconnection line which connects a ninth interconnection node adjacent said seventh interconnection node in the second ring network and a tenth interconnection node adjacent to said eighth interconnection node in the third ring network; and a sixth interconnection line which connects an eleventh interconnection node adjacent said ninth interconnection node in the second ring network and a twelfth interconnection node adjacent to said tenth interconnection node in the third ring network, wherein in a case where a communication oath extending from said first ring network, passing through said second ring network, and reaching said third ring network is set, when the communication oath passes the segment between said first ring network and said second ring network, the path is caused to pass through at least two of said first to third interconnection lines, and when the communication oath passes the segment between said second ring network and said third ring network, the oath is caused to pass through at least two of said fourth to sixth interconnection lines, wherein, when failures have occurred in the service line and protection line between said ninth interconnection node and eleventh interconnection node, any one of said second, fourth, and sixth interconnection nodes sets the route of said communication path again for said eleventh interconnection node via the protection line opposite to the fault segment.

9. A ring interconnection network system, comprising:
a first, a second, and a third ring network where a plurality of nodes are connected in a ring via a service line and a protection line;
a first interconnection line which connects a first interconnection node in the first ring network and a second interconnection node in the second ring network;
a second interconnection line which connects a third interconnection node adjacent to said first interconnection node in the first ring network and a fourth interconnection node adjacent said second interconnection node in the second ring network;
a third interconnection line which connects a fifth interconnection node adjacent to said third interconnection node in the first ring network and a sixth interconnection node adjacent said fourth interconnection node in the second ring network;
a fourth interconnection line which connects a seventh connection node in the second ring network and an eighth interconnection node in said third ring network;
a fifth interconnection line which connects a ninth interconnection node adjacent said seventh interconnection node in the second ring network and a tenth interconnection node adjacent to said eighth interconnection node in the third ring network; and
a sixth interconnection line which connects an eleventh interconnection node adjacent said ninth interconnection node in the second ring network and a twelfth interconnection node adjacent to said tenth interconnection node in the third ring network, wherein
in a case where a communication path extending from said first ring network, passing through said second ring network, and reaching said third ring network is set,
when the communication path passes the segment between said first ring network and said second ring network, the path is caused to pass through at least two of said first to third interconnection lines, and
when the communication path passes the segment between said second ring network and said third ring network, the oath is caused to pass through at least two of said fourth to sixth interconnection lines,
wherein, when failures have occurred in the service line and protection line between said second interconnection node and seventh interconnection node and in the service line and protection line between said eleventh interconnection node and sixth interconnection node, the route of said communication path is not set again.

10. A ring interconnection network system, comprising:
a first, a second, and a third ring network where a plurality of nodes are connected in a ring via a service line and a protection line;
a first interconnection line which connects a first interconnection node in the first ring network and a second interconnection node in the second ring network;
a second interconnection line which connects a third interconnection node adjacent to said first interconnection node in the first ring network and a fourth interconnection node adjacent said second interconnection node in the second ring network;
a third interconnection line which connects a fifth interconnection node adjacent to said third interconnection node in the first ring network and a sixth interconnection node adjacent said fourth interconnection node in the second ring network;
a fourth interconnection line which connects a seventh connection node in the second ring network and an eighth interconnection node in said third ring network;
a fifth interconnection line which connects a ninth interconnection node adjacent said seventh interconnection node in the second ring network and a tenth interconnection node adjacent to said eighth interconnection node in the third ring network; and
a sixth interconnection line which connects an eleventh interconnection node adjacent said ninth interconnection node in the second ring network and a twelfth interconnection node adjacent to said tenth interconnection node in the third ring network, wherein
in a case where a communication oath extending from said first ring network, passing through said second ring network, and reaching said third ring network is set,
when the communication oath passes the segment between said first ring network and said second ring network, the path is caused to pass through at least two of said first to third interconnection lines, and
when the communication oath passes the segment between said second ring network and said third ring network, the oath is caused to pass through at least two of said fourth to sixth interconnection lines.
wherein, when failures have occurred in the service line and protection line between said second interconnection node and fourth interconnection node, any one of said sixth, ninth, and eleventh interconnection nodes sets the route of said communication path again for said fourth interconnection node and said seventh interconnection node via the protection line opposite to the fault segment.

11. A ring interconnection network system, comprising:
a first, a second, and a third ring network where a plurality of nodes are connected in a ring via a service line and a protection line;
a first interconnection line which connects a first interconnection node in the first ring network and a second interconnection node in the second ring network;
a second interconnection line which connects a third interconnection node adjacent to said first interconnection node in the first ring network and a fourth interconnection node adjacent said second interconnection node in the second ring network;
a third interconnection line which connects a fifth interconnection node adjacent to said third interconnection node in the first ring network and a sixth interconnection node adjacent said fourth interconnection node in the second ring network;
a fourth interconnection line which connects a seventh connection node in the second ring network and an eighth interconnection node in said third ring network;
a fifth interconnection line which connects a ninth interconnection node adjacent said seventh interconnection node in the second ring network and a tenth interconnection node adjacent to said eighth interconnection node in the third ring network; and
a sixth interconnection line which connects an eleventh interconnection node adjacent said ninth interconnection node in the second ring network and a twelfth interconnection node adjacent to said tenth interconnection node in the third ring network, wherein
in a case where a communication oath extending from said first ring network, passing through said second ring network, and reaching said third ring network is set, when the communication oath passes the segment between said first ring network and said second ring network, the path is caused to pass through at least two of said first to third interconnection lines, and when the communication oath passes the segment between said second ring network and said third ring network, the oath is caused to pass through at least two of said fourth to sixth interconnection lines, wherein, when failures have occurred in the service line and protection line between said seventh interconnection node and ninth interconnection node, any one of said fourth, sixth, and eleventh interconnection nodes sets the route of said communication path again for said second interconnection node and said ninth interconnection node via the protection line opposite the fault segment.

* * * * *

UNITED STATES PATENT AND TRADEMARK OFFICE
CERTIFICATE OF CORRECTION

PATENT NO. : 7,095,714 B2 Page 1 of 2
APPLICATION NO. : 09/993574
DATED : August 22, 2006
INVENTOR(S) : Suetsugu et al.

It is certified that error appears in the above-identified patent and that said Letters Patent is hereby corrected as shown below:

Claim 4, column 33, line 32, change "seif-healing" to --self-healing--.

Claim 6, column 35, line 21, change "oath" to --path--.

Claim 6, column 35, line 23, change "oath" to --path--.

Claim 6, column 35, line 25, change "oath" to --path--.

Claim 7, column 36, line 1, change "oath" to --path--.

Claim 7, column 36, line 5, change "oath" to --path--.

Claim 7, column 36, line 9, change "oath" to --path--.

Claim 8, column 36, line 51, change "oath" to --path--.

Claim 8, column 36, line 55, change "oath" to --path--.

Claim 8, column 36, line 59, change "oath" to --path--.

Claim 8, column 36, line 61, change "oath" to --path--.

Claim 9, column 37, line 42, change "oath" to --path--.

Claim 10, column 38, line 15, change "oath" to b-path--.

Claim 10, column 38, line 19, change "oath" to --path--.

Claim 10, column 38, line 23, change "oath" to --path--.

Claim 10, column 38, line 24, change "oath" to --path--.

Claim 11, column 38, line 66, change "oath" to --path--.

Claim 11, column 39, line 3, change "oath" to --path--.

Claim 11, column 39, line 7, change "oath" to --path--.

UNITED STATES PATENT AND TRADEMARK OFFICE
CERTIFICATE OF CORRECTION

PATENT NO. : 7,095,714 B2
APPLICATION NO. : 09/993574
DATED : August 22, 2006
INVENTOR(S) : Suetsugu et al.

It is certified that error appears in the above-identified patent and that said Letters Patent is hereby corrected as shown below:

Claim 11, column 39, line 9, change "oath" to --path--.

Signed and Sealed this

Second Day of January, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,095,714 B2 | Page 1 of 1 |
| APPLICATION NO. | : 09/993574 | |
| DATED | : August 22, 2006 | |
| INVENTOR(S) | : Suetsugu et al. | |

It is certified that error appears in the above-identified patent and that said Letters Patent is hereby corrected as shown below:

Claim 10, column 38, line 15, change "b-path" to --path--.

Signed and Sealed this

First Day of May, 2007

JON W. DUDAS
*Director of the United States Patent and Trademark Office*